United States Patent
Connolly et al.

(10) Patent No.: US 9,684,903 B2
(45) Date of Patent: Jun. 20, 2017

(54) EXPERT COLLABORATION SYSTEM AND METHOD

(71) Applicant: General Electric Company, Schenectady, NY (US)

(72) Inventors: Paul Connolly, Erie, PA (US); Raju Venkataramana, San Ramon, CA (US); Sharoda Paul, San Ramon, CA (US); Piyush Modi, San Ramon, CA (US); Joseph William Bolinger, San Ramon, CA (US); Brandi Wood, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 14/459,342

(22) Filed: Aug. 14, 2014

(65) Prior Publication Data
US 2015/0067018 A1 Mar. 5, 2015

Related U.S. Application Data

(60) Provisional application No. 61/874,132, filed on Sep. 5, 2013.

(51) Int. Cl.
G06F 15/16 (2006.01)
G06Q 30/00 (2012.01)
H04L 12/26 (2006.01)

(52) U.S. Cl.
CPC ............ *G06Q 30/016* (2013.01); *H04L 43/50* (2013.01)

(58) Field of Classification Search
CPC ....... G06Q 30/016; H04L 43/50; G07C 5/008
(Continued)

(56) References Cited

U.S. PATENT DOCUMENTS

| 4,213,119 A | 7/1980 | Ward et al. |
| 4,688,026 A | 8/1987 | Scribner |

(Continued)

FOREIGN PATENT DOCUMENTS

| EP | 0970870 A2 | 1/2000 |
| EP | 1081659 A1 | 3/2001 |

(Continued)

OTHER PUBLICATIONS

Electronic ERA Test and Inspection System; General Overview 10East teams up with Sharp Electronics to equip CSX maintenance forces with a data collection, management, and reporting solution for monitoring Federally mandated safety compliance of the railroads infrastructure. 10East, Inc. (7 pgs.), 2009.

(Continued)

*Primary Examiner* — Thu Ha Nguyen
(74) *Attorney, Agent, or Firm* — Global Patent Operation; John A. Kramer

(57) ABSTRACT

A system and method for remotely providing expert assistance receive identification information from a mobile device that is representative of a component and communicate the identification information to remotely located expert personnel. The system and method also receive an expert-identified work scope that includes guidance information for display on the mobile device to guide the operator through diagnosing, repairing, testing, and/or replacing the component. The system and method also store the expert-identified work scope and the identification information such that the expert-identified work scope is associated with the identification information. The system and method compare subsequently received identification information with the stored identification information and automatically select and communicate the expert-identified work scope based on com- (Continued)

paring the subsequently received identification information with the stored identification information.

20 Claims, 24 Drawing Sheets

(58) Field of Classification Search
USPC ....... 709/202, 203, 223, 224, 201; 701/29.1, 701/29.2, 31.4, 32.7, 33.2
See application file for complete search history.

(56) References Cited

U.S. PATENT DOCUMENTS

| | | | |
|---|---|---|---|
| 5,008,661 A | 4/1991 | Raj | |
| 5,032,083 A | 7/1991 | Friedman | |
| 5,470,233 A | 11/1995 | Fruchterman et al. | |
| 5,528,248 A | 6/1996 | Steiner et al. | |
| 5,705,818 A | 1/1998 | Kelbel et al. | |
| 5,845,272 A | 12/1998 | Morjaria et al. | |
| 5,938,721 A | 8/1999 | Dussell et al. | |
| 6,078,826 A | 6/2000 | Croft et al. | |
| 6,141,608 A * | 10/2000 | Rother | G01M 17/007 701/29.1 |
| 6,175,934 B1 | 1/2001 | Hershey et al. | |
| 6,243,628 B1 | 6/2001 | Bliley et al. | |
| 6,246,950 B1 | 6/2001 | Bessler et al. | |
| 6,266,612 B1 | 7/2001 | Dussell et al. | |
| 6,301,531 B1 | 10/2001 | Pierro et al. | |
| 6,317,060 B1 | 11/2001 | Jones | |
| 6,324,659 B1 | 11/2001 | Pierro | |
| 6,336,065 B1 | 1/2002 | Gibson et al. | |
| 6,343,236 B1 | 1/2002 | Gibson et al. | |
| 6,405,108 B1 | 6/2002 | Patel et al. | |
| 6,411,899 B2 | 6/2002 | Dussell et al. | |
| 6,415,395 B1 | 7/2002 | Varma et al. | |
| 6,446,004 B1 | 9/2002 | Cao et al. | |
| 6,453,237 B1 | 9/2002 | Fuchs et al. | |
| 6,621,452 B2 | 9/2003 | Knockeart et al. | |
| 6,625,589 B1 * | 9/2003 | Varma | G05B 23/0289 700/79 |
| 6,634,000 B1 | 10/2003 | Jammu et al. | |
| 6,636,771 B1 | 10/2003 | Varma et al. | |
| 6,651,034 B1 | 11/2003 | Hedlund et al. | |
| 6,671,698 B2 | 12/2003 | Pickett et al. | |
| 6,681,215 B2 | 1/2004 | Jammu | |
| 6,725,398 B1 | 4/2004 | Varma et al. | |
| 6,738,572 B2 | 5/2004 | Hunter | |
| 6,795,935 B1 * | 9/2004 | Unkle | G05B 23/0275 340/438 |
| 6,898,517 B1 | 5/2005 | Froeberg | |
| 6,947,976 B1 | 9/2005 | Devitt et al. | |
| 6,950,829 B2 | 9/2005 | Schlabach et al. | |
| 6,959,235 B1 | 10/2005 | Abdel-Malek et al. | |
| 6,981,182 B2 | 12/2005 | Roddy et al. | |
| 6,988,011 B2 | 1/2006 | Varma et al. | |
| 7,107,038 B2 | 9/2006 | Fitch et al. | |
| 7,209,817 B2 | 4/2007 | Abdel-Malek et al. | |
| 7,212,828 B2 | 5/2007 | Hind et al | |
| 7,776,505 B2 | 8/2010 | Gonsalves | |
| 7,821,542 B2 | 10/2010 | Lee et al. | |
| 8,244,276 B2 | 8/2012 | Wetzel et al. | |
| 8,996,235 B2 * | 3/2015 | Singh | G05B 23/0278 701/29.1 |
| 9,058,230 B1 * | 6/2015 | Van Rietschote | G06F 8/61 |
| 2002/0049538 A1 | 4/2002 | Knapton | |
| 2003/0013458 A1 | 1/2003 | Yabe et al. | |
| 2003/0017442 A1 * | 1/2003 | Tudor | G09B 7/04 434/322 |
| 2003/0017821 A1 | 1/2003 | Irvin | |
| 2003/0055666 A1 | 3/2003 | Roddy et al. | |
| 2003/0061005 A1 | 3/2003 | Manegold et al. | |
| 2003/0061159 A1 | 3/2003 | Adams et al. | |
| 2003/0069694 A1 | 4/2003 | Fuchs et al. | |
| 2003/0132855 A1 | 7/2003 | Swan | |
| 2003/0134626 A1 | 7/2003 | Himmel et al. | |
| 2005/0023347 A1 | 2/2005 | Wetzel | |
| 2005/0096806 A1 * | 5/2005 | Diem | G01N 27/4175 701/31.4 |
| 2005/0131596 A1 * | 6/2005 | Cherrington | G01M 15/05 701/31.4 |
| 2005/0171661 A1 * | 8/2005 | Abdel-Malek | B61L 27/0094 701/31.4 |
| 2005/0209777 A1 | 9/2005 | Peltz | |
| 2007/0150130 A1 | 6/2007 | Welles | |
| 2007/0194115 A1 | 8/2007 | Logan | |
| 2009/0197228 A1 * | 8/2009 | Afshar | G06Q 10/06 434/219 |
| 2009/0204237 A1 * | 8/2009 | Sustaeta | G05B 13/0285 700/36 |
| 2009/0204245 A1 * | 8/2009 | Sustaeta | G05B 13/024 700/99 |
| 2009/0204267 A1 * | 8/2009 | Sustaeta | G05B 13/0285 700/291 |
| 2009/0210081 A1 * | 8/2009 | Sustaeta | G05B 13/0285 700/99 |
| 2011/0208567 A9 | 8/2011 | Roddy et al. | |
| 2013/0158777 A1 * | 6/2013 | Brauer | G06Q 10/20 701/31.4 |
| 2014/0085086 A1 | 3/2014 | Knapp et al. | |
| 2014/0324276 A1 * | 10/2014 | Weaks | G06Q 10/063 701/31.4 |

FOREIGN PATENT DOCUMENTS

| | | |
|---|---|---|
| EP | 1280119 A1 | 1/2003 |
| GB | 2375407 A | 11/2002 |

OTHER PUBLICATIONS

Electronic FRA Test and Inspection System, General, Overview. 10EAST, Inc. (16 pgs.), 2009.
Personal Mobile Tool. 10EAST, Inc.; www.10EAST.com/index.cgi?sect=personal mobile tool (3 pgs.) Jul. 28, 2003.
Sun Microsystems. Sun's Java 2 Platform, Micro Edition (J2ME) Enables Wireless Phone to Serve as Cost-Effective Input Device for Mobile Task Management Solution. WiredTime.com, 2009.

* cited by examiner

EXPERT COLLABORATION SYSTEM AND METHOD

CROSS-REFERENCE TO RELATED APPLICATIONS

This application claims priority to U.S. Provisional Application No. 61/874,132, which was filed on 5 Sep. 2013, and is titled "Expert Collaboration System And Method," the entire of disclosure of which is incorporated by reference.

FIELD

Embodiments of the subject matter described herein relate to guiding a user through examination and/or repair of one or more components of equipment.

BACKGROUND

Some known systems provide guidance to users during the examination and/or repair of equipment, such as vehicle systems. These systems can provide relatively generic instructional guides that direct the user how to repair or replace parts of the equipment. These guides may be limited to text-based instructions that do not visually instruct the user how to perform the examination and/or repair. Additionally, some of these guides may include directives to the user that result in the user taking relatively unsafe actions. Moreover, these guides typically are provided without regard to how long the repair and/or examination will take, the cost of the repair and/or examination, and the availability of necessary tools or equipment for conducting the repair and/or examination.

BRIEF DESCRIPTION

In one embodiment, a method (e.g., for remotely providing expert assistance) includes receiving first identification information from a first mobile device of a remotely located operator. The first identification information is representative of one or more components of a system. The method also includes communicating the first identification information to one or more expert personnel remotely located from the operator and receiving an expert-identified work scope based on the first identification information that was communicated to the one or more expert personnel. The expert-identified work scope includes a set of guidance information configured to be displayed on the first mobile device in order to guide the operator through one or more of diagnosing, repairing, testing, or replacing the one or more components of the system. The method also can include storing the expert-identified work scope and at least some of the first identification information in one or more memory devices such that the expert-identified work scope is associated with the at least some of the first identification information. The method may further include comparing subsequently received second identification information received from one or more of the first mobile device or a second mobile device with the at least some of the first identification information stored in the one or more memory devices, and automatically selecting and communicating the expert-identified work scope from the one or more memory devices to the at one or more of the first mobile device or the second mobile device based on comparing the second identification information with the at least some of the first identification information.

In another embodiment, a services support system includes an analysis system and one or more memory devices. The analysis system is configured to receive first identification information from a first mobile device of a remotely located operator. The first identification information is representative of one or more components of a system. The analysis system also can be configured to communicate the first identification information to one or more expert personnel remotely located from the operator and to receive an expert-identified work scope based on the first identification information that was communicated to the one or more expert personnel. The expert-identified work scope includes a set of guidance information configured to be displayed on the first mobile device in order to guide the operator through one or more of diagnosing, repairing, testing, or replacing the one or more components of the system. The one or more memory devices are configured to store the expert-identified work scope and at least some of the first identification information such that the expert-identified work scope is associated with the at least some of the first identification information. The analysis system can be configured to compare subsequently received second identification information received from one or more of the first mobile device or a second mobile device with the at least some of the first identification information stored in the one or more memory devices, and to automatically select and communicate the expert-identified work scope from the one or more memory devices to the at one or more of the first mobile device or the second mobile device based on comparing the second identification information with the at least some of the first identification information.

In another embodiment, another method (e.g., for receiving expert assistance) includes receiving identification information from an operator via a mobile device. The first identification information can represent one or more components. The method also can include communicating the identification information to a remotely located analysis system, and receiving an expert-identified work scope based on the identification information that was communicated to the analysis system. The expert-identified work scope includes a set of guidance information configured to be displayed on the first mobile device in order to guide the operator through one or more of diagnosing, repairing, testing, or replacing the one or more components. The method may include displaying the guidance information to the operator via the mobile device during performance of the one or more of diagnosing, repairing, testing, or replacing the one or more components, and communicatively coupling the mobile device with one or more remotely located expert personnel during performance of the one or more of diagnosing, repairing, testing, or replacing the one or more components to allow the one or more remotely located expert personnel to assist the operator with performance of the one or more of diagnosing, repairing, testing, or replacing the one or more components.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein relate to a services support system and method that allows users of mobile devices to remotely obtain assistance from experts with the monitoring, diagnosing, repair, replacement, and the like, of components of equipment (also referred to as assets). Several non-limiting examples are provided herein of the types of assistance that may be obtained by users located remotely from the sources of the assistance (also referred to as an analysis system and/or resources), but not all embodiments are limited to the examples provided herein. At least one technical effect of the subject matter described herein is the safe guidance of a user from a remote location through one or more workflows to repair or replace a component subsystem of equipment in manner that warns the user of unsafe practices and/or situations, while also allowing the user to notify the remote location of one or more unsafe practices or situations involved with performance of the guidance being provided.

At least one technical effect provided by the inventive subject matter described herein includes remotely guiding a user through the examination, repair, and/or replacement of a component subsystem of equipment using instructions presented on a mobile device used by the user. Experts may remotely provide guidance information to the user's mobile device, and can collaborate with the user during the examination, repair, and/or replacement operations, such as by sharing images and/or videos, annotating images, providing documents, changing the information that is provided to the user during the examination, repair, and/or replacement operations, and the like. Similarly, the mobile device user may send data, image, audio or video information from the mobile device to the one or more persons for their evaluation. That transmitted information may be used by the expert to select which subset of guidance information to update to the mobile device.

Figure 1:
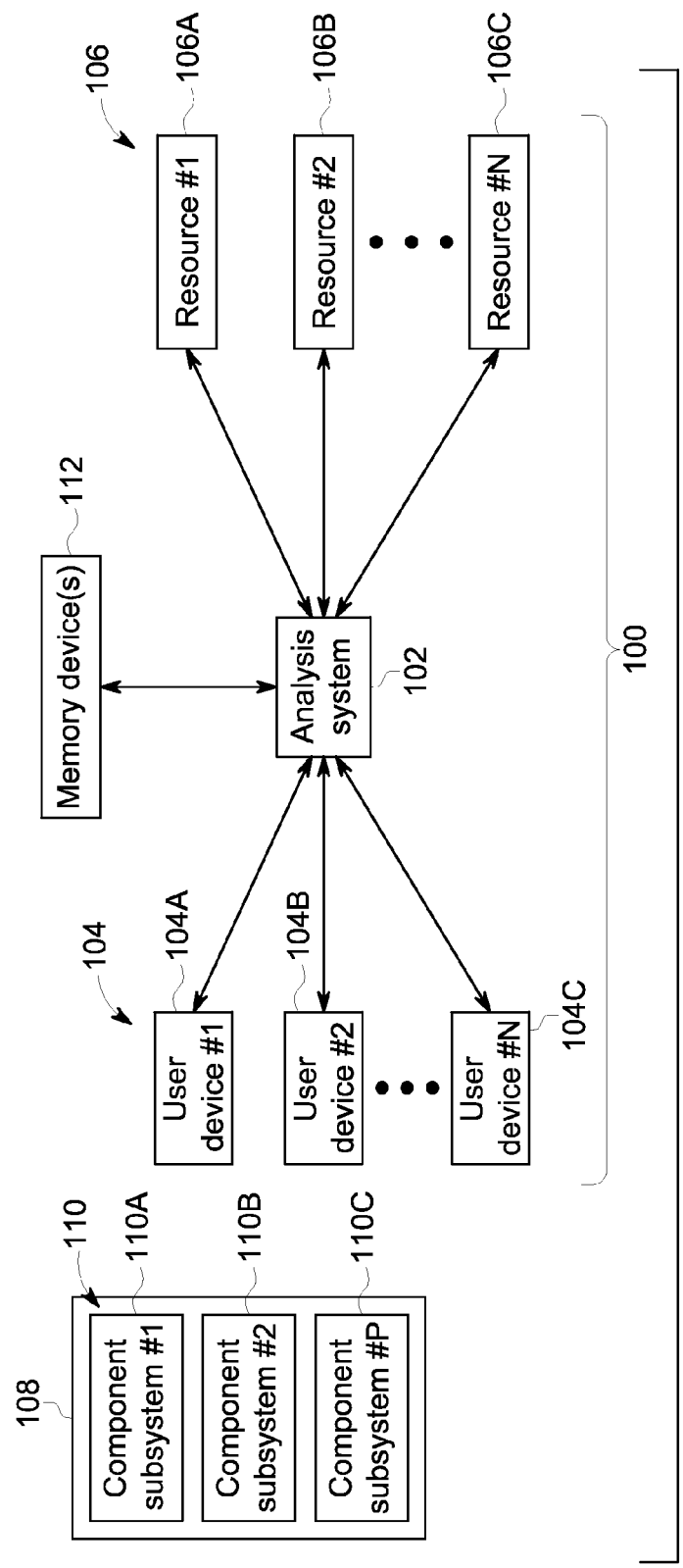
FIG. 1 is a schematic diagram of an embodiment of a services support system.

FIG. 1 is a schematic diagram of an embodiment of a services support system 100. The support system 100 allows one or more users to obtain assistance from one or more remotely located resources to repair, replace, diagnose, and the like, component subsystems of equipment on which the users are working or near. These resources can include persons who are skilled in the examination, repairing, replacement, diagnosis, and the like, of the component subsystems and/or equipment. For example, these persons may have more skill, experience, instruction, education, and the like, in the component subsystems and/or equipment than the users of the support system 100. These persons having more skill, experience, instruction, education, and the like, than users of the system 100 may be referred to as experts and/or technicians having particularized skill in the component subsystems and/or equipment. These persons having more skill, experience, instruction, education, and the like, than users of the system 100 are collectively referred to herein as "experts." Other examples of resources can include replacement parts, equipment to be used during diagnosing, repairing, testing, and/or replacing of the one or more components, a technician, or a facility to be used during the diagnosing, repairing, testing, and/or replacing of the one or more components, or the like.

In the illustrated example, the support system 100 includes an analysis system 102 that provides an interface between user devices 104 (e.g., user devices 104A-C) and one or more remotely located resources 106 (e.g., resources or resource devices 106A-C). Although only three user devices 104 and three resources 106 are shown in FIG. 1, a lesser or larger number of user devices 104 and/or resources 106 may be provided, including a single user device 104 and/or a single resource 106. The analysis system 102, user devices 104, and/or resources 106 can represent one or more processors, controllers, computer systems (e.g., two or more networked computers), or other logic-based devices (referred to herein as processing devices) that perform the operations described herein. In one aspect, one or more of these processing devices may be an off-the-shelf hardware computer product that operates according to one or more sets of instructions (e.g., software systems or applications) stored on a tangible and non-transitory medium, such as a computer hard drive, ROM, RAM, EEPROM, or the like. The operations described herein may be encoded into the sets of instructions by a computer software programmer. Optionally, one or more of these processing devices may be a hardware computer product that is hard-wired with these sets of instructions. For example, the operations described herein may be hard-wired into the logic of the processing devices when the processing devices are manufactured.

In one aspect, the resources 106 represent the computer devices and/or systems used by the experts to communicate with the analysis system 102 and the user devices 104, such as laptops, tablet computers, mobile phones, desktop computers, or the like. The user devices 104 can be mobile devices, such as handheld devices that can be relatively easily moved by an average human being without the aid of machines. For example, the user devices 104 can represent mobile phones, tablet computers, laptop computers, and the like. The user devices 104 may be used by one or more human users (also referred to as operators) to obtain guidance from the experts in the diagnosing of one or more causes of problems (e.g., faults) of equipment 108, as well as in the repair and/or replacement of one or more component subsystems 110 (e.g., subsystems 110A-C) of the equipment 108.

The equipment 108 can represent a variety of assets being examined, repaired, and/or maintained by the users, such as a vehicle (e.g., a rail vehicle, another off-highway vehicle that is not designed or permitted for travel on public roads, an automobile, a marine vessel, or the like), a stationary power-generating system (e.g., an engine, a generator, an alternator, or the like), or another machine or system. The equipment 108 includes several component subsystems 110 that perform various functions for operation of the equipment 108. With respect to vehicles, the subsystems 110 can include engines, motors, turbochargers, filters, cooling systems, wheels, brakes, or the like. Optionally, the subsystems 110 can include one or more other components. Although the equipment 108 is shown as including only three subsystems 110, the equipment 108 can include a different number of subsystems 110, including a single subsystem 110.

In operation, one or more users that are located at or near the equipment 108 can examine the equipment 108 for one or more problems or potential faults with the equipment 108. These problems and/or faults may be manually obtained by the users measuring one or more parameters of the component subsystems 110 (e.g., outputs, dimensions, temperatures, speeds, or the like). Additionally or alternatively, one or more of these problems and/or faults may be automatically measured by one or more sensors of the equipment 108 and reported to the users and/or the user devices 104 (e.g., by display on a display screen of the equipment 108, via one or more wired and/or wired connections between the equipment 108 and/or the user devices 104, or the like). The users also may obtain assistance from one or more remotely located experts as the resources 106 in the examination and/or diagnosing of faults with the component subsystems 110 and/or equipment 108.

The user devices 104 provide user interfaces in order to allow information about the equipment 108 and/or component subsystems 110 to be input into the user devices 104. This information may be manually input by the users of the devices 104 and/or automatically obtained from the equipment 108. The user devices 104 may be used to input identification information about the component subsystem 110 and/or equipment 108 in order to assist in the identification of a potential problem (e.g., fault) with the component subsystem 110 and/or equipment 108, to select a recommended work scope to use in examining and/or resolving (e.g., fixing) the potential problem, to inspect the component subsystem 110 and/or equipment 108 after performing a recommended work scope, and the like.

Figure 2:
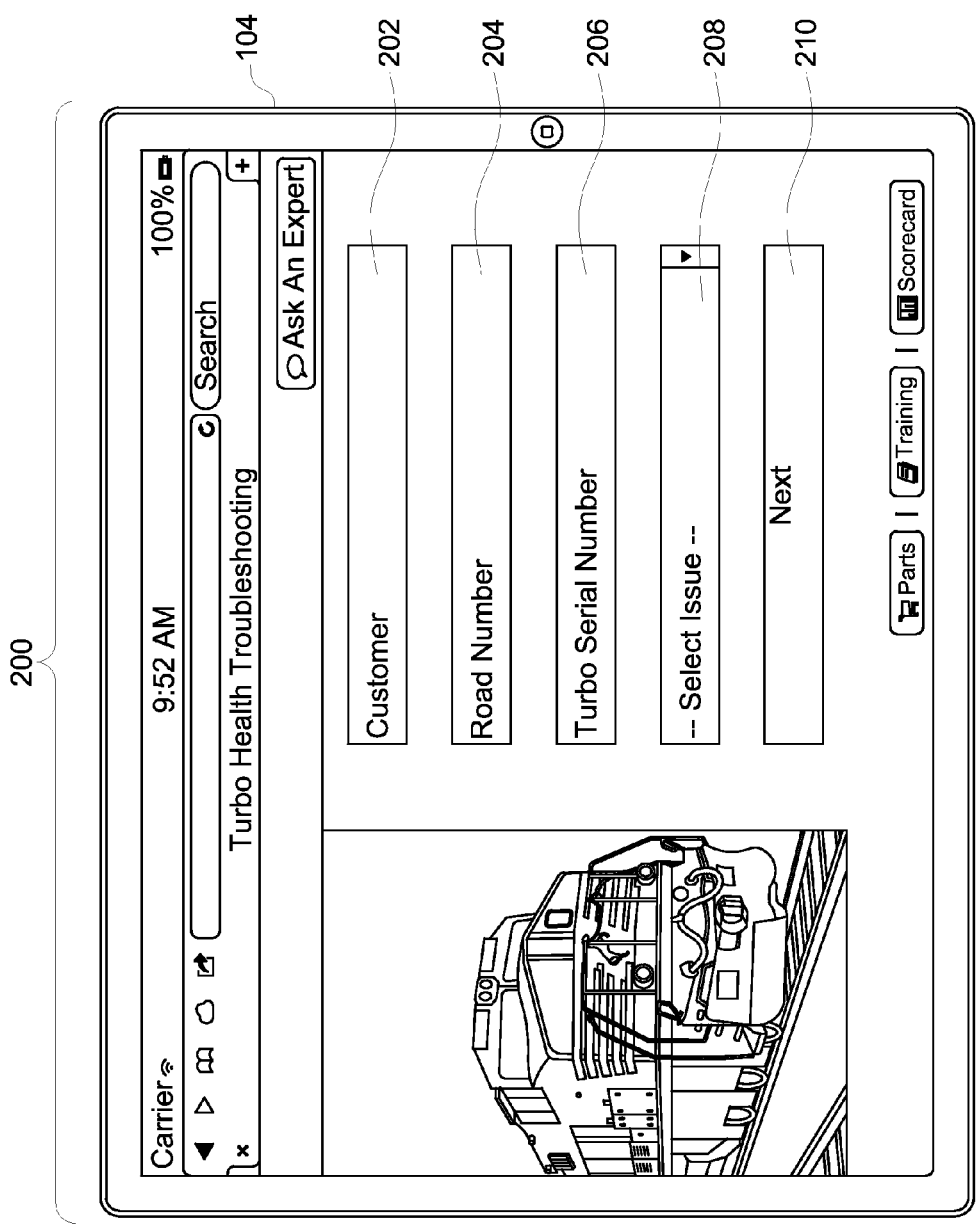
FIG. 2 illustrates an example of a user interface displayed by one or more user devices shown in FIG. 1.

FIG. 2 illustrates an example of a user interface 200 displayed by the user devices 104. The user interface 200 can represent a set of graphic elements that is displayed on a screen of the user device 104, such as on a touchscreen, computer monitor, or the like. The user interface 200 includes several input windows 202, 204, 206, 208 for receiving identification information from the user and/or equipment. While the user interface 200 represents an input screen that receives information about a locomotive, optionally, the interface 200 may receive other information and/or information about equipment 108 other than a locomotive. While four input windows 202, 204, 206, 208 are shown, a lesser or larger number of windows 202, 204, 206, 208 may be used, and/or the windows 202, 204, 206, 208 may be used to receive other information that what is described herein. The identification information includes information or data representative of the user, the equipment 108, the component subsystem 110, a potential problem identified for the equipment 108 and/or subsystem 110, or other information indicative of a potential problem or fault that is being examined.

The input window 202 can be used to input identification information that represents the user, the owner of the equipment 108 and/or component subsystem 110 that is being examined, repaired, and/or replaced, the manufacturer of the equipment 108 and/or subsystem 110, or other identifying information. For example, the user may enter customer identification information in the window 202 that represents the company that owns the equipment 108 and/or component subsystem 110. The information that is input into the window 202 may be manually input by the user and/or automatically input, such as by one or more sensors or other devices (e.g., transponder, bar code reader, or the like). This information can be used by the analysis system 102 to narrow down the potential faults of the equipment 108 and/or component subsystems 110 and/or the potential solutions to fixing these potential faults from a larger corpus of potential faults and/or solutions, as described below.

The input window 204 can be used to input identification information that represents the equipment 108 that is being examined, repaired, and/or replaced, or that includes the component subsystem 110 being examined, repaired, and/or replaced. For example, the user may enter a serial number or other data that identifies the type, name, year of manufacture, or the like, of the equipment 108. The information that is input into the window 204 may be manually input by the user and/or automatically input, such as by one or more sensors or other devices (e.g., transponder, bar code reader, or the like). This information can be used by the analysis system 102 to narrow down the potential faults of the equipment 108 and/or component subsystems 110 and/or the potential solutions to fixing these potential faults from a larger corpus of potential faults and/or solutions, as described below. For example, the types of faults and/or solutions that may be applicable to one type of equipment 108 may not be applicable to another type of equipment 108. The non-applicable faults and/or solutions may be eliminated as possibilities for use in examining, repairing, and/or replacing one or more component subsystems 110 of the equipment 108.

The input window 206 can be used to input identification information that represents the component subsystem 110 that is being examined, repaired, and/or replaced. For example, the user may enter a serial number or other data that identifies the type, name, year of manufacture, or the like, of the subsystem 110. The information that is input into the window 206 may be manually input by the user and/or automatically input, such as by one or more sensors or other devices (e.g., transponder, bar code reader, or the like). This information can be used by the analysis system 102 to narrow down the potential faults of the component subsystems 110 and/or the potential solutions to fixing these potential faults from a larger corpus of potential faults and/or solutions, as described below. For example, the types of faults and/or solutions that may be applicable to one type of component subsystem 110 may not be applicable to another type of subsystem 110. The non-applicable faults and/or solutions may be eliminated as possibilities for use in examining, repairing, and/or replacing one or more component subsystems 110 of the equipment 108.

After entering some or all of this identification information, the user may select a progression icon 210 on the user interface 200. Selection of this icon 210 may inform the user device 104 that the identification information has been provided. Optionally, the user device 104 may automatically determine when the identification information is received.

In response to receiving at least some of this identification information into the user device 104 via the user interface 200, at least one of the user device 104 and/or the analysis system 102 identifies one or more potential problems (e.g., faults) with the equipment 108 and/or component subsystem 110 that is identified by or associated with the identification information. For example, one or more memory devices 112 (shown in FIG. 1) that are accessible to the user device 104 and/or the analysis system 102 may store lists, tables, databases, or other memory structures that group or otherwise associate potential problems with various equipment 108 and/or component subsystems 110. The memory device(s) 112 may include computer hard drives, flash drives, ROM, RAM, removable drives, EEPROM, or the like, that is disposed within or otherwise coupled with the user device 104 and/or analysis system 102, and/or that is remote from (e.g., not connected to or included within) the user device 104 and/or the analysis system 102.

The memory devices 112 can associate different groups of potential problems with different equipment 108 and/or component subsystems 110. For example, a first locomotive having a first road number may be associated with a first group of potential problems that have occurred with that locomotive and/or similar locomotives, while a different, second locomotive having a different, second road number may be associated with a different, second group of potential problems that have occurred with that locomotive and/or similar locomotives.

Using the associations between different equipment 108 and/or subsystems 110 and the different groups of potential problems, the user device 104 can present a list of potential problems to the user on the user interface 200. For example, the user device 104 can communicate the identification information to the analysis system 102 and the analysis subsystem 102 can examine the memory devices 112 to determine what group of potential problems are associated with the equipment 108 and/or component subsystem 110 identified by the identification information. As another example, the user device 104 can examine the memory devices 112 to determine what group of potential problems are associated with the equipment 108 and/or component subsystem 110 identified by the identification information.

Figure 3:
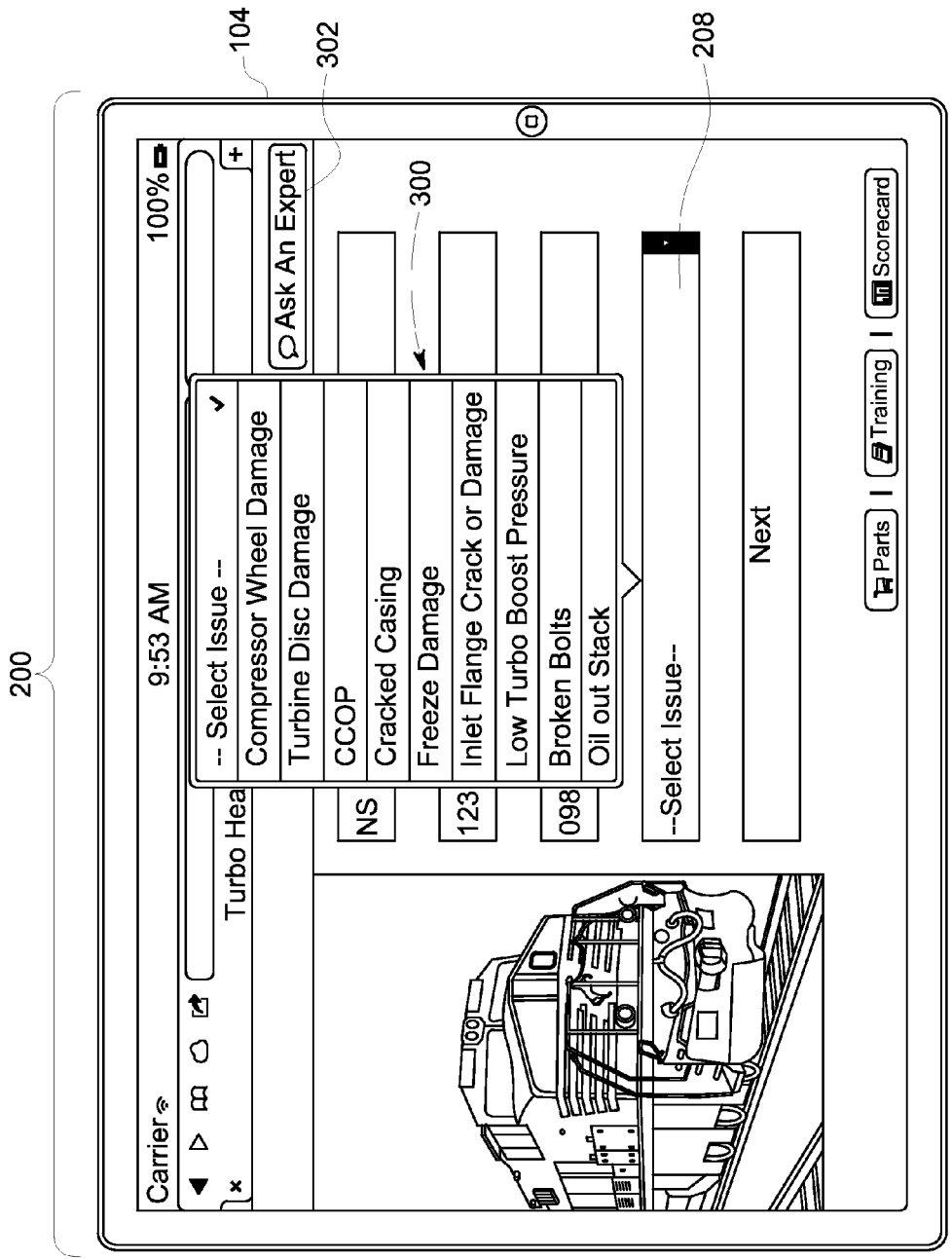
FIG. 3 illustrates another example of a user interface that can be displayed by the user devices.

FIG. 3 illustrates another example of the user interface 200 displayed by the user devices 104. Responsive to receiving the identification information, a group of one or more potential problems associated with the equipment 108 and/or component subsystem 110 under examination may be presented on the user device 104. In the illustrated example, a list 300 of user-selectable potential problems is displayed as emanating from the window 208. Optionally, the potential problems may be presented in another manner. The list 300 shown in FIG. 3 includes several potential problems associated with a rail vehicle, such as a locomotive. If other identification information had been provided, then another list of potential problems may be displayed. The user can select one or more of these potential problems in the list 300, such as by pressing the touchscreen or using a stylus, electronic mouse, or the like, to select one or more potential problems of the component subsystem 110 and/or equipment 108.

The selected potential problem is used by the user device 104 and/or analysis system 102 to identify one or more recommended work scopes for examining, repairing, or replacing one or more component subsystems 110 of the equipment 108. The work scope also may be referred to as a workflow, and can include a set (e.g., a series) of actions that are to be performed in the examination, repair, and/or replacing of one or more parts, component subsystems 110, and/or the equipment 108.

Figure 4:
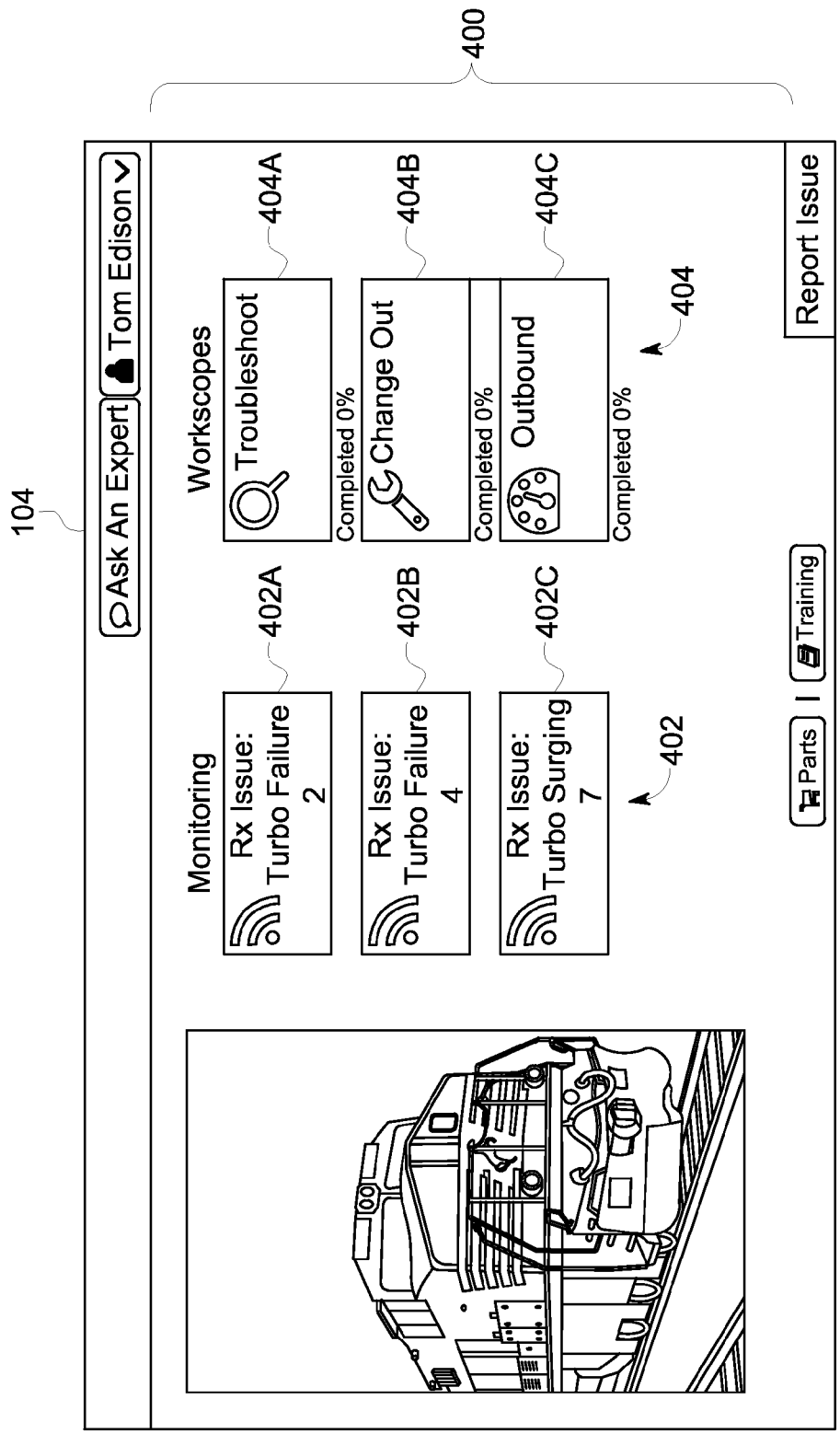
FIG. 4 illustrates another example of a user interface that may be presented on the user device.

FIG. 4 illustrates another example of a user interface 400 that may be presented on the user device 104. The user interface 400 may be displayed responsive to the user selecting the one or more potential problems of the component subsystem 110 and/or equipment 108, as described above.

The user interface 400 displays one or more monitoring icons 402 (e.g., icons 402A-C) and/or one or more work scope icons 404 (e.g., icons 404A-C). The number of icons 402 and/or icons 404 is merely one example as a larger or smaller number of the icon 402 and/or the icon 404 may be displayed.

The monitoring icons 402 may be selected by the user (e.g., by touching, "clicking," and so on, the icons 402 on the user device 104) to cause data from or about the component subsystem 110 and/or equipment 108 to be communicated to the user device 104, the analysis system 102, and/or one or more of the resources 106. Sensors may be connected with or disposed relatively near the component subsystem 110 and/or the equipment 108 being examined. Selecting one or more of the monitoring icons 402 can cause the sensors associated with measuring data about the component subsystem 110 and/or the equipment 108 related to the respective icon 402 to communicate data to the user device 104, the analysis system 102, and/or one or more of the resources 106.

In the illustrated example, the monitoring icon 402A may be selected to cause a designated group of sensors associated with a first potential cause of failure (e.g., failure of a turbocharger) to obtain data. These sensors may include pressure sensors to measure exhaust pressure in the turbocharger, flow rate sensors to measure the flow of exhaust through the turbocharger, or the like. The monitoring icon 402B may be selected to cause a different designated group of sensors associated with a different second potential cause of failure (e.g., failure of the same turbocharger) to obtain data. The monitoring icon 402C may be selected to cause a designated group of sensors associated with a potential cause of a designated performance (e.g., surging of a turbocharger) to obtain data. The sensors included in these groups may be the same or different for two or more of the icons 402.

The data that is obtained from the sensors can be communicated to the analysis system 102 and/or the resources 106 to identify a potential problem of the component subsystem 110 and/or equipment 108. By way of example, this data may include, but is not limited in all embodiments to, temperatures, pressures, speeds, horsepower, voltage, amperes, and the like, of the equipment 108 and/or component subsystems 110. The analysis system 102 and/or the resources 106 may examine the sensor data to predict a potential problem of the equipment 108 and/or component subsystems 110. For example, the analysis system 102 may examine the sensor data to determine if the data exceeds or falls below thresholds, exhibits trends, or otherwise indicates a potential fault. This potential fault may be automatically presented to the user on the user device 104 and/or may be automatically selected as a user selected potential problem. Alternatively, the sensor data may be examined by the user device 104 to identify the potential problem.

In one aspect, the user device 104 and/or analysis system 102 may diagnose faults to identify potential problems with the equipment 108 and/or component subsystems 110 using one or more embodiments of the subject matter described in U.S. Pat. No. 5,845,272, which is entitled "System And Method For Isolating Failures In A Locomotive," (referred to herein as the "'272 patent"), the entire disclosure of which is incorporated herein by reference. For example, one or more systems and methods of the '272 patent that are used for isolating failures in equipment, such as a locomotive, may be used to identify a cause of failures occurring in the equipment and/or component subsystems of the equipment with incorporating information provided by an operator (e.g., the user of the user device 104) to produce a diagnosis of the failures. One or more of the user device 104 and/or the analysis system 102 may include the fault isolator described in the '272 patent for diagnosis. This fault isolator can use a diagnostic knowledge base stored in the memory device 112 to produce a list of the most likely causes for a failure. This list may represent the list 300 shown in FIG. 3.

In one aspect, experts may examine the identification information and identify the potential problem(s) of the component subsystem 110 and/or equipment 108. The resources 106 may receive the identification information directly from the user devices 104 and/or via the analysis system 102 and present this identification information to the experts. The experts may then analyze the identification information and, using their expertise, identify one or more potential problems based on this information. For example, the experts may use one or more embodiments described in U.S. Pat. No. 6,959,235, entitled "Diagnosis And Repair System And Method," to identify potential problems (and/or repairs, as described below). The entire disclosure of U.S. Pat. No. 6,959,235 is incorporated by reference.

The identification of a potential problem by an expert may be stored and used to improve the functionality of the analysis system 102 in automatically identifying future potential problems. For example, once the expert has identified a problem using the identification information provided by the user device 104, the analysis system 102 may store the expert-identified problem in the memory device 112 such that the problem is associated with at least some of the identification information. Then, during a later input of identification information by the same or different user using the same or different user device 104, the analysis system 102 can compare the newly input identification information with the identification information previously used by the expert to identify the potential problem (and stored in the memory device 112). If the analysis system 102 determines that the newly input identification information matches the identification information previously used by an expert to identify a problem (or matches the previously used identification information more closely than one or more other identification information associated with other problems), then the analysis system 102 may suggest the expert-identified problem to the user on the user device 104. The user may then select this expert-identified problem.

Optionally, the embodiments described in connection with one or more other patents owned by the applicant of this application (General Electric Co.) may be used to monitor performance of the equipment 108 and/or component subsystems 110, and/or to diagnose or predict potential problems (e.g., causes of faults in the performance of the equipment 108 and/or subsystems 110 that may be provided in the list 300). These patents include, but are not limited to, U.S. Pat. No. 6,175,934, entitled "Method And Apparatus For Enhanced Service Quality Through Remote Diagnostics," U.S. Pat. No. 6,959,235, entitled "Diagnosis And Repair System And Method," U.S. Pat. No. 6,343,236, entitled "Method And System For Analyzing Fault Log Data For Diagnostics," U.S. Pat. No. 6,415,395, entitled "Method And System For Processing Repair Data And Fault Log Data To Facilitate Diagnostics," U.S. Pat. No. 6,246,950, entitled "Method And Apparatus For Performance Based Assessment Of Locomotive Diesel Engines," U.S. Pat. No. 6,634,000, entitled "Method And System For Analyzing Fault Logs And Continuous Data For Diagnostics," U.S. Pat. No. 6,795,935, entitled "Method For Diagnosing Failures Using Fault Log And Maintenance Data," U.S. Pat. No. 6,681,215, entitled "Learning Method And Apparatus For A Causal Network," U.S. Pat. No. 6,981,182, entitled "Diagnostic Tool Using Combination Of Case Based Reasoning On Fault Data," U.S. Patent Application Publication No. 2011/0208567, entitled "System And Method For Leveraging Machine Usage Statistics For The Profiling And Diagnosis Of Machine Failure," U.S. Pat. No. 7,100,084, "Method And Apparatus For Diagnosing Difficult To Diagnose Faults In A Complex System," U.S. Pat. No. 6,988,011, "Method And System For Analyzing Continuous Data For Diagnostics And Repair," and/or U.S. patent application Ser. Nos. 13/234,881; 13/558,435; 61/704,691; 61/704,691; 13/866,471; 13/866,435. The entire disclosures of these patents and applications are incorporated by reference. Embodiments of one or more of these patents and/or applications may be used to identify (e.g., diagnose) a potential problem (e.g., failure) based on information provided by a user through the user device 104, information received by sensors operably connected with the equipment 108 and/or component subsystems 110 to measure performance of the same, information received from the equipment 108 and/or component subsystems 110 (e.g., outputs of the equipment 108 and/or subsystems 110), or the like. These potential problems can be presented to the user for selection in the list 300 or may automatically selected by the user device 104 and/or analysis system 102 based on the identification information received via the user device 104.

The memory device 112 may include recommended work scopes associated with the potential problem selected by the user and/or identified using the sensor data. Once a potential problem is selected or identified, the analysis system 102 and/or resources 106 may identify one or more work scopes that are recommended for addressing (e.g., fixing) the potential problem. These identified work scopes are communicated to the user device 104 (or pointers to the work scopes in the memory device 112 are sent to the user device 104, which may obtain the work scopes from the memory device 112).

The work scopes include a recommended series of one or more actions to perform on or with the equipment 108 and/or component subsystem 110 in order to further examine, maintain, repair, or replace the equipment 108 and/or component subsystem 110 of the equipment 108 that is associated with the selected problem.

The recommended work scope may be selected by the analysis system 102 and/or user device 104 from plural different work scopes stored in the memory device 112. The selected work scope may be identified from a larger group of potential work scopes using the selected potential problem and/or at least some of the identification information provided by the user device 104. For example, the memory device 112 may store a corpus of work scopes that are each associated with various potential problems and different types of identification information. The work scope that is recommended to the user may be selected from this corpus.

In one aspect, the user may select an expert assistance icon 302 (or other area on the interface presented on the user device 104) presented on one or more of the user interfaces described herein to obtain guidance from one or more of the remotely located experts at the resources 106. Selecting this expert assistance icon 302 causes the user device 104 to communicate a signal that requests an expert communicate with the user device 104. If the icon 302 is selected on the user interface that lists the potential problems, the expert may communicate with the user via the user device 104 and the corresponding resource 106 to assist in identifying which problem to select from the presented list.

In one example, for a first type of equipment 108 (e.g., a locomotive) having a first type of component subsystem 110 (e.g., a turbocharger provided from a first entity) and a first potential problem identified by the user, one or more first work scopes may be stored in the memory device 112. The same type of equipment (e.g., a locomotive) having a different, second type of component subsystem 110 (e.g., a turbocharger provided from an entity other than the first entity) and the same first potential problem may one or more different, second work scopes stored in the memory device 112. If the information that is input into the user device 104 more closely matches the identification information associated with the one or more second work scopes than the one or more first work scopes, then the recommended work scope may include or be selected from the one or more second work scopes.

As another example, the analysis system 102 can examine user-selected faults (e.g., problems) and/or sensor data of the equipment 108 and/or component subsystems 110 over a wired and/or wireless connection (e.g., the Internet, an internet, or another network) to identify a repair that is likely to be successful in curing the selected faults, as is described in U.S. Pat. No. 6,725,398, which is entitled "Method, System, And Program Product For Analyzing A Fault Log Of A Malfunctioning Machine" and the entire disclosure of which is incorporated by reference. The analysis system 102 and/or the user device 104 can identify the work scope likely to fix the selected problem using one or more of the embodiments described in U.S. Pat. No. 6,625,589, which is entitled "Method For Adaptive Threshold Computation For Time And Frequency Based Anomalous Feature Identification In Fault Log Data," and the entire disclosure of which is incorporated by reference.

Optionally, plural recommended work scopes may be identified using the identification information and/or selected problem received from the user device 104. Two or more work scopes stored in the memory device 112 may be associated with the same potential problem and identification information that is selected using the user device 104, as described above. As one example, if the potential problem that is selected by the user is "low turbo boost pressure" (e.g., the turbocharger is producing a smaller pressure increase than expected), then the analysis system 102 and/or user device 104 may determine that two or more recommended work scopes are associated with this potential problem (and/or with the identified type of equipment 110, component subsystem 108, and/or other identification information). One recommended work scope may involve further examination of the turbocharger, another recommended work scope may involve further examination of the engine having exhaust that travels through the turbocharger, another recommended work scope may involve replacing one or more parts of the turbocharger, another recommended work scope may involve replacing the entire turbocharger, and the like.

In one aspect, the multiple work scopes that are associated with the selected potential problem and/or the identification information provided by the user device 104 may be presented to the user. For example, the analysis system 102 may direct the user device 104 to display a list, menu, or other arrangement of the several work scopes associated with the potential problem and input information. The user may then select which of these work scopes to perform, such as by touching the touch screen of the user device 104 and/or using another input device (e.g., a stylus, keyboard, microphone, or the like) that can be used with the user device 104.

Additionally or alternatively, these multiple work scopes may be presented (e.g., displayed) on the user device 104 along with selection impact notifications for one or more, or each, of the work scopes. These notifications may instruct the user of the potential effect of selecting one work scope over another work scope. For example, the selection impact notification for each (or one or more of, but not all) of the multiple work scopes may include an estimated time to complete the respective work scope and/or an estimated cost to complete the respective work scope. The user may view these estimated times and/or costs and select a work scope using the estimated times and/or costs.

The estimated times and/or costs may be determined by the analysis system 102. The analysis system 102 may maintain a historical log of one or more previous uses (e.g., performances) of the various work scopes of various types of equipment 110 and/or component subsystems 108. This log may include indications of how long it previously took to complete the work scopes and/or the cost involved in completing the work scopes. Additionally or alternatively, the estimated completion times and/or costs may be based on heuristic determinations by human users. The estimated completion times and/or costs may be varied based on the availabilities of various resources 106. The resources 106 shown in FIG. 1 may represent human technicians having various skill sets needed or required to perform one or more actions in a work scope, tools or other equipment needed or required to perform one or more actions in the work scope, replacement parts needed or required to perform one or more actions in the work scope, and the like. The analysis system 102 can track the availabilities of these resources 106 (as described below) and, based on these availabilities, change the estimated completion times and/or costs. For example, as the availability of a needed resource 106 decreases, the estimated time and/or cost may increase. Conversely, as the availability increases, the estimated time and/or cost may not change or may decrease.

Another example of a selection impact notification that may be provided alongside or along with each of (or one or more of) the plural recommended work scopes may be an estimated service life. The estimated service life represents an additional amount of time that the equipment 108 and/or component subsystem 110 is expected to perform at or above one or more designated thresholds (e.g., of outputs of the equipment 108 and/or component subsystem 110) if the recommended work scope that is associated with the estimated service life is completed. For example, a first recommended work scope may involve cleaning a manifold of an exhaust system, a second recommended work scope (for the same selected problem) may involve replacing a filter of the exhaust system, and a third recommended work scope (for the same selected problem) may involve replacing the manifold of the exhaust system. The estimated service life for the third recommended work scope may be longer than the estimated service life for the first and second recommended work scopes because the third recommended work scope replaces a potentially broken or worn down part of the exhaust system. But, this third recommended work scope also may be associated with additional selection impact notifications that indicate longer estimated completion times and/or costs than the first and second recommended work scopes. The user may examine the selection impact notifications and use these notifications to select which work scope should be performed to fix the selected problem.

The estimated service lives may be determined by the analysis system 102. The analysis system 102 may maintain a historical log of one or more previous uses (e.g., performances) of the various work scopes of various types of equipment 108 and/or component subsystems 110. This log may include indications of how long the equipment 108 and/or component subsystems 110 continued to operate at or above one or more performance thresholds following performance of the work scope (e.g., the service lives). Additionally or alternatively, the estimated completion times and/or costs may be based on heuristic determinations by human users.

In one aspect, one or more of the resources 106 may represent a human that reviewed a recommended work scope selected by the analysis system 102 before the recommended work scope of sent to the user device 104. For example, the human may be a skilled technician or expert in the equipment 108 and/or component subsystem 110 being serviced by the user of the user device 104. The analysis system 102 may identify one or more recommended work scopes based on the information provided by the user device 104, as described above.

In one aspect, one or more of the experts may receive one or more recommended work scopes from the analysis system 102 based on the identification information received from the user device 104. Before sending these one or more recommended work scopes to the user device 104, however, the analysis system 102 may send the recommended work scopes to the resources 106 being used by the experts. The experts may review the recommended work scopes provided by the analysis system 102 and approve (e.g., select) one or more, or all, of these work scopes to be sent to the user device 104. The experts may use their knowledge and experience to select a work scope that is better or best suited for the particular problem identified by the user device 104, for example. One example of such an expert review of a recommended repair process that can be used in one or more embodiments described herein is provided in U.S. Pat. No. 6,651,034, entitled "Apparatus And Method For Performance And Fault Log Analysis," the entire disclosure of which is incorporated by reference. Additional examples of determining and/or providing recommended repair processes can be found in U.S. Pat. Nos. 7,209,817 and 6,959,235, both entitled "Diagnosis And Repair System And Method," and U.S. Pat. No. 6,950,829, entitled "Method For Training Service Personnel To Service Selected Equipment," the entire disclosures of which are incorporated by reference.

In the example illustrated in FIG. 4, the user device 104 displays three work scope icons 404 to the user, although another number of work scope icon(s) may be displayed. The icon 404A represents a troubleshooting work scope. Selection of this icon 404A will cause the user device 104 to present a work scope to the user that guides the user through several actions that examine operations of the component subsystem 110 and/or equipment 108 prior to repair or replacement of the subsystem 110, equipment 108, or parts thereof. These actions may obtain additional data and/or information to allow the user, the user device 104, the analysis system 102, and/or the resources 106 to further identify problems and/or faults in the component subsystem 110 and/or equipment 108.

The icon 404B represents a change out work scope. Selection of this icon 404B will cause the user device 104 to present a work scope to the user that guides the user through several actions that repair or replace the component subsystem 110 and/or equipment 108, and/or repair or replace one or more parts of the subsystem 110 and/or equipment 108.

The icon 404C represents an outbound checkup work scope. Selection of this icon 404C will cause the user device 104 to present a work scope to the user that guides the user through several actions that examine operations of the component subsystem 110 and/or equipment 108 after repair or replacement of the subsystem 110, equipment 108, or parts thereof. These actions may obtain data and/or information to allow the user, the user device 104, the analysis system 102, and/or the resources 106 to assess performance of the component subsystem 110 and/or equipment 108 and to determine if the repair or replacement of the subsystem 110, equipment 108, or parts thereof was successful.

Figure 5:
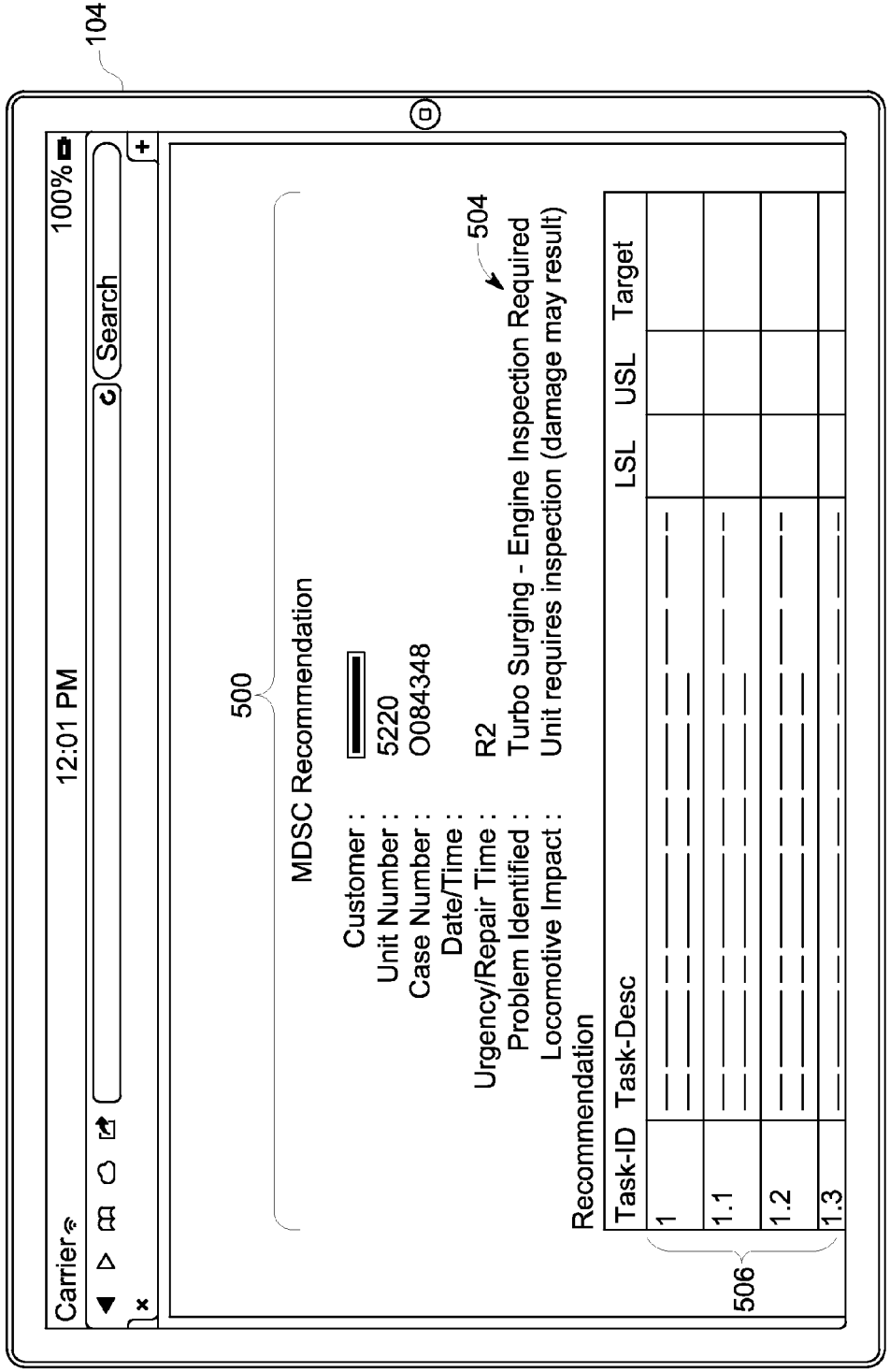
FIG. 5 illustrates an example of a recommended work scope that may be displayed on the user device.

FIG. 5 illustrates an example of a recommended work scope 500 that may be displayed on the user device 104. The recommended work scope 500 can be used to direct the user on how to fix or further examine a selected problem 504 of the equipment 108 and/or component subsystem 110. In the illustrated example, the work scope 500 is a text-based Monitoring and Diagnostics Service Center (MDSC) recommendation that includes several actions 506 (e.g., operations, steps, or the like) to be sequentially performed in order to further examine, repair, and/or replace the equipment 108 and/or component subsystem 110 associated with the selected problem 504. Alternatively, the work scope 500 can include another type of recommendation to remedy the selected problem 504. The selected problem 504 used in the illustrated example is a turbocharger that is surging. As a solution to this problem, the work scope 500 recommends performing the listed actions 506 to perform an inspection of an engine of the equipment 108.

Additionally or alternatively, the recommended work scope 500 that is provided to the user via the user device 104 includes one or more non-textual instructional representations displayed on the user device 104 (or another display device at or near the equipment 108 and/or component subsystem 110) that guide the user through the actions 506 of the recommended work scope 500. These non-textual instructional representations may include images (e.g., schematic diagrams, photographs, drawings, static or non-moving two dimensional images, static three dimensional images, or the like), videos (e.g., moving images), sounds (e.g., a recording of spoken instructions for performing the recommended actions 506, examples of sounds that the user should expect to hear and/or not expect to hear when performing the recommended actions 506, or the like), and/or other instructions that are not represented by text. In one example, a three-dimensional image of one or more parts or component subsystems 110 of the equipment 108 may be displayed on the user device 104 and may be manipulated by the user of the device 104. For example, the user may touch the user device 104 with his or her finger and slide the finger across the user device 104 to rotate, pivot, zoom, pan, or otherwise change the view of the image that is shown on the user device 104. Multiple viewpoints of the same image may be provided to the user on the user device 104. The user may select or alternate between which of these viewpoints are presented on the user device 104 so that the user defines the perspective of the image.

Figure 6:
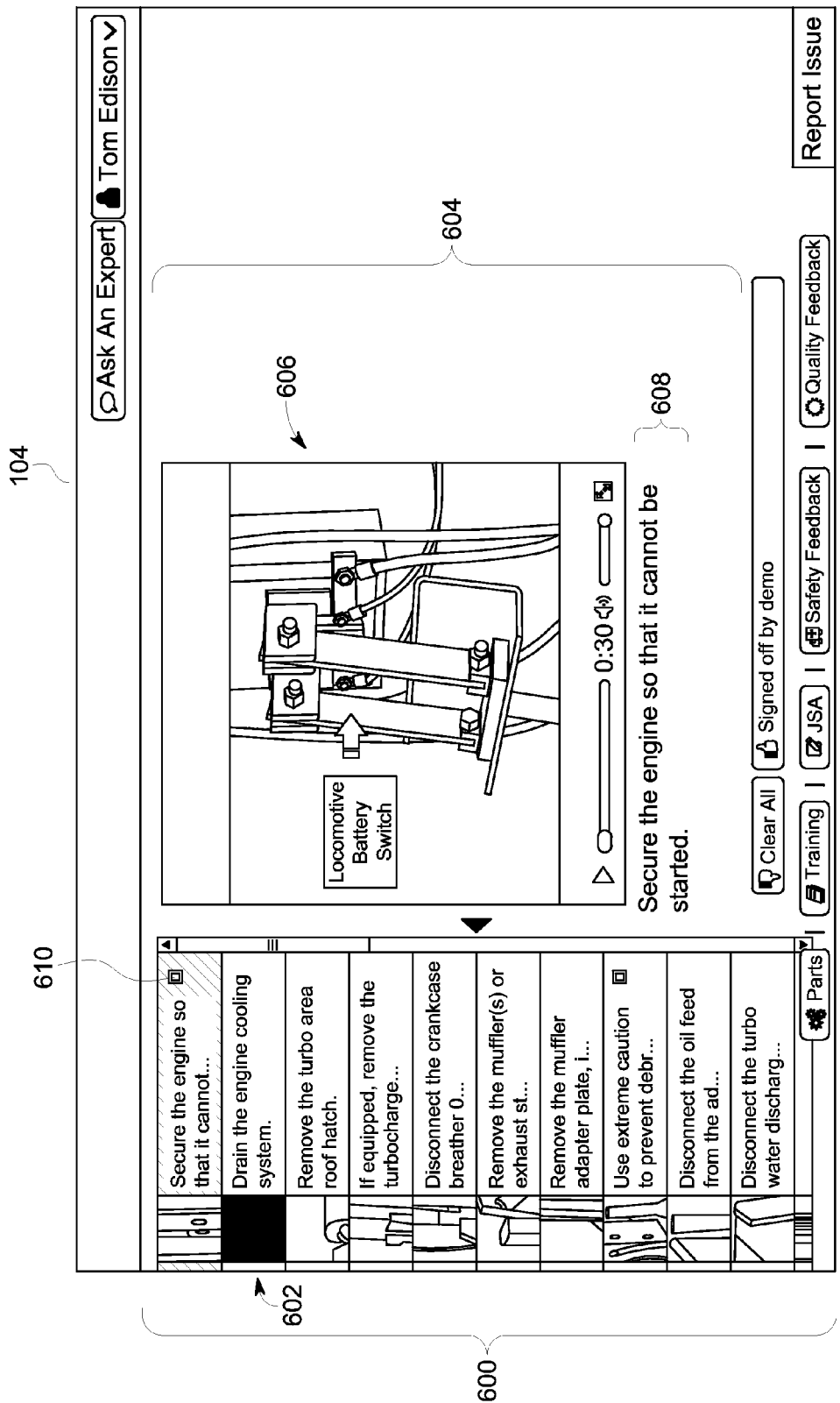
FIG. 6 illustrates another example of a recommended work scope that may be displayed on the user device.

FIG. 6 illustrates another example of a recommended work scope 600 that may be displayed on the user device 104. The recommended work scope 600 can be used to direct the user on how to further examine or fix a problem or fault of the equipment 108 and/or component subsystem 110. In the illustrated example, the work scope 600 is a text- and image-based work scope that includes several actions 602 to be performed in completing the work scope 600. Although ten actions 602 are visible in FIG. 6, another number of action(s) 602 may be provided.

The user may select one or more of the actions 602 to perform. When an action 602 is selected, an instructional representation or display 604 is presented on the user device 104. In the illustrated example, the instructional representation 604 includes both an image 606 and text 608 that advises or guides the user through the selected action 602. The image 606 may be a static image or a video (as shown in FIG. 6). Selection of another action 602 can result in a different image 606 and/or text 608 being displayed in the instructional representation 604.

The user may perform the action 602 described and/or represented by the instructional representation 604 for the selected action 602. Once the action 602 instructed by the representation 604 is performed, the user may notify the user device 104 by selecting a completion box 610 of the action 602, or otherwise indicating that the action 602 is complete. In one aspect, the user may sequentially progress through the actions 602 by performing the actions 602 in the order shown on the user device 104. Optionally, the user may perform the actions 602 in a non-sequential manner, such as by selecting and performing actions 602 in an order that is different from the order presented on the user device 104.

In the illustrated example, the user device 104 displays the expert assistance icon 302. During performance of the action represented by the instructional representation 600, the user can select the expert assistance icon 302 to identify, select, and converse with one or more experts about the action. For example, the analysis system 102 may present one or more sets of experts (as described above) and the user may select one or more of these experts to communicate with regarding the action in the instructional representation 600. The user can seek additional guidance or information from the experts, query the experts about best practices or other ways to perform the action, or the like.

In one aspect, the experts with whom the user is communicating can examine the action represented by the instructional representation 600 to determine the impact, if any, that performance of the action will have on one or more component subsystems 110 of the same equipment 108. As one example, the experts can examine whether replacement of a part (e.g., a filter) in a first component subsystem 110 will negatively impact operation of a second component subsystem 110 in the same equipment 108, such as by temporarily allowing an increased amount of emissions or effluent to pass through the area previously inhabited by the old filter and clog another downstream filter. One or more embodiments of the subject matter described in U.S. Pat. No. 6,405,108, entitled "Process And System For Developing Predictive Diagnostics Algorithms In A Machine," (the entire disclosure of which is incorporated by reference) may be used to allow the experts to monitor performance of component subsystems to predict failure and/or to obtain data from the experts via a video conference or chat to determine the impact of one repair on other component subsystems.

Figure 7:
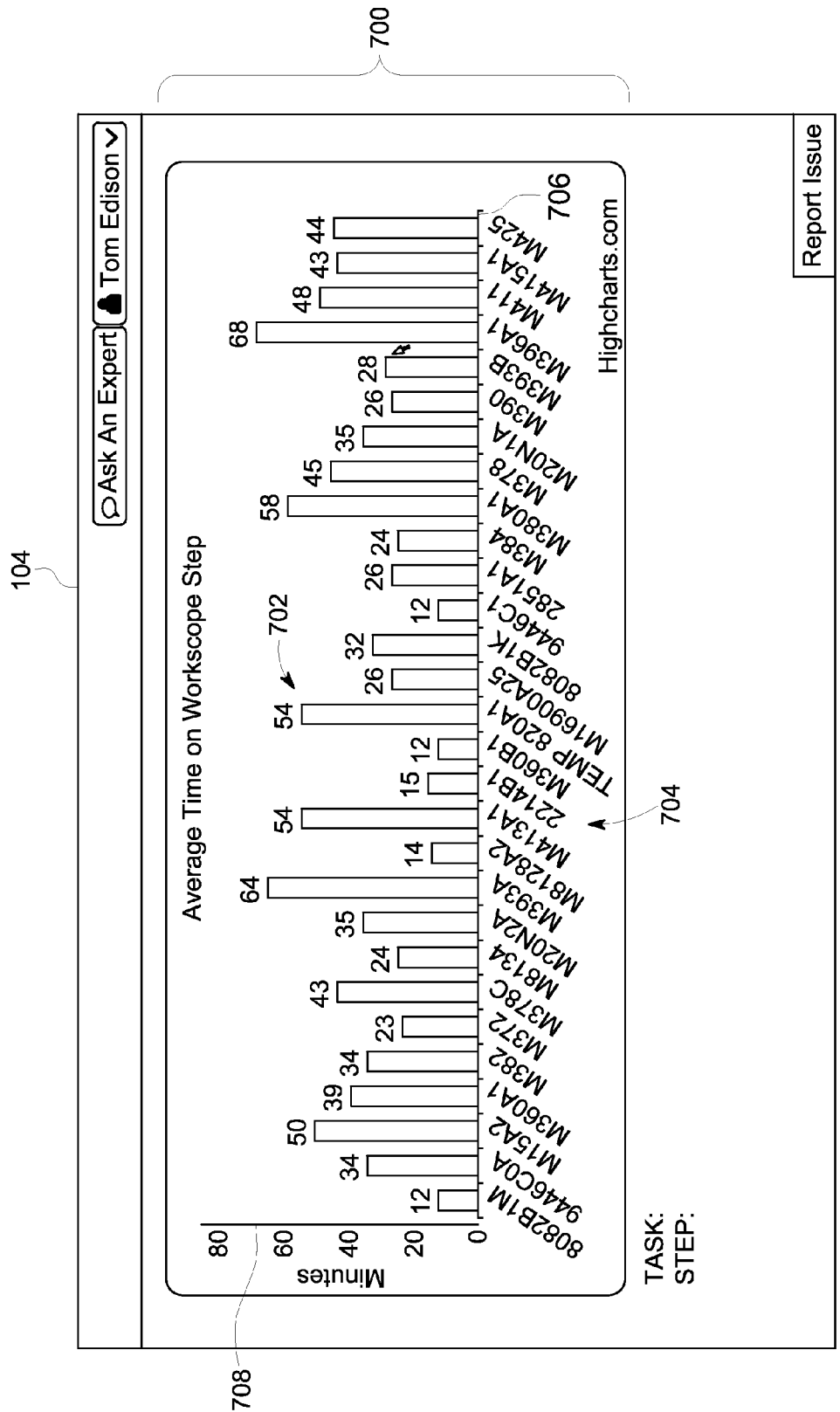
FIG. 7 illustrates an example of another user interface that can be presented to the user on the user device.

FIG. 7 illustrates an example of another user interface 700 that can be presented to the user on the user device 104. The user interface 700 presents estimated completion times 702 for various actions of a recommended work scope. As described above, the analysis system 102 (and/or the user device 104 and/or the resources 106) may recommend work scopes for fixing an identified problem or fault of equipment 108 and/or component subsystems 110 of the equipment 108. The work scopes include several actions that the user is to complete to examine, repair, or replace the equipment 108, component subsystem 110, or one or more parts thereof.

In order to assist the user to select a work scope from several work scopes recommended to the user and/or to adequately prepare for performing a work scope, the analysis system 102 can track and communicate estimated completion times 702 to the user device 104 for the actions of one or more of the recommended work scopes. The estimated completion times 702 shown in FIG. 7 are associated with different actions 704 of a work scope (e.g., the actions 602). For example, the estimated completion times 702 are shown alongside a horizontal axis 706 representative of different actions 704 of a work scope and a vertical axis 708 representative of different lengths of time. The larger the estimated completion time 702 is for an action 704, the longer it is estimated it will take to perform and complete the action 704.

As described above, the estimated completion times may be tracked by the analysis system 102. The analysis system 102 may maintain a historical log of one or more previous uses (e.g., performances) of the various work scopes for various types of equipment 110 and/or component subsystems 108. This log may include indications of how long it previously took to complete the actions in the work scopes. Additionally or alternatively, the estimated completion times may be based on heuristic determinations by human users. The estimated completion times may be varied based on the availabilities of various resources 106. The analysis system 102 can track the availabilities of these resources 106 (as described below) and, based on these availabilities, change the estimated completion times for one or more of the actions 704. The analysis system 102 can communicate the estimated completion times 702 for one or more of the work scopes to the user device 104 for display thereon.

The user may examine the estimated completion times 702 to select a work scope to use and/or to plan for the completion of a work scope. For example, the user may look at the relatively long completion times for the tenth, twelfth, fifteenth, twenty-first, and twenty-sixth actions 704 and determine that the user does not have sufficient time to perform these actions 704. Additionally or alternatively, the user may determine that the tools and/or other resources 106 needed to perform these actions 704 are not available at the times that the actions 704 will be performed. For example, the user may determine that, based on the estimated completion times 702 of the preceding actions 704, the tools or technicians needed to perform one or more actions may not be available because the tools or technicians are scheduled to be used by another person or performing other tasks at that time. Optionally, the user may determine that he or she does not have sufficient time remaining in his or her work day or shift to complete one or more of the actions 704. In one aspect, the user can examine the estimated completion times 702 in order to anticipate when one or more actions 704 are likely to be performed and reserve tools or technicians to use with those actions 704 at the times when the actions 704 are likely to be performed.

Figure 8:
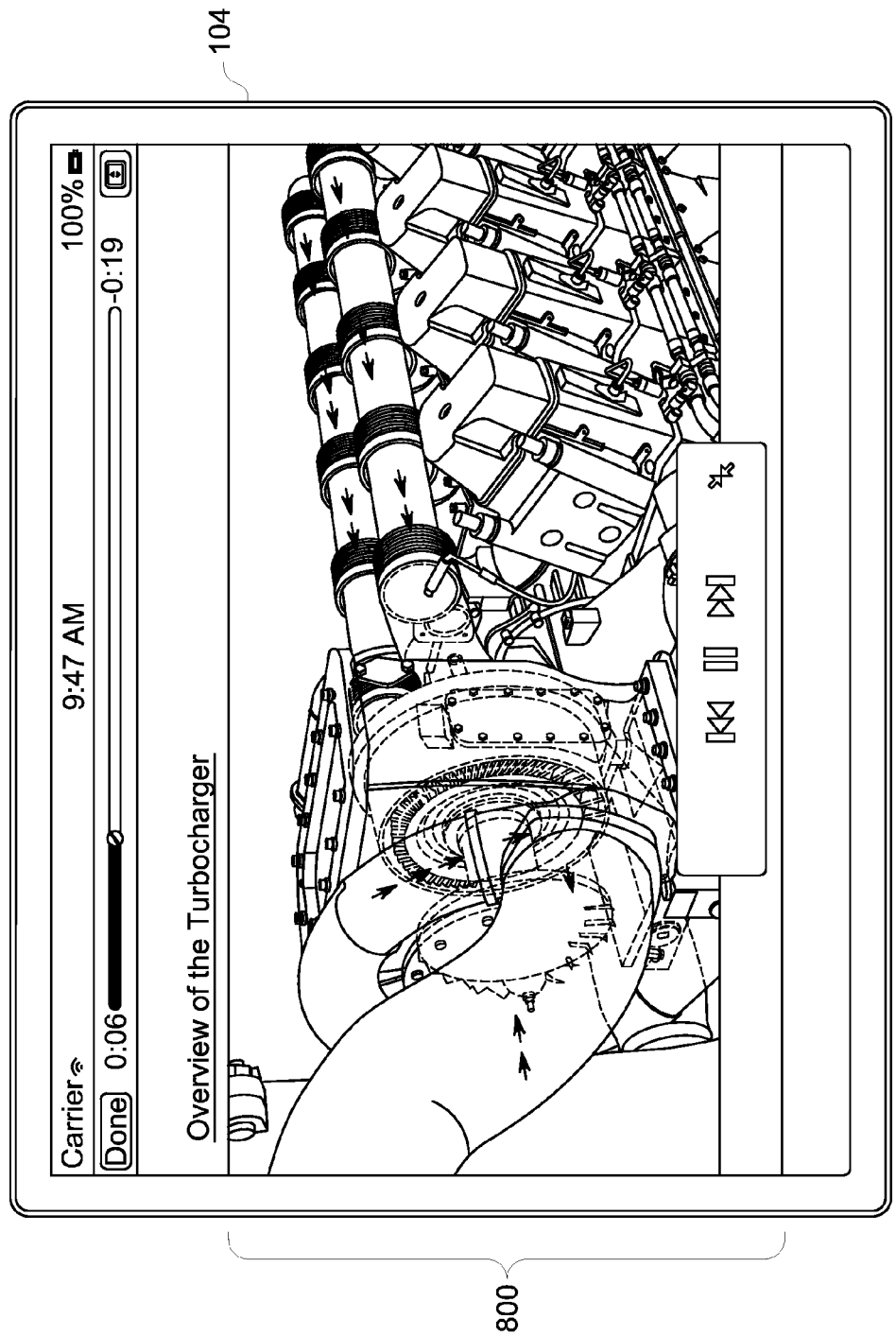
FIG. 8 illustrates an instructional representation of a component subsystem that can be displayed on the user device for an action of a recommended work scope.

FIG. 8 illustrates an instructional representation 800 of a component subsystem 110 that can be displayed on the user device 104 for an action of a recommended work scope. The instructional representation 800 represents a video that can be displayed on the user device 104 to demonstrate how the component subsystem 110 (in this example, a turbocharger) is to operate, such as without an identified problem or fault being present. The user can control playback of the video so as to provide the user with a better understanding of how the component subsystem 110 will work or is expected to perform once the recommended work scope has been successfully completed. Once the user has completed viewing of the video, the user can select the progression icon 210 to advance to another action in the work scope or select another action as described above.

Figure 9:
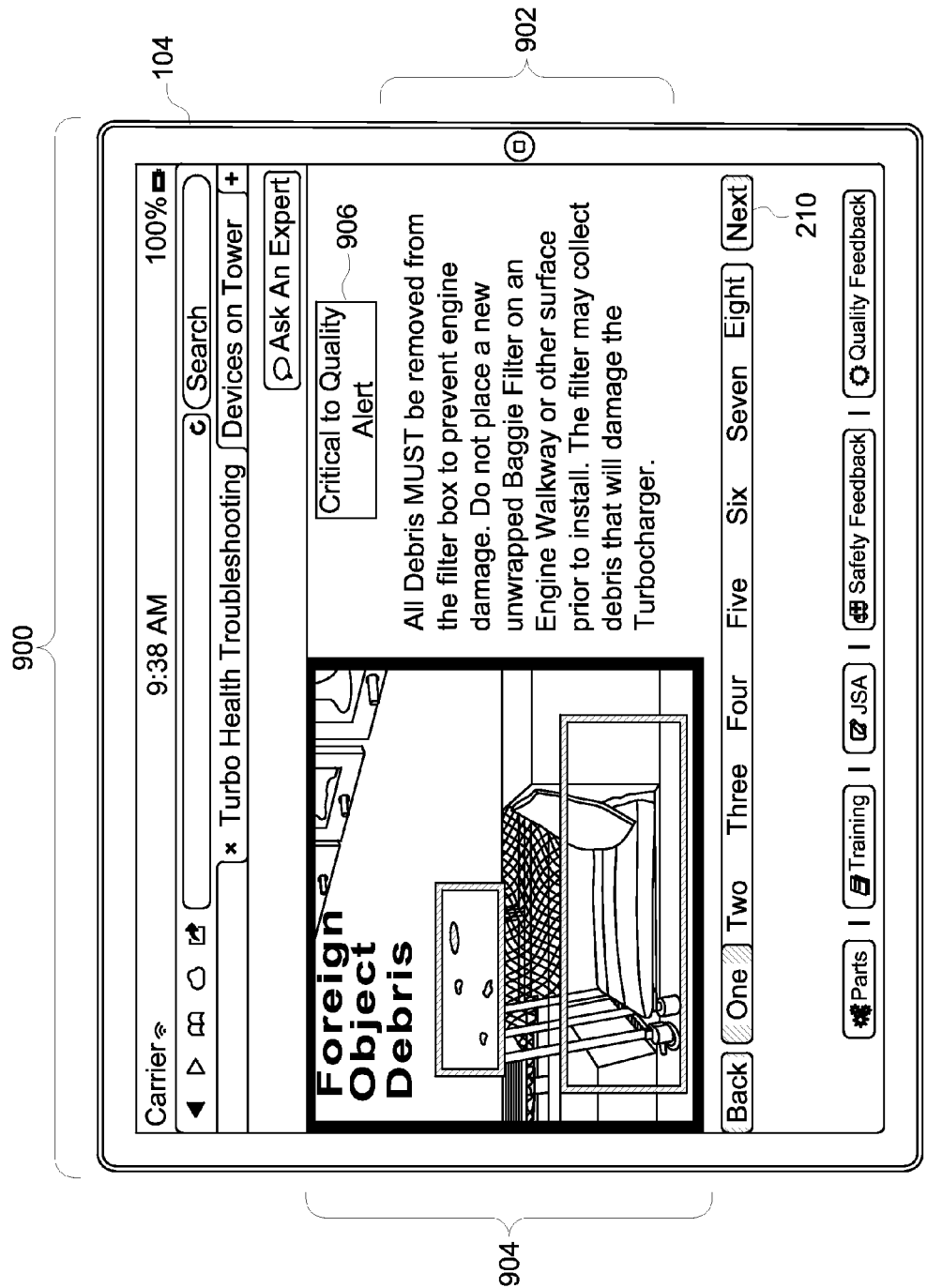
FIG. 9 illustrates an instructional representation of a component subsystem that can be displayed on the user device for the recommended work scope.

FIG. 9 illustrates an instructional representation 900 of a component subsystem 110 that can be displayed on the user device 104 for the recommended work scope. The instructional representation 900 includes a combination of textual information 902 and non-textual information 904 that assists the user to perform one or more actions of the recommended work scope. Optionally, the instructional representation 900 may only include textual information (e.g., similar to as shown in FIG. 5) or only non-textual information (e.g., only audio and/or video without text). The instructional representation 900 may be referred to as a hybrid instructional representation as the representation 900 includes both textual information and non-textual information.

In the illustrated example, the non-textual information 904 includes images of warnings to prevent the user to avoid performing certain actions during performance of the recommended work scope. The textual information 902 can include text that accompanies the images. For example, the top image illustrates a shop floor near where a filter (e.g., to be installed in the equipment 108 during performance of the work scope) should not be placed. This image also includes an annotation that foreign object debris may be on this surface and a box illustrating such debris. The accompanying textual information 902 similarly warns the user to not place the filter on a surface where such debris may be present, as shown in the top image. The bottom image illustrates a location where replacement components (e.g., a filter) may be obtained for use in performance of the work scope. Optionally, the information 902 and/or 904 may include a map or other representation of a shop or location where the work scope is being performed and/or instructions on where a needed component (e.g., the filter) is located in the shop on the map.

The user device 104 can display an alert icon 906 (or other image) that informs the user of a relatively high level of importance for the corresponding action of the work scope. The icon 906 is referred to as a "critical to quality alert," but alternatively may represent another alert, as described herein. In the illustrated example, the icon 906 is displayed to notify the user that the concurrently displayed action of the work scope has a higher priority or is more important to successful completion of the work scope. If the corresponding action is not performed or is only partially completed, then the repair or replacement being directed by the work scope may be more likely to be unsuccessful in fixing the problem or fault than if another, less important or lower priority action is not performed or is only partially completed.

Figure 10A:
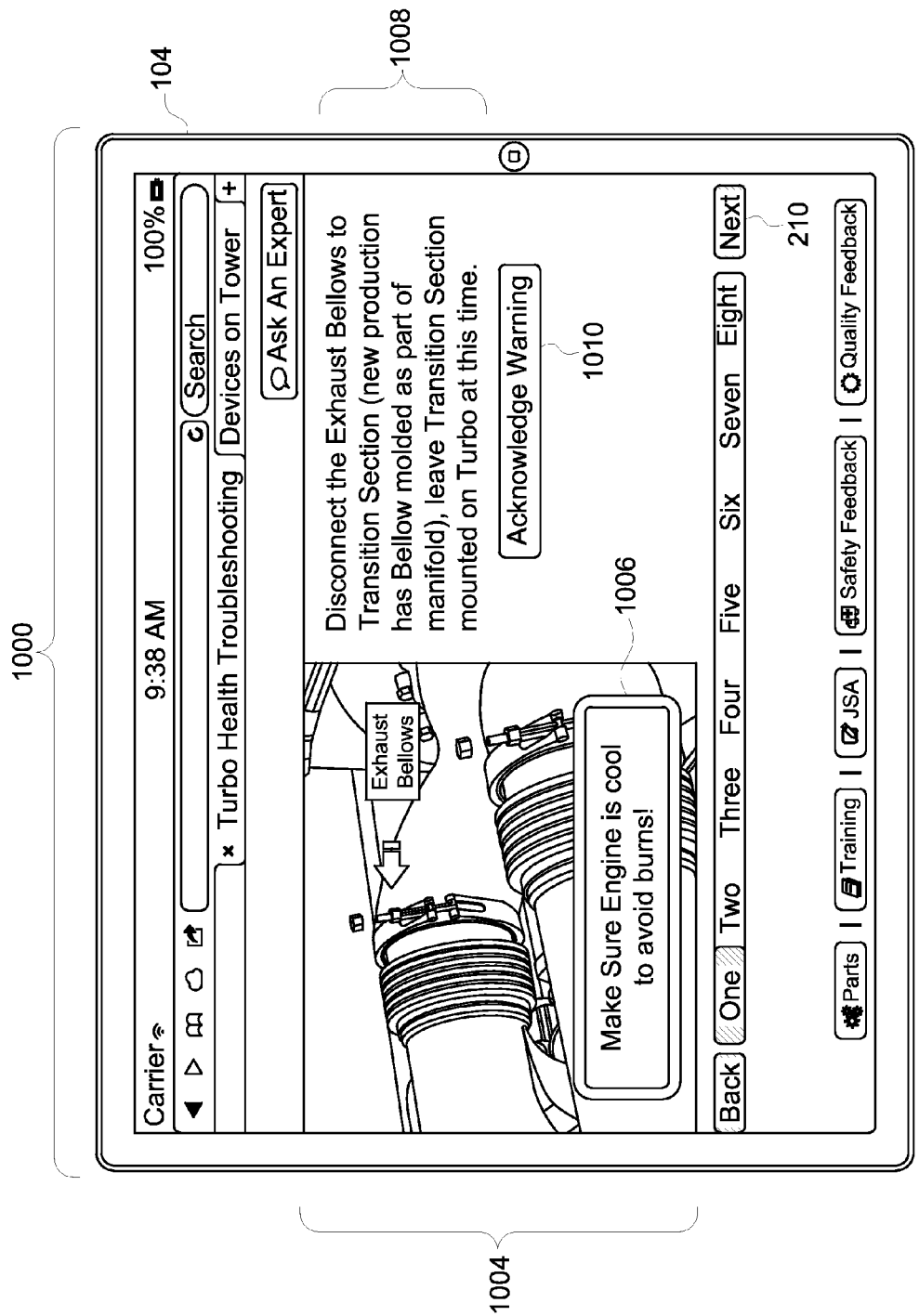
FIGS. 10A and 10B illustrate instructional representations of a component subsystem that can be displayed on the user device for the recommended work scope.
Figure 10B:
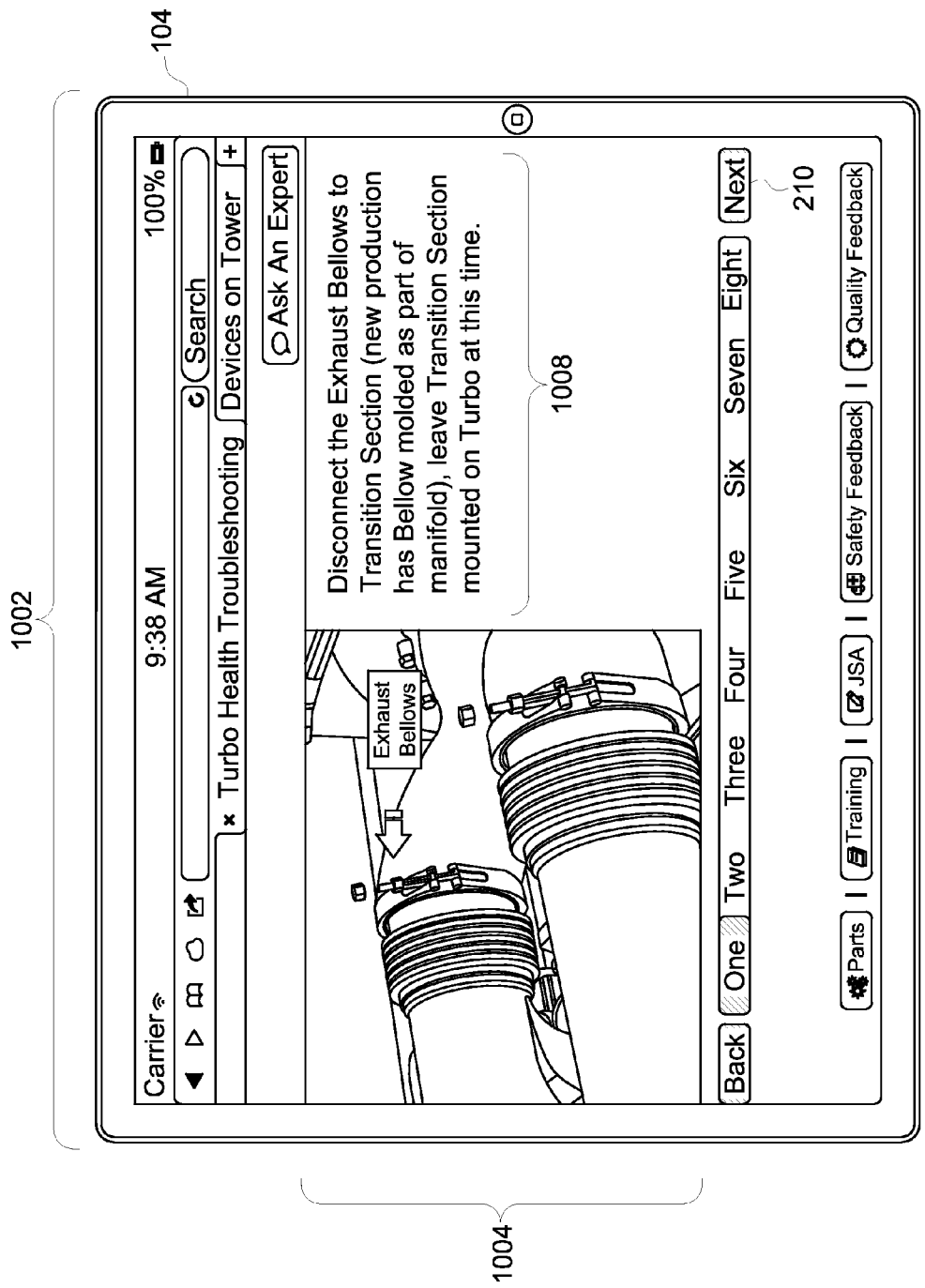

FIGS. 10A and 10B illustrate instructional representations 1000, 1002 of a component subsystem 110 that can be displayed on the user device 104 for the recommended work scope. The instructional representations 1000, 1002 include alerts for the user during performance of the work scope. In the illustrated example, the alert is a safety warning that notifies the user of a potentially dangerous action in the work scope. For example, an image 1004 shown in the first instructional representation 1000 illustrates the same part of the component 110 and/or equipment 108 being worked on during the recommended work scope, but in a different color. The image 1004 shown in the first instructional representation 1000 may be shown in a shade of red or another color to indicate that the part shown in the image 1004 may be at an elevated temperature (and unsafe to touch). Optionally, the image 1004 may be shown differently in another way, such as by using different types of lines, shading, or the like, to draw the attention of the user toward the image 1004.

An alert 1006 shown in the first instructional representation 1000 may provide a written safety warning to accompany the image 1004, such as by stating that the user should ensure that the illustrated part has cooled to a safe temperature. Additional text 1008 may instruct the user as to the action to be performed with the illustrated part. Although the alert 1006 is shown as a visual image, such as an icon, the alert 1006 may additionally or alternatively include an audible sound, a flashing image or text, video, an annotation on the image 1004, or the like. In one aspect, the image 1004 may be annotated to represent the safety warning by the user device 104 displaying one or more parts of the component subsystem 110 that is shown in the image 1004 (but less than of the component subsystem 110) and that is associated with a hazardous condition in a color that is different from other parts of the component subsystem 110 that are shown in the image 1004 and that are not associated with the hazardous condition.

An additional or alternative alert 1006 may include one or more alert icons or watermarks displayed by the user device 104, such as in a corner or other location of the display. These alert icons can indicate a hazard class (e.g., electrocution, impact, asphyxiation, cutting, toxicity, heat, or the like) associated with the displayed action to be performed in the work scope. The different hazard classes may be associated with different respective icons such that the alert icon or watermark may clearly illustrate the various risks associated with performance of the action in the work scope.

In order to provide adequate safeguards to ensure that the user actually sees the safety warning, the user device 104 may display an alert acknowledgement icon 1010. In one aspect, the user may be required by the user device 104 to select this icon 1010 before proceeding in the recommended work scope. For example, the user device 104 may ignore any selection of the progression icon 210 and therefore prevent advancing in the work scope unless and until the user selects the alert acknowledgement icon 1010.

The instructional representations shown on the user device 104 may change once the user acknowledges the alert, such as by selecting the alert acknowledgement icon 1010. For example, the color of the part shown in the image 1004 may change from red (or another color) in the instructional representation 1000 to a blue (or another, different color) in the subsequent instructional representation 1002.

The user may perform the action described in the instructional representations 1000, 1002 and now be allowed to select the progression icon 210 to advance to a subsequent action in the recommended work scope.

Optionally, the alert 1006 that is presented to the user on the user device 104 may communicate information to the user other than a safety warning. As one example, the alert 1006 may include a productivity loss warning. Such as warning can notify the user of a productivity loss that may occur if the action to be performed in accordance with the work scope is performed at that time. For example, if the action instructed by an instructional representation on the user device 104 would involve the use of a resource 106 that is currently unavailable, the alert 1006 may warn the user that performing this action at the current time may require the user waiting for the tool or other equipment to become available for his or her use. This resource 106 can include a replacement part that is needed to complete the recommended work scope, a particular tool or other equipment that is used to perform the action, a technician that is particularly skilled in performing the action, a remaining amount of available working hours for a technician or the user to perform the action (e.g., where the technician and/or user is limited on the total number of working hours, such as in a work day), or the like.

The acknowledgement icon 1010 that accompanies such an alert 1006 may provide the user with an option to skip the action in the work scope that is associated with the alert 1006, proceed to another action, and return to the present action at another time. Selecting the icon 1010 may then cause the work scope as presented on the user device to proceed to the other action. For example, the user may choose to perform the action at a later time, when a needed tool or other equipment is available, a skilled technician is available, the user and/or technician has more time to perform the action, a replacement part is available, or the like.

The analysis system 102 and/or user device 104 can refer to the resources 106 to determine when to present such a productivity loss alert 1006 to the user on the user device 104. For example, one or more of the resources 106 may represent a part needed to complete one or more actions of the recommended work scope. The memory device 112 can maintain an inventory log of parts used in the repair and/or replacement of various component subsystems 110 and/or equipment 108. When a recommended work scope is identified by the analysis system 102 and/or the user device 104 based on the identification information (as described above), the analysis system 102 and/or user device 104 can determine if performance of the recommended work scope involves the replacement of one or more parts of the component subsystem 110 and/or replacement of the component subsystem 110.

The analysis system 102 and/or user device 104 may then refer to the inventory log to determine if there are sufficient parts to perform the recommended work scope. If not, the analysis system 102 and/or the user device 104 may cause the productivity loss alert 1006 to be displayed to warn the user of the lack of available parts to complete the recommended work scope.

In one aspect, separate inventory logs may be maintained in the memory device(s) 112 for different locations. For example, a first inventory log may represent how many parts are in a first repair shop, a second inventory log may represent how many parts are in a different, second repair shop that is remote from the first repair shop (e.g., not in the same location or connected to the first repair shop), and so on. If the user device 104 is disposed in or near the first repair shop (which may be determined by location information obtained by the user device 104, such as from a Global Positioning System receiver, triangulation from wireless signals, user input, or the like), then the user device 104 and/or the analysis system 102 may refer to the first inventory log to determine if a part needed for performance of an action in the recommended work scope is available at the first repair shop. If not, then the user device 104 and/or analysis system 102 may provide the productivity loss alert 1006 to inform the user that a needed part is not locally available.

The user device 104 and/or analysis system 102 may then present the user with information about availability of the needed part in another location using the inventory logs. For example, the user device 104 and/or analysis system 102 may determine if the part is available in another location and display a map, list, or other representation on the user device 104 that notifies the user of where the part is available, how far the part is from the current location of the user device 104, how long it can take to deliver the part to the current location of the user device 104, and so on. In this way, the user can make an informed decision of how to proceed (e.g., wait for the inventory of parts to be replenished at the current location, wait for the needed part to be delivered from another location, skip the action in the recommended work scope that involves the part, and so on) in light of the part being unavailable at the current location. In one aspect, the user device 104 can allow the user to place an order for the part to be purchased and/or delivered from another location, such as by presenting the acknowledgement icon 1010 that can be selected to order the part (or by providing other input via the input device 104).

In one aspect, a resource 106 can represent a particular tool or other equipment that is used to perform an action of the recommended work scope. By way of example, a mechanical lift or jack may be needed to lift a heavy object (e.g., an engine), an electric sensor may be needed to monitor output of the component subsystem 110, a machine may be needed to cut one or more parts of the equipment 108 and/or component subsystem 110, a machine may be needed to combine (e.g., weld) one or more parts of the equipment 108 and/or component subsystem 110, or the like.

If the tool or equipment used to perform the action in the work scope is currently unavailable at the location of the user device 104, the productivity loss alert 1006 may be displayed to warn the user of the unavailability of the tool or equipment. The acknowledgement icon 1010 that accompanies such an alert 1006 may provide the user with an option to skip the action in the work scope that is associated with the alert 1006, proceed to another action, and return to the present action at another time. Selecting the icon 1010 may then cause the work scope as presented on the user device to proceed to the other action. For example, the user may choose to perform the action at a later time, such as when the tool or equipment is available.

The analysis system 102 and/or user device 104 can refer to the resources 106 to determine when to present such a productivity loss alert 1006 to the user on the user device 104. For example, one or more of the resources 106 may represent the tool or equipment that is needed to complete one or more actions of the recommended work scope. The memory device 112 can maintain an inventory log of the tools and equipment used in the repair and/or replacement of various component subsystems 110 and/or equipment 108. When a recommended work scope is identified by the analysis system 102 and/or the user device 104 based on the identification information (as described above), the analysis system 102 and/or user device 104 can determine if performance of the recommended work scope involves the use of one or more tools or other equipment.

The analysis system 102 and/or user device 104 may then refer to the inventory log to determine if the needed tool or equipment is located at or near the location of the user device 104 (and/or the equipment 108 and/or component subsystem 110 being worked on). If not, the analysis system 102 and/or the user device 104 may cause the productivity loss alert 1006 to be displayed to warn the user of the lack of available tools or equipment. In one aspect, the inventory log may maintain a reservation system that tracks when the tool or equipment will be available in the future and/or when the tool or equipment is expected to be available.

In one aspect, separate inventory logs may be maintained in the memory device(s) 112 for different locations, similar to as described above in connection with the inventory logs of parts. If the needed tool or equipment is not available, then the user device 104 and/or analysis system 102 may determine when the tool or equipment is expected to be available next (e.g., from the inventory log for the location of the user device 104). If the tool or equipment is available in another location, the user device 104 and/or analysis system 102 may display a map, list, or other representation on the user device 104 that notifies the user of where the tool or equipment is available, how far the tool or equipment is from the current location of the user device 104, how long it can take to deliver the tool or equipment to the current location of the user device 104, and so on. In this way, the user can make an informed decision of how to proceed (e.g., wait for the tool or equipment to be available at the current location, wait for the tool or part to be delivered from another location, skip the action in the recommended work scope that involves use of the tool or equipment, and so on) in light of the part being unavailable at the current location. In one aspect, the user device 104 can display the acknowledgement icon 1010 to allow the user to reserve the tool or equipment and/or have the tool or equipment delivered to a desired location. For example, the tool or equipment may be reserved at a later time to prevent others from using the tool or equipment and/or may be scheduled to be delivered to the location of the user device 104 by selecting the acknowledgement icon 1010 (or providing other input).

Another example of a productivity loss alert 1006 may be an alert that is presented on the display device 104 to notify the user that a technician that is skilled in performing the action of the recommended work scope is unavailable to perform the action. The acknowledgement icon 1010 that accompanies such an alert 1006 may provide the user with an option to skip the action in the work scope that is associated with the alert 1006, proceed to another action, and return to the present action at another time, as described above.

The analysis system 102 and/or user device 104 can refer to the resources 106 to determine when to present such a productivity loss alert 1006 to the user on the user device 104. For example, one or more of the resources 106 may represent a skilled technician that is needed to complete one or more actions of the recommended work scope. The memory device 112 can maintain an attendance log of technicians available to perform various tasks to complete the work scope. The attendance log can represent locations of various technicians, current states of the technicians (e.g., working on another task, available to assist on a task, not present at the current location, and the like), available working hours remaining for the technicians (e.g., the number of hours left in the current day that the technicians can work), and the like.

When a recommended work scope is identified, the analysis system 102 and/or user device 104 can determine if performance of the recommended work scope involves the work of a skilled technician other than the user of the user device 104. The analysis system 102 and/or user device 104 may then refer to the attendance log to determine if a needed technician is available to perform the recommended work scope. If not, the analysis system 102 and/or the user device 104 may cause the productivity loss alert 1006 to be displayed to warn the user of the lack of an available technician to complete the recommended work scope.

In one aspect, separate attendance logs may be maintained in the memory device(s) 112 for different locations, similar to as described above for the inventory logs. These different attendance logs may be used to determine and notify (e.g., using the alert 1006) the user if a technician is unavailable at the location of the user device 104. The user device 104 and/or analysis system 102 may then present the user with information about availability of another technician that can perform the needed task in another location. The user device 104 and/or analysis system 102 may determine if the technician is available in another location and display a map, list, or other representation on the user device 104 that notifies the user of where the technician is available, how far the technician is from the current location of the user device 104, how long it can take to deliver the technician to the current location of the user device 104, and so on. In this way, the user can make an informed decision of how to proceed (e.g., wait for the technician at the current location to be available, wait for the technician to arrive from another location, skip the action in the recommended work scope that involves the technician, and so on).

Another example of a productivity loss alert 1006 may be an alert that is presented on the display device 104 to notify the user that a remaining amount of available time for a technician or the user to perform the action is so limited that the action cannot be completed at the current time. For example, some actions in the recommended work scope may involve a relatively long time to complete. The hours that technicians and/or the users may work in a day, week, month, year, or other time span may be limited by contract, regulation, law, or the like. The available hours that the technicians and/or user can work may be tracked and saved in working logs stored at the memory device 112. The user device 104 and/or analysis system 102 can examine the recommended work scope and the working logs to determine if the work scope involves an action that may not be completed within a designated time period (e.g., within the same day, shift, eight hour period, or the like, as when the work scope begins). If the action and/or work scope cannot be completed within the designated time period due to limitations on the available working hours of the technician and/or user, then the user device 104 can display the productivity loss alert 1006 to the user. Similar to as described above in connection with the availability of a skilled technician, the user device 104 can notify the user if another technician and/or user is available in another location so that the user of the user device 104 can schedule the technician or other user to perform the action (e.g., at the location of the user device 104 or at another location).

Another alert 1006 that can be displayed by the user device 104 includes a financial cost alert. This alert 1006 can warn a user when performance of an action in the recommended work scope exceeds some designated and/or non-zero threshold cost. For example, some actions in a recommended work scope may involve the use of relatively expensive parts, tools (e.g., in terms of cost of wear and tear on the tools, rental fees, or the like), fuels, or other materials. The analysis system 102 and/or user device 104 can examine the recommended work scope to determine if performance of one or more of the actions would cost more than a designated threshold cost, such as a user-established budget. If so, the analysis system 102 and/or user device 104 can cause the financial cost alert to be displayed to notify the user. The user may then choose not to perform the action, to perform or select another work scope, or proceed with the recommended work scope in light of the relatively expensive cost of doing so.

In addition or as an alternate to the options provided by the acknowledgement icon 1010 described above, the user device 104 and/or analysis system 102 may present the icon 1010 so that selection of the icon 1010 causes another recommended work scope to be selected by the user. For example, a first recommended work scope may be selected based on identification information received via the user device 104 (as described above). If an alert 1006 is presented to the user, the user may select the alert 1006 so that the first recommended work scope is terminated, and a different, second recommended work scope is selected and used. In doing so, the user may avoid one or more of the alerts being presented during performance of the second recommended work scope.

Another example of the alert 1006 may be an estimated time to failure alert. This alert may notify the user of a time that the component subsystem 110 and/or equipment 108 may continue to be used before failure of the component subsystem 110 and/or equipment 108 is expected to occur. The component subsystem 110 and/or equipment 108 may be considered to have failed when performance or operations of the subsystem 110 and/or equipment 108 terminate or fall below a designated output threshold. For example, an engine may fail when less than a designated amount of threshold horsepower is generated by the engine, a turbocharger may fail when the pressure differential created by the turbocharger falls below a threshold, a motor may fail when the torque created by the motor falls below a threshold, and so on.

In one aspect, the estimated time to failure for a component subsystem 110 and/or equipment 108 may be based on empirically derived times to failure for other similar subsystems 110 and/or equipment 108. For example, the memory device 112 may store the actual times to failure for other subsystems 110 and/or equipment 108 that is similar to the subsystem 110 and/or equipment 108 under examination, where the other subsystems 110 and/or equipment 108 are the same or similar type of subsystems 110 and/or equipment, are the same or similar age, have the same or similar outputs, and the like. These actual times to failure may be used to estimate the time to failure for the subsystem 110 and/or equipment 108 under examination. Optionally, the estimated time to failure for the component subsystem 110 and/or equipment 108 may be determined from a history of previous faults of the same subsystem 110 and/or same equipment 108, as described in U.S. Pat. No. 6,643,801, entitled "Method And System For Analyzing Fault Logs And Continuous Data For Diagnostics," the entire disclosure of which is incorporated by reference. Additionally or alternatively, the embodiments of one or more of the following patents may be used to determine or estimate when the next failure of the subsystem 110 and/or equipment 108 may occur: U.S. Pat. No. 6,301,531, entitled "Vehicle Maintenance Management System And Method," U.S. Pat. No. 6,243,628, entitled "System And Method For Predicting Impending Failures," U.S. Pat. No. 6,324,659, entitled "Method And System For Identifying Critical Faults In Machines," and/or U.S. Pat. No. 7,873,450, entitled "Diagnostic System and Method," the entire disclosures of which are incorporated by reference.

During and/or subsequent to performance of a work scope, the user device 104 can allow the user to provide feedback to the analysis system 102 via the user device 104. This feedback may notify the analysis system 102 and/or one or more resources 106 (e.g., a person who designs and/or modifies the work scopes) of problems with the work scope and/or potential ways to improve the work scope.

As one example, the user feedback may include an inefficiency notice or efficiency notice. Such a notice is used to inform the analysis system 102 and/or one or more resources 106 that one or more actions of the work scope (or the entire work scope) can be performed more efficiently. For example, the user may determine that changing the order of the actions in the work scope, removing one or more of the actions, performing one or more of the actions in a different way, or the like, can achieve completion of a goal of the work scope (e.g., repair or replacement of the component subsystem 110 and/or equipment 108) faster than the current actions in the work scope.

Another example of user feedback is a safety notice. This notice can inform the analysis system 102 and/or one or more resources 106 that performance of one or more of the actions in the work scope is unsafe and/or presents a hazard to the user. For example, the work scope may direct the user to touch a part of the component subsystem 110 and/or equipment 108 when the part is too hot to safely touch, is charged with an electric current, or is otherwise unsafe. The user can provide the safety notice through the user device 104 to warn of this unsafe situation.

Another example of user feedback is an inoperability notice. This notice can inform the analysis system 102 and/or one or more resources 106 that one or more actions in the work scope does not result in completion of the work scope. For example, an action in the work scope may direct the user to detach a first part from the component subsystem 110 before a second part is removed from the subsystem 110. But, due to the manner in which these parts are connected to the component subsystem 110, the user may not be able to detach the first part until the second part is removed. As another example, the manner in which the work scope directs the user to remove or connect parts of the component subsystem 110 may be incorrect. The user can input information about such errors in the work scope into the user device 104 as inoperability notices.

Figure 11:
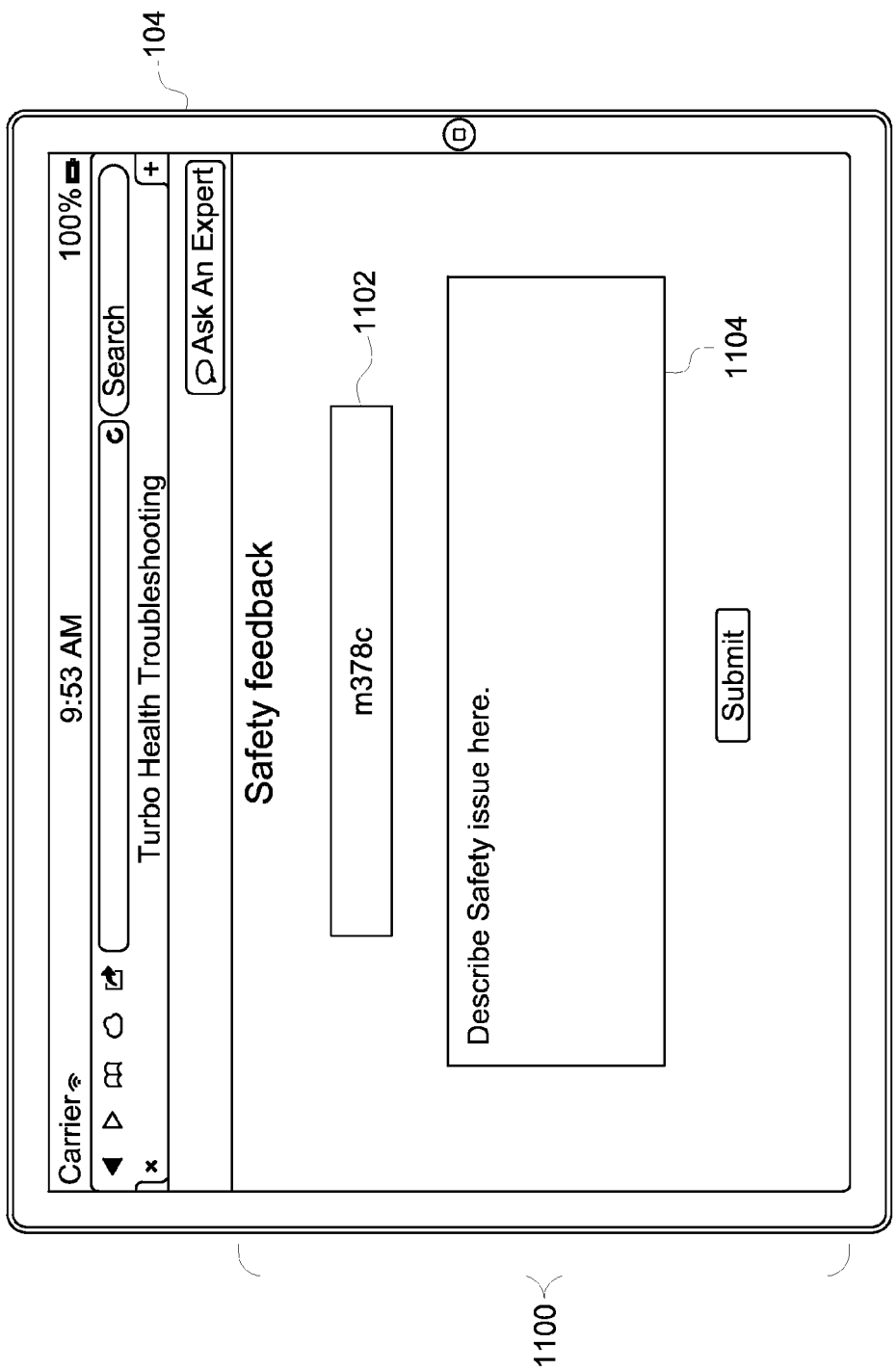
FIG. 11 illustrates another example of a user interface displayed by the user devices.

FIG. 11 illustrates another example of a user interface 1100 displayed by the user devices 104. The user interface 1100 may be displayed to the user so that the user can provide user feedback to the analysis system 102 and/or resources 106 using the user device 104. As described above, this user feedback can include inefficiency notices, safety notices, inoperability notices, or other information. While the user interface 1100 states "Safety Feedback," another type of feedback can be provided instead or in addition to a safety notice.

The user interface 1100 includes windows 1102, 1104 that may be used by the user to type a written description of the user feedback. Optionally, the user may draw on or otherwise annotate an image for the user feedback. For example, the user device 104 may include a camera or may receive an image of the component subsystem 110, the equipment 108, or a portion thereof. The user may then draw on the image (e.g., using the touchscreen of the user device 104, a stylus, an electronic mouse, and the like) to identify the locations in the image where the user feedback relates. As one example, in a safety notice, the user may encircle a section on the image that indicates a sharp, hot, electrically charged, or otherwise unsafe part of the subsystem 110 and/or equipment 108. The user may also type or record a description of the safety issue using the user device 104. The safety notice may then be communicated to the analysis system 102 and/or resources 106.

Figure 12:
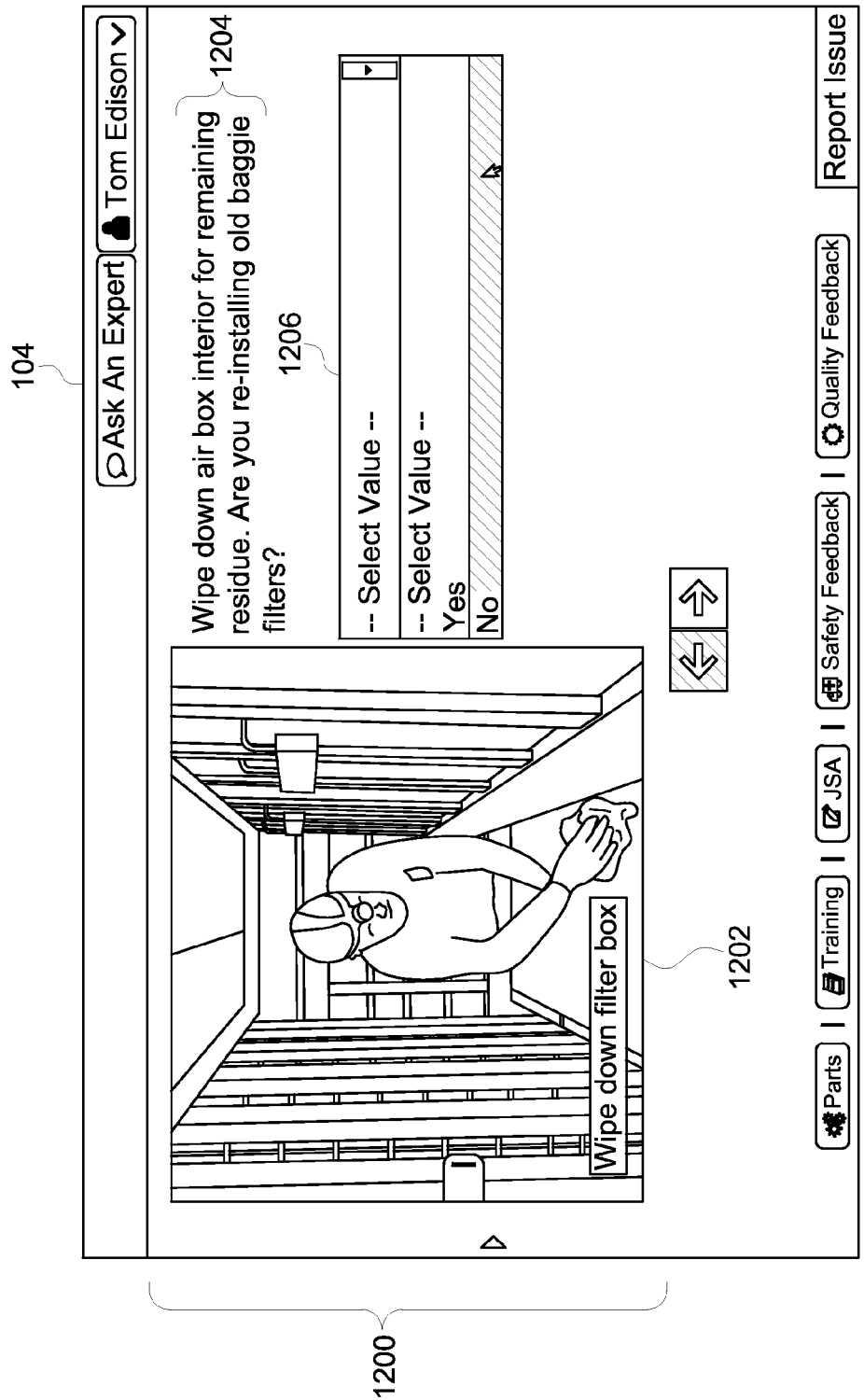
FIG. 12 illustrates another example of a user interface that can be presented to the user on the user device.

FIG. 12 illustrates another example of a user interface 1200 that can be presented to the user on the user device 104. The user interface 1200 may be used to direct the user to perform an action from a work scope that examines a component subsystem 110 and/or equipment 108, such as when a troubleshooting work scope is selected by the user. Optionally, the user interface 1200 may be displayed to guide the user to perform an action from an outbound checkup work scope. For example, the action directed by the user interface 1200 may direct the user to check one or more operations, aspects, appearances, or the like, of the equipment 108 and/or component subsystem 110 that was examined, maintained, or otherwise repaired prior to releasing the equipment 108 and/or component subsystem 110 for use.

The user interface 1200 can display an image 1202 (e.g., a still image and/or a video) and/or text 1204 to query the user on one or more aspects of the component subsystem 110 and/or equipment 108. For example, the image 1202 and/or text 1204 may request that the user confirm performance of an action and/or visually inspect, measure, operate, or otherwise examine the component subsystem 110 and/or equipment 108. The user interface 1200 shown in FIG. 12 includes a response window 1206 that allows the user to provide user input to respond to the query provided by the image 1202 and/or text 1204. The illustrated response window 1206 allows the user to select a "Yes" or "No" response to the query, but additionally or alternatively may allow for the user to provide other responsive input, such as an alpha-numeric text string, image, sensor data, or the like.

The user input provided by the user can be received by the user device 104 and used to determine if the recommended work scope for the component subsystem 110 and/or equipment 108 was successfully completed. The analysis system 102 may compare the user input provided via the user device 104 (and/or other information, such as sensor data representative of operations of the component subsystem 110 and/or equipment 108) with designated responses or data representative of successful completion of the work scope.

If the user input does not match the designated responses or data by at least a threshold, non-zero amount, then the analysis system 102 may determine that the work scope was not completed, or was not successfully completed. For example, if the user input indicates that a surface of a filter was not cleaned during the work scope (as opposed to the filter being cleaned), that an old bag of a filter was reused (instead replacing the filter bag), that the horsepower generated by an engine is less than a designated threshold, that the pressure boost of a turbocharger is less than a designated pressure boost, or the like, then the analysis system 102 may determine that the work scope was not successfully completed. The analysis system 102 can direct the user device 104 to inform the user and recommend that the work scope be repeated, that one or more of the actions in the previously completed work scope be repeated, that one or more additional actions be performed, or that another work scope be performed.

If the user input does match the designated responses or data by at least a threshold, non-zero amount, then the analysis system 102 may determine that the work scope was successfully completed. For example, if at least a designated percentage of the answers provided by the user match or otherwise correspond to designated answers representative of successful completion of the work scope, then the analysis system 102 may determine that the work scope 102 was successfully completed. The analysis system 102 can direct the user device 104 to inform the user and recommend that the component subsystem 110 and/or equipment 108 be used when available.

Figure 13:
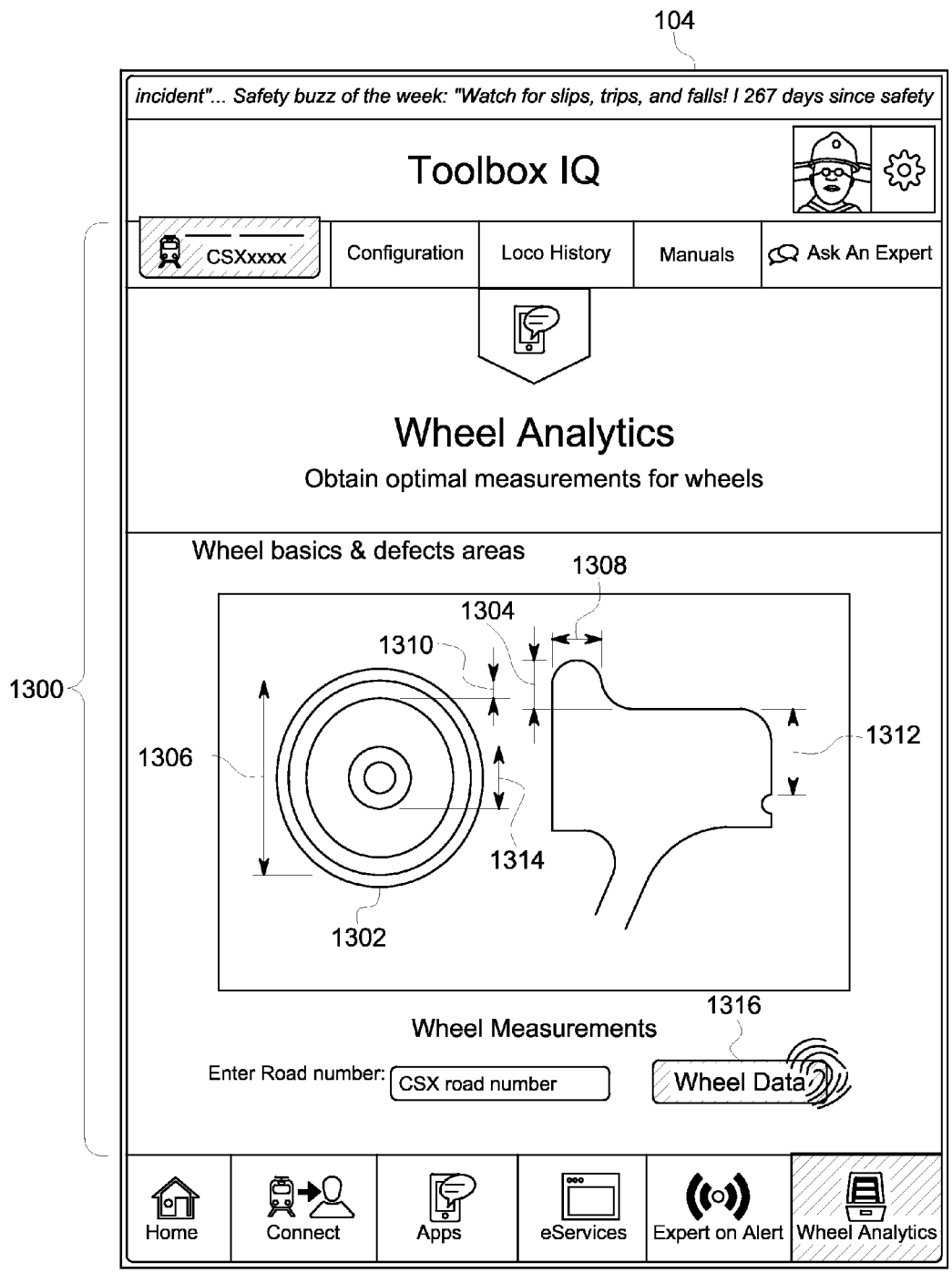
FIGS. 13 through 15 illustrate an example of user interfaces shown on the user device during an example of a recommended work scope.
Figure 14:
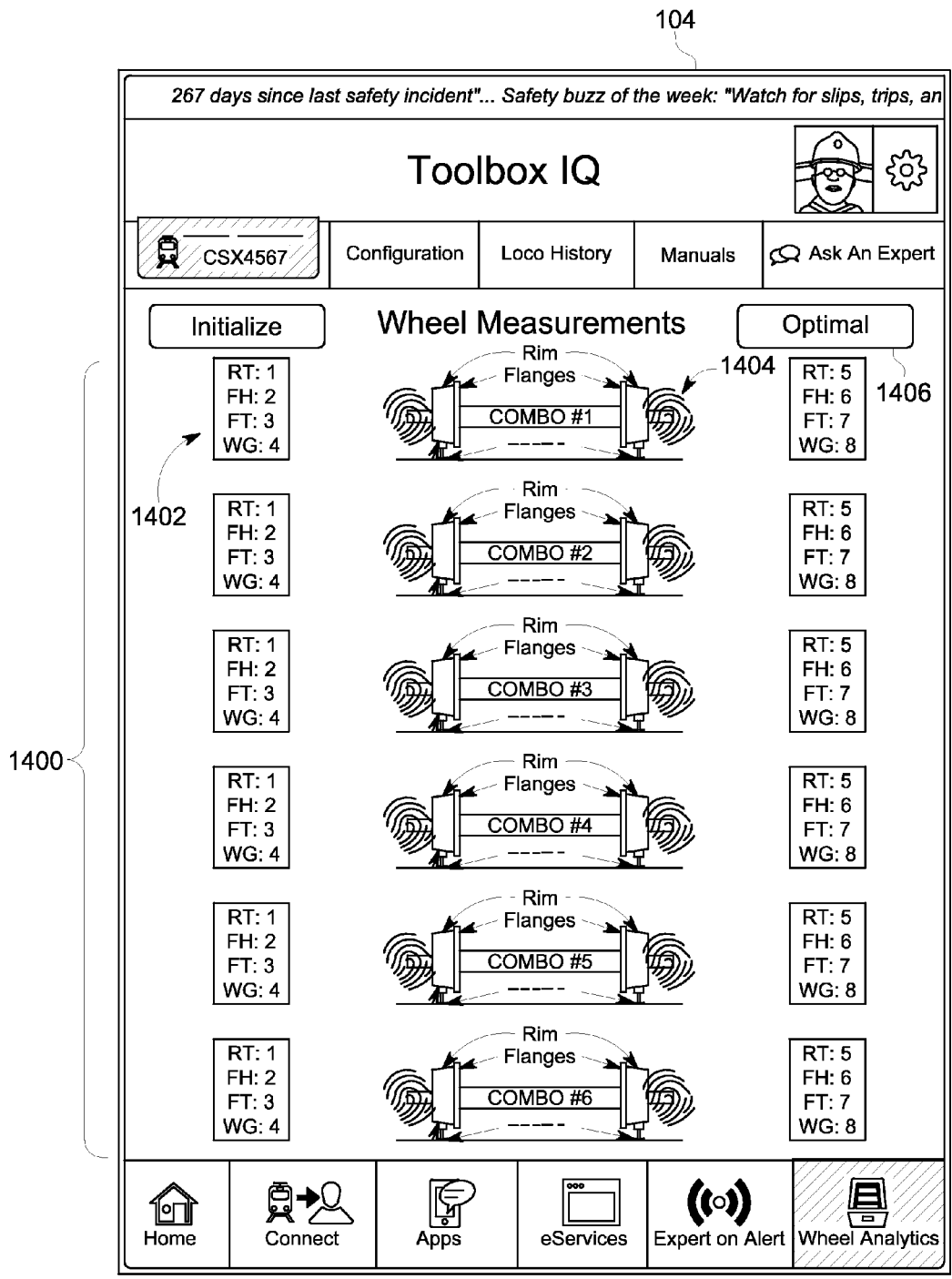
Figure 15:
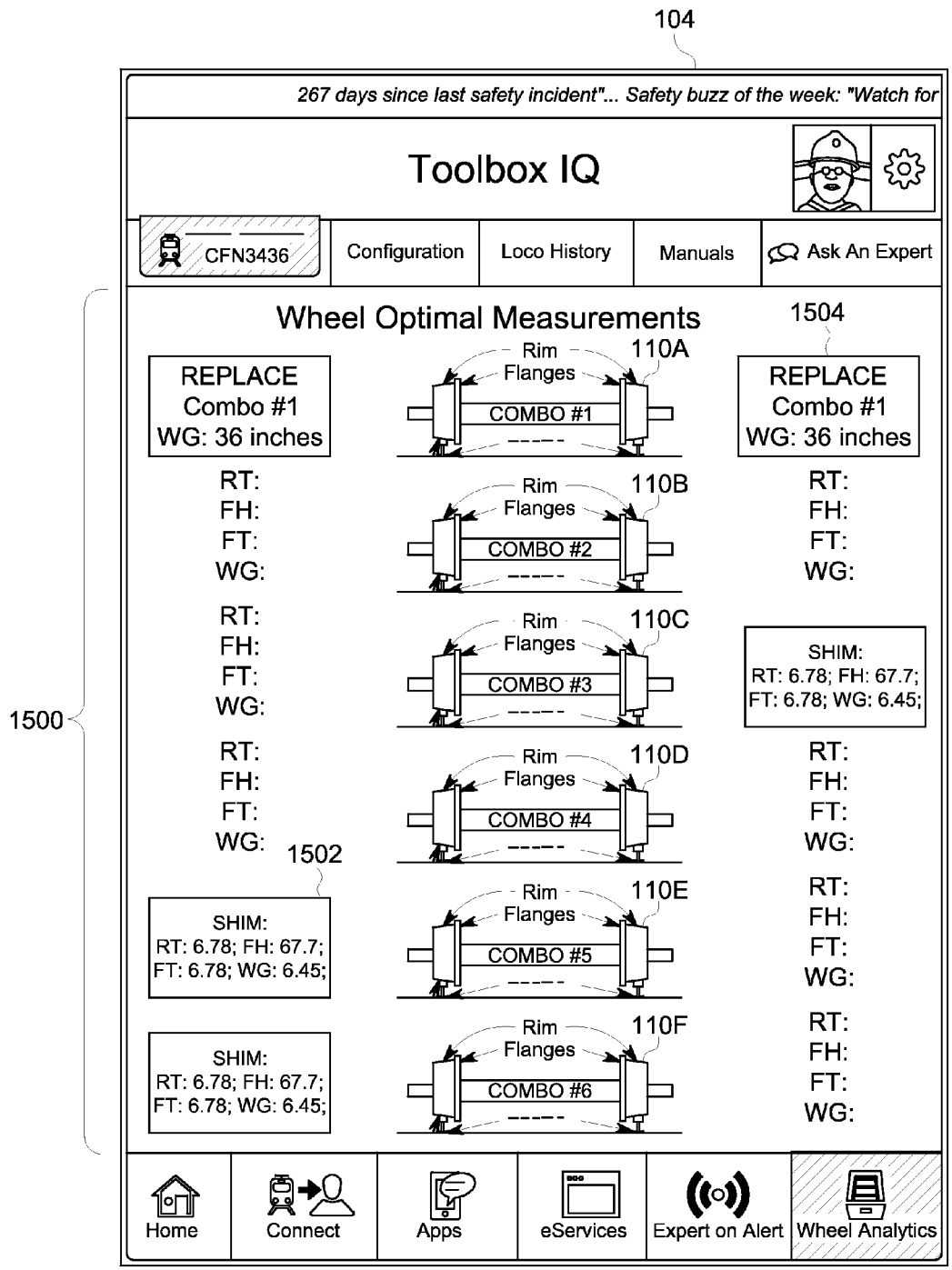

FIGS. 13 through 15 illustrate an example of user interfaces 1300, 1400, 1500 shown on the user device 104 during an example of a recommended work scope. The work scope described in connection with these user interfaces 1300, 1400, 1500 can be used to measure dimensions of a wheel, determine if the dimensions need to be changed and/or if the wheel needs to be replaced, and to locate a replacement wheel. Not all embodiments of the subject matter described in connection with FIGS. 13-15 are limited to wheels, however. The subject matter described herein may be used for the examination of one or more other component subsystems 110 of equipment 108, the determination of whether to alter or replace the component subsystems 110, and/or the locating of a replacement component subsystem 110 other than a wheel.

The user device 104 can present a user interface that instructs the user how to measure or otherwise determine one or more characteristics of a component (e.g., a component subsystem 110) of equipment. The user interface 1300 shown in FIG. 13 instructs the user how to measure various dimensions of a wheel 1302 of a rail vehicle. Alternatively, the user interface 1300 may instruct the user to measure, sample, or otherwise determine one or more other characteristics, such as temperature, speed, electric current, horsepower, force, friction, or the like. The user interface 1300 identifies dimensions of the wheel 1302 that are to be measured, such as a flange height 1304, a diameter dimension 1306, a flange thickness 1308, a rim dimension 1310, a distance from a witness groove 1312, a hub dimension 1314, and the like. These dimensions 1304, 1306, 1308, 1310, 1312, 1314 represent characteristics of the wheel 1302 that are to be measured by the user. The user can measure some or all of these dimensions and input the dimensions into the user device 104, such as by selecting a data input icon 1316 and typing in or otherwise inputting the dimensions. Optionally, the characteristics that are input may be other characteristics, such as a power output of a motor (e.g., horsepower), current generated by an engine and generator set, the amount and/or type of emissions generated by an engine, the exhaust pressure and/or pressure boost from a turbocharger, fluid pressure and/or flow in a braking system (e.g., air pressure in an air brake system), and the like.

FIG. 14 is another example of a user interface 1400 that can be displayed on the user device 104. The user interface 1400 visually presents input characteristics 1402 of the component subsystem 110 (and/or equipment 108). In the illustrated example, the user interface 1400 displays the wheel dimensions that were input by the user of the device 104 as the input characteristics 1402. Optionally, one or more other characteristics may be input, as described above.

In one aspect, the user may input the characteristics 1402 by selecting (e.g., touching, "clicking," or the like) an icon or image 1404 of the component subsystem 110 (and/or equipment 108). The illustrated example shows several images 1404 of axle and wheel sets for a rail vehicle, such as a locomotive. The number of images 1404 may correspond to the number of axle and wheel sets in the rail vehicle. Optionally, a different number, icon, and/or image may be used. The user may select one side (e.g., the left side) of the image 1404 for a first component subsystem 110 (e.g., a first axle wheel set) to input the actual dimensions of one wheel and select the other side (e.g., the right side) of the image 1404 for the same first component subsystem 110 to input the actual dimensions of the other wheel in the first component subsystem 110. The user may progress through the other images 1404 to input additional dimensions for the other axle and wheel sets.

Additionally or alternatively, one or more of the input characteristics 1402 may be automatically uploaded into the user device 104. For example, one or more sensors, transponders, or the like, may automatically communicate the input characteristics 1402 (such as speed, temperature, pressure, flow rate, dimensions, or the like) to the user device 104. The user device 104 may populate the user interface 1400 with the input characteristics 1402.

The user device 104 can display a comparison icon 1406 that, if selected by the user, causes the actual characteristics 1402 to be compared to one or more designated characteristics. For example, once the actual characteristics 1402 are input into the user device 104, the comparison icon 1406 may be selected to cause the actual dimensions of the wheels to be compared to corresponding designated characteristics of the wheels. The designated characteristics may represent desired or acceptable values of the characteristics of the component subsystem 110 (and/or equipment 108). With respect to wheels, for example, the designated characteristics may represent dimensional tolerances, or ranges or limits on the sizes of the dimensions of the wheels.

The analysis system 102 may receive the actual characteristics from the user device 104 and compare the actual characteristics to the designated characteristics (e.g., stored in the memory device 112). Optionally, the user device 104 and/or one or more of the resources 106 may compare the actual and designated characteristics. Differences between the actual and designated characteristics may be identified. If one or more differences between the actual characteristics (e.g., wheel dimensions) and the designated characteristics (e.g., wheel dimensions that are acceptable for safe travel and/or satisfy one or more rules or regulatory requirements) is relatively large (e.g., exceeds a threshold), then the analysis system 102 (and/or the user device 104, the resources 106, and so on) may notify the user of these differences.

FIG. 15 is another example of a user interface 1500 that can be displayed on the user device 104. The user interface 1500 presents the comparisons between the actual and designated characteristics of the component subsystem 110 (and/or equipment 108) that is under examination by the user of the device 104. The user interface 1500 also or alternatively can present recommendations for the component subsystem 110 (and/or equipment 108).

The comparisons and/or recommendations may be represented or identified by analysis icons 1502, 1504. These icons 1502, 1504 can represent recommended changes to the component subsystems 110 (and/or equipment 108) under examination. Optionally, the icons 1502, 1504 can represent the differences between the actual and designated characteristics.

In the illustrated example, the user interface 1500 presents the icons 1502, 1504 to recommend changing the dimensions of the wheels and/or to replace the wheels. The analysis system 102 (and/or the user device 104 and/or one or more resources 106) may compare the differences between the actual and designated characteristics to one or more thresholds, which can be stored in the memory device 112. If the differences exceed a first threshold, then the analysis system 102 (and/or the user device 104 and/or one or more resources 106) may determine that a responsive action needs to be taken, such as by repairing or replacing the component subsystem 110. If the differences exceed the first threshold, but not a larger, second threshold, then the analysis system 102 (and/or the user device 104 and/or one or more resources 106) can recommend repairing the component subsystem 110. In the illustrated example, such a repair may occur by changing the dimensions of the wheel (e.g., cutting or otherwise removing part of the wheel) so that the differences between the actual and designated characteristics no longer exceed the first threshold. If the differences exceed both the first and second thresholds, then the analysis system 102 (and/or the user device 104 and/or one or more resources 106) can recommend replacing the component subsystem 110, such as by replacing one or more wheels in the axle and wheel set or the entire axle and wheel set.

In the illustrated example, for a first component subsystem 110A (e.g., the first axle and wheel set), the icons 1504 recommend replacing both wheels of the subsystem 110A. The differences between the actual and designated wheel dimensions are sufficiently large such that the analysis system 102 (and/or the user device 104 and/or one or more of the resources 106) recommends replacing the component subsystem 110A.

For second and fourth component subsystems 110B, 110D (e.g., a second and fourth axle and wheel set), no recommendations or differences are presented. For example, the differences between the actual and designated wheel dimensions of the second and fourth component subsystems 110B, 110D are sufficiently small that the analysis system 102 (and/or the user device 104 and/or one or more of the resources 106) does not recommend changing the dimensions or replacing any wheels.

For third, fifth, and sixth component subsystems 110C, 110E, 110F (e.g., a third, fifth, and sixth axle and wheel set), the differences between the actual and designated wheel dimensions are sufficiently large such that the analysis system 102 (and/or the user device 104 and/or one or more of the resources 106) recommends changing the dimensions of one or more wheels, but not replacing any wheels. For example, the differences between the actual and designated wheel dimensions of the component subsystems 110C, 110E, 110F are sufficiently large that the dimensions need to be changed, but also are sufficiently small that the wheels do not need to be replaced. The icons 1502 can provide recommended changes to the component subsystems 110C, 110E, 110F, such as by providing recommended changes to the actual dimensions of the wheels.

Responsive to the analysis system 102 (and/or the user device 104 and/or the resources 106) identifying the recommended changes and the user device 104 presenting these recommended changes to the user, the user may alter the dimensions of the wheels accordingly. In one aspect, the user device 104 may present a recommended work scope having a series of actions that guide the user through modification of the dimensions of the wheels, similar to as described above.

Additionally or alternatively, the user device 104 may present the user with replacement parts or component subsystems 110 for replacing (instead of repairing) the component subsystems 110. For example, instead of modifying the dimensions of the wheels in the component subsystems 110C, 110E, 110F shown in FIG. 15, the user device 104 may list or otherwise display replacement wheels for replacing these wheels (in addition to the replacement wheels for the component subsystem 110A).

Figure 16:
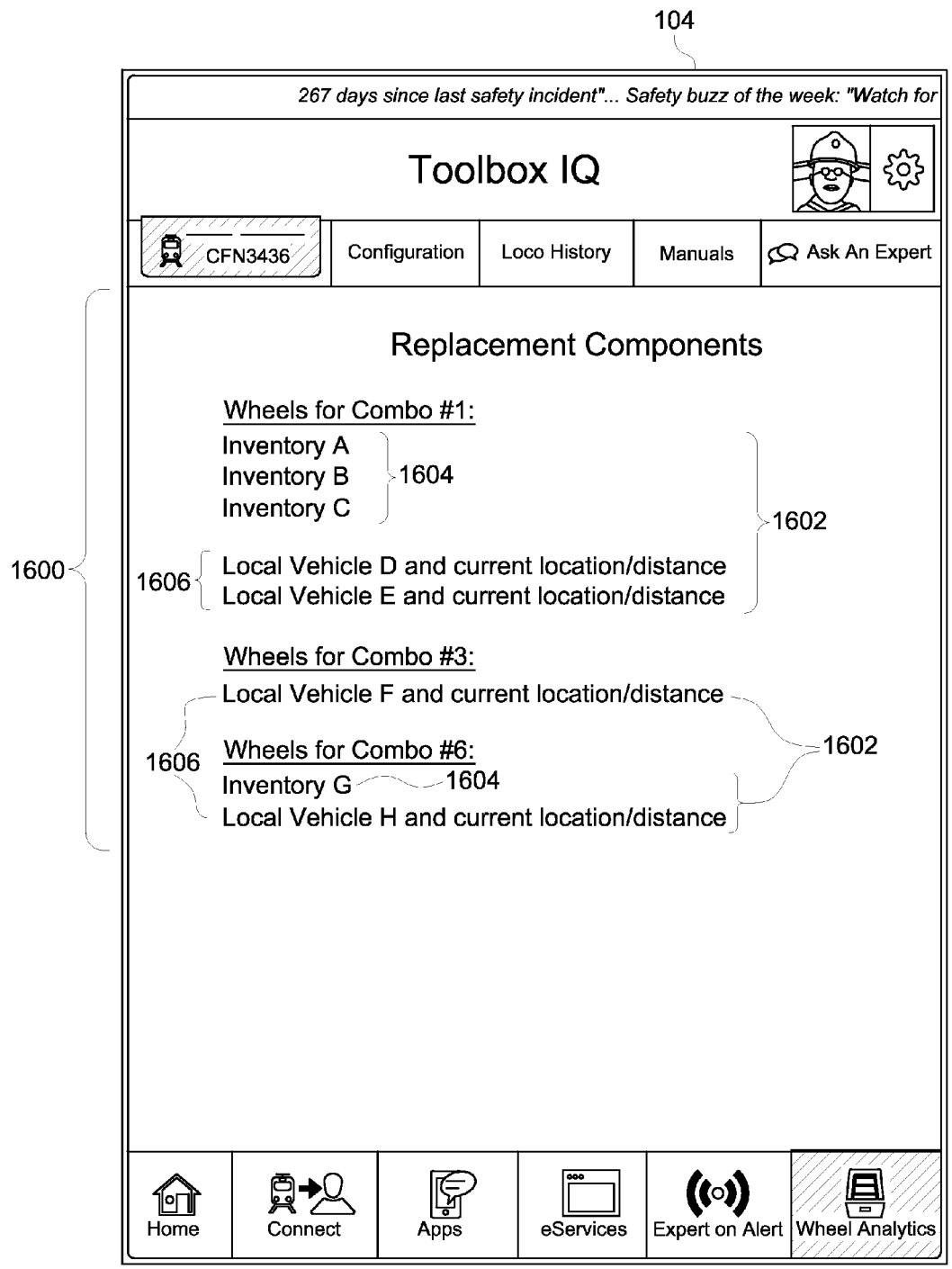
FIG. 16 illustrates another example of a user interface that can be displayed on the user device.

FIG. 16 illustrates another example of a user interface 1600 that can be displayed on the user device 104. The user interface 1600 presents the user with options for replacing parts of the component subsystems 110. For example, the user interface 1600 lists replacement parts 1602 (e.g., wheels) that may be used to replace parts of the component subsystems 110A, 110C, 110F. While the description herein focuses on replacement wheels, not all embodiments of the inventive subject matter are limited to wheels. For example, one or more embodiments may relate to other parts, such as replacement filters, motors, engines, trucks, rail cars, turbochargers, pumps, or the like.

In order to identify the replacement parts 1602, the analysis system 102 (and/or the user device 104 and/or the resources 106) may examine a list, table, database, or other memory structure stored in the memory device 112 that includes a set of replacement parts 1602. This set may include characteristics of the replacement parts 1602, such as the actual dimensions of wheels. The analysis system 102 can determine if one or more of these replacement parts 1602 have characteristics (e.g., dimensions) that are within designated characteristics. For example, the analysis system 102 can determine if the dimensions of one or more replacement wheels in a spiker pool are within designated ranges of dimensions identified as being acceptable for use with a vehicle, such as a locomotive.

Additionally or alternatively, the analysis system 102 can determine if the characteristics of the replacement parts 1602 more closely match the measured characteristics of the component subsystems 110. With respect to axle and wheel sets, if the analysis system 102 determines that one wheel of the set needs to be replaced, the analysis system 102 may search for a replacement wheel that has dimensions that are closer to the wheel that remains in the set (e.g., that is not being replaced) than one or more other replacement wheels.

The replacement parts 1602 may include inventory stock parts 1604 that are obtained from an inventory stock (e.g., a spiker pool) of replacement parts. Such an inventory stock represents a group of parts that is not currently being used and is available for replacing one or more parts in the component subsystem 110 and/or equipment. The inventory stock parts 1604 in the inventory stock are not currently being used in operation by another component subsystem 110 and/or equipment 108.

Additionally or alternatively, one or more of the replacement parts 1602 may be currently used parts 1606. The currently used parts 1606 are being used in operation of one or more other component subsystems 110 and/or equipment 108. For example, a replacement wheel for an axle and wheel set of a first vehicle may be a wheel that is currently being used by another, separate vehicle traveling along a route while the first vehicle is being examined in a repair facility. The analysis system 102 may maintain a log, list, table, or other memory structure in the memory device 112 of the parts 1606 being currently used by other component subsystems 110 and/or equipment 108. The characteristics of these parts 1606 may be stored in the memory devices 112 as well, and may be obtained from previous inspections of the parts 1606, sensor data provided by the component subsystems 110 and/or equipment 108, or the like. Similar to the inventory parts 1604, the analysis system 102 may examine the characteristics of the currently used parts 1606 to determine if any of the currently used parts 1606 may be used as a replacement part. The analysis system 102 also may track locations of the currently used parts 1606, such as by monitoring locations of the vehicles traveling in a network of routes. The locations may be provided by the vehicles, such as by using Global Positioning Systems, transponders disposed along the routes, or the like. The analysis system 102 may provide the current location and/or distance from the component subsystems 110 and/or equipment 108 that include the replacement parts 1606 to the user device 104, so that this information can be provided to the user. The user may then select one or more of these replacement parts, such as by selecting the replacement parts 1602 that are available from a local inventory, from another vehicle that is relatively close by, or the like.

The user can select the replacement parts 1602 using the user device 104. This selection can be communicated to the analysis system 102 or another location so that arrangements can be made to provide the selected replacement parts to the user. For example, an order for an inventory part to be obtained and sent to the location of the user may be automatically made by the user device 104. As another example, instructions may be communicated to another vehicle having a replacement part 1606 to divert from the current path or route being traveled to the location of the user device 104 (so that the replacement part 1606 can be taken from the other vehicle).

Figure 17:
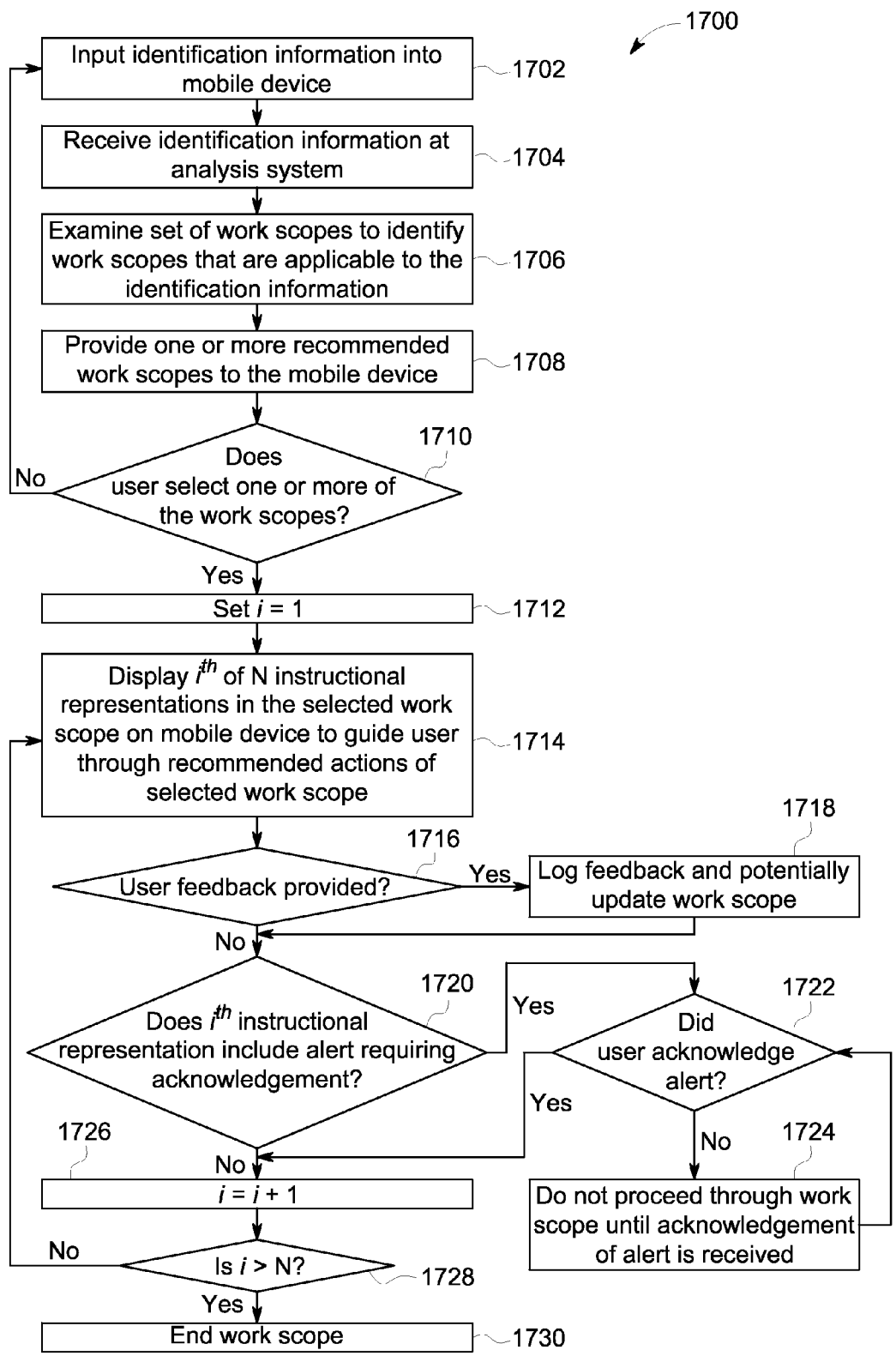
FIG. 17 is a flowchart of an example of a method for remotely supporting users to obtain assistance from one or more remotely located resources to repair, replace, diagnose, and the like, component subsystems of equipment on which the users are working.

FIG. 17 is a flowchart of an example of a method 1700 for remotely supporting users to obtain assistance from one or more remotely located resources to repair, replace, diagnose, and the like, component subsystems of equipment on which the users are working. Operations of the method 1700 may be carried out or otherwise performed by the system 100 shown and described herein. For example, one or more of the operations in the method 1700 may be performed using the user device 104 while other operations may be performed by the analysis system 102 and/or the resources 106. Some operations may be carried out by a combination of the user device 104 and the analysis system 102 or resources 106. In one aspect, the operations described in connection with the method 1700 may represent portions of software code that directs operations of one or more components of the system 100. For example, the flowchart shown in FIG. 17 may be used to create software code that is stored on a tangible and non-transitory computer readable storage medium (e.g., a memory hard drive, flash drive, RAM, ROM, EEPROM, and the like) and that directs the operations of one or more processors to carry out the operations of the method 1700.

At 1702, identification information is input into a mobile device. For example, information that identifies the component subsystem 110 and/or equipment 108 being examined or repaired and/or a potential problem or fault can be input by a user into the user device 104, as described above. At 1704, the identification information can be communicated to and received by the analysis system 102. As described above, the user device 104 may be located at or near the component subsystem 110 and/or equipment 108 while the analysis system 102 is located remote from the user device 104 (e.g., not in one or more of the same room, building, town, city, county, or state). Optionally, the identification information may be communicated to the resources 106.

At 1706, a set of work scopes are examined to identify a smaller set of work scopes that may be used to resolve (e.g., fix) the problem or fault of the component subsystem 110 and/or equipment 108. For example, the memory device 112 may store many work scopes that are used for a variety of different problems or faults for a variety of different types of component subsystems 110 and/or equipment 108. Not all of these work scopes may be useful in examining or repairing the component subsystem 110 and/or equipment 108 being worked on by the user. The identification information provided from the user device 104 can be compared to identification information associated with the different work scopes. Those work scopes in the set having identification information that matches or more closely matches the input identification information than other work scopes may be identified as recommended work scopes. In one aspect, the analysis system 102 may automatically perform this comparison and selection of the work scopes. Optionally, one or more of the resources 106 (e.g., experts and/or technicians) may examine the input identification information and recommend one or more work scopes.

At 1708, one or more of the recommended work scopes are provided to the user via the user device 104. The work scopes may be presented on the user device 104 for the user to select which of the work scopes to use in the examination and/or repair of the component subsystem 110 and/or equipment 108. At 1710, a determination is made as to whether the user selected one or more of the recommended work scopes. For example, the user device 104 and/or analysis system 102 can determine whether the user pressed on, "clicked," or otherwise provided input that indicates selection of a work scope.

If the user did not select a recommended work scope, then the user may wish to have another work scope recommended. For example, the recommended work scope provided to the user at 1708 may require resources 106 (e.g., tools, equipment, technicians, experts, or the like) that are unavailable to the user, may take too long to complete, may be too expensive to complete, or the like. Flow of the method 1700 may return to 1702 to obtain additional identification information in an attempt to identify another recommended work scope to the user. Optionally, flow of the method 1700 may return to 1706 so that another recommended work scope may be identified using the same identification information that previously was input.

If the user did select a recommended work scope, then flow of the method 1700 may proceed to 1712. At 1712, the value of a variable i is set to one. This variable is an integer number that represents which instructional representation of an action of N total actions in a work scope is being performed or presented to the user. At 1714, the $i^{th}$ recommended action in the work scope is displayed to the user as an instructional representation on the user device 104. As described above, the actions in the work scope are presented to the user to guide and assist the user through the examination, repair, or the like, of the equipment 108 and/or component subsystem 110. The user may perform the action, provide feedback based on the action, obtain assistance from one or more resources in performing the action, and the like, as described above.

At 1716, a determination is made as to whether the user has input feedback information about the $i^{th}$ action in the work scope. As described above, the user can input feedback about safety concerns with the action, inefficiencies in the action or work scope, inoperability of the action or work scope, and the like. The user can provide this information to the analysis system 102 via the user device 104.

If feedback information has been provided, then this information may be recorded and/or used to modify the action and/or work scope in order to improve the action and/or work scope. As a result, flow of the method 1700 can proceed to 1718. Otherwise, if no feedback information has been provided for the current action of the work scope, then flow of the method 1700 may proceed to 1720.

At 1718, the feedback provided by the user via the user device 104 is logged (e.g., stored or otherwise saved or recorded). The feedback can be stored in the memory device 112 and potentially used to update or alter the work scope. For example, upon receiving the feedback, one or more of the resources 106 may alter the action and/or the work scope using the feedback so that the action and/or work scope is safer, more efficient, and/or successful in fixing or otherwise resolving the problem or failure in the component subsystem 110 and/or equipment 108.

At 1720, a determination is made as to whether the work scope includes an alert requiring acknowledgement by the user in the $i^{th}$ action of the work scope. As described above, the instructional representations in the work scope can include alerts that may require the user to provide input that acknowledges the alert before the work scope can proceed to the next action. If the instructional representation for the $i^{th}$ action of the work scope includes such an alert, then the method 1700 may not advance the work scope to another action until the user provides an acknowledgement of the alert. Consequently, flow of the method 1700 can proceed to 1722. On the other hand, if no such alert is included in the instructional representation of the $i^{th}$ action, or if an alert is provided that does not require any such acknowledgement, the work scope may advance to the next action in the work scope. As a result, flow of the method 1700 may proceed to 1726.

At 1722, a determination is made as to whether the user provided the requisite acknowledgement of the alert. For example, the user device 104 and/or analysis system 102 can examine if the user selected (e.g., touched, "clicked" on, or otherwise activated) an alert icon or other portion of the user interface presented on the user device 104. If an acknowledgement of the alert is received, then the work scope may proceed and flow of the method 1700 can continue to 1726. If an acknowledgement is not received, then the work scope may be unable to proceed. Flow of the method 1700 can continue to 1724, where the method 1700 waits for receipt of acknowledgement from the user. Once that acknowledgement is received, flow of the method 1700 can continue to 1726.

At 1726, the value of the variable i is increased by a value of one. This increase represents the advancement of the work scope to another action in the work scope. In one aspect, the work scope advances to the next action in a series of actions in the work scope. Optionally, the work scope may proceed to another action, but not necessarily the next action, in the work scope.

At 1728, a determination is made as to whether the work scope has been completed. For example, if the value of i (after being increased at 1726) is greater than the total number of actions in the work scope (e.g., N), then all actions in the work scope may have been completed. As a result, flow of the method 1700 can proceed to 1730, where the work scope terminates. On the other hand, if the value of i is no greater than the total number of actions in the work scope, then additional actions in the work scope may need to be performed before the work scope is completed. As a result, flow of the method 1700 may return to 1714, where another action in the work scope is performed.

Figure 18:
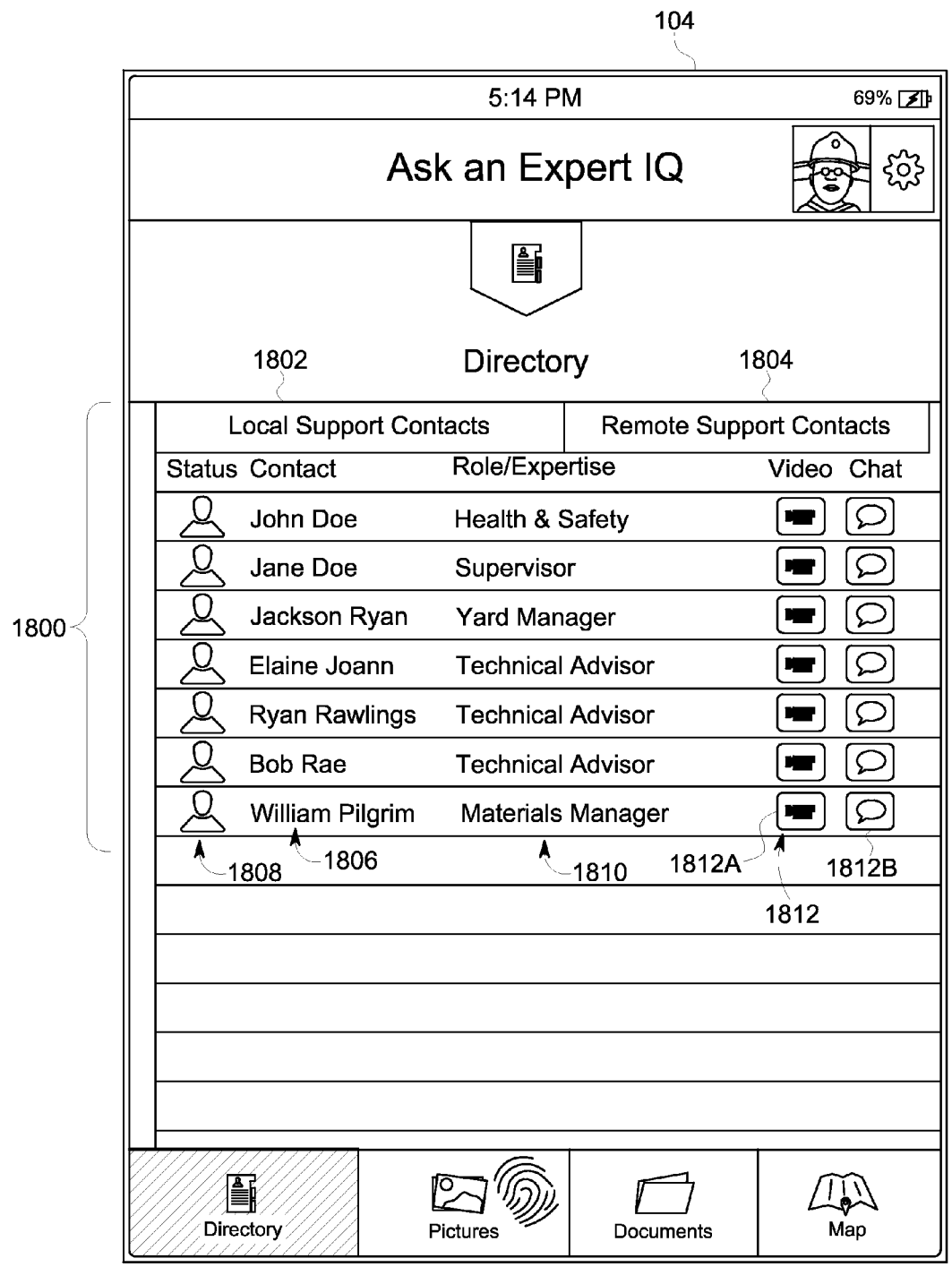
FIG. 18 illustrates another example of a user interface that can be displayed on the user device.

FIG. 18 illustrates an example of a user interface 1800 that can be displayed on the user device 104. As described above, one or more interfaces displayed on the user device 104 can include the expert assistance icon 302, or another input mechanism that allows for the user to request assistance from one or more remotely located experts. The user may select the icon 302 and, in response thereto, the analysis system 102 may identify a set of potential experts with which the user may converse using the user device 104.

The analysis system 102 can maintain a list, table, database, or other memory structure that associates different human experts with various areas of expertise, types of component subsystems 110 and/or equipment 108 in which the experts have specialized skill, current locations of the experts, current availabilities of the experts, titles of the experts, communication abilities of the experts, and the like.

The areas of expertise and/or specialized skills can include the different types of knowledge that the experts have increased knowledge and/or experience relative to the user and/or other experts. For example, a first expert may have many more years of experience, training, and/or education in repairing and maintaining cooling systems for rail vehicles than a second expert, the second expert may have more experience, training, and/or education in motors than one or more other experts, and so on.

The current locations of the experts represents where the experts are located when the user device 104 requests assistance from the experts. The current locations may be useful for the user to determine if an expert is close enough to the user device 104 that the expert can travel to the user (or the user can travel to the expert). The current locations of the experts may be tracked by Global Positioning System receivers, transponders, or devices that wirelessly triangulate locations of the experts (e.g., using cellular towers or other wireless transceivers) and that report the locations of the experts to the analysis system 102. Additionally or alternatively, the current locations of the experts may be reported by the experts themselves, such as by the experts inputting their locations into the resources 106 (which is then reported to the analysis system 102), the presence of the experts being automatically detected (e.g., when the experts clock-in or otherwise appear for work, when an identification badge of the expert is used to log the presence of the expert, or the like), and/or the presence of the experts being input by a third party, such as a shift manager at a place where the experts work. As one example, mobile devices carried by the experts (e.g., resources 106, such as cellular phones) may report the locations of the experts to the analysis system 102.

The current availabilities of the experts can represent whether or not the expert is currently able to assist the user with a work scope. For example, if the resource 106 (e.g., computer device such as a tablet, smart phone, desktop computer, laptop, or the like) used by the expert is currently connected to one or more networks (e.g., the Internet, an intranet, or another network) that are accessible to the user device 104, then the expert may be considered as being available to assist the user. If this resource 106 is not connected to the one or more networks, then the expert may be considered as being unavailable to assist the user.

The titles of the experts represent the job and/or position of the expert. For example, some experts may have supervisory roles in their employment. These types of experts may have greater leeway or ability relative to the user or other experts to approve requests from the user or others in order to perform a work scope, to reserve equipment or tools needed for the work scope, to approve overtime or additional expenditures in performance of the work scope, and the like.

The communication abilities of the experts represent the various manners in which the experts can communicate with the user via the user device 104. The communication abilities can indicate the ways in which the resources 106 being used by the experts can communicate with the user device 104. For example, some resources 106 may include a keyboard or other input device that allows the expert to type text in order to communicate with the user device 104. Some resources 106 may additionally or alternatively include a camera that allows the experts to visually communicate with the user device 104, such as by obtaining images (e.g., static or still images and/or videos) to send to the user device 104. Some of the resources 106 may additionally or alternatively include a microphone and/or speaker that allow the expert to audibly communicate with the user device 104.

When a user requests assistance from an expert (e.g., by selecting the icon 302 or otherwise requesting expert assistance), the analysis system 102 can select one or more sets of experts to present to the user on the user device 104. The sets of the experts may be selected from a larger group or set of potential experts. For example, using the identification information provided from the user device 104, the analysis system 102 may compare the type of identified component subsystem 110 and/or equipment 108 with the areas of expertise associated with the various experts in the larger set of potential experts. The areas of expertise may be listed with the respective experts in the memory device 112. The analysis system 102 can select those experts having areas of expertise that match the type of component subsystem 110 and/or equipment 108 identified by the identification information for inclusion in the set(s) of experts. Additionally or alternatively, the analysis system 102 can select those experts having areas of expertise that more closely match the type of component subsystem 110 and/or equipment 108 than one or more other experts for inclusion in the set(s) of experts. For example, if the component subsystem 110 that is identified is a fraction motor of a locomotive, the analysis system 102 may only include those experts having areas of expertise that include traction motors for locomotives in the set, or may include experts having expertise in traction motors (but not necessarily for locomotives), experts having expertise in propulsion systems of rail vehicles, or the like.

Optionally, the analysis system 102 may select the experts that are currently available for inclusion in the set(s). As another option, the analysis system 102 may select those experts that are located within a designated distance from the user device 104 for inclusion in the set(s). Additionally or alternatively, the analysis system 102 may select those experts having a particular title or position for inclusion in the set. Optionally, the analysis system 102 may select those experts having a particular (e.g., user-selected) communication capability for inclusion in the set.

The analysis system 102 communicates the set(s) of experts that are selected using the identification information to the user device 104. The user interface 400 shown in FIG. 4 provides one example of a manner in which the user device 104 may present the set(s) of experts. The user interface 1800 includes two sets 1802, 1804 of experts 1806, although a single set or more than two sets may be shown. In the illustrated example, the experts 1806 are arranged in the sets 1802, 1804 based on the locations of the experts 1806 relative to the user device 104. The experts 1806 in the illustrated set 1804 that is labeled "remote support contacts" are located at least a designated distance away from the user device 104, such as in another room, building, town, zip code, city, county, state, country, or the like. The experts 1806 in the set 1802 that is labeled "local support contacts" are located no farther than the designated distance from the user device 104. Optionally, the experts 1806 may be grouped into sets by another characteristic of the experts

1806, such as by areas of expertise, current availabilities, titles, communication abilities, or the like.

In the illustrated example, the user may switch between which of the sets 1802, 1804 is displayed by selecting the set 1802, 1804 (e.g., touching or "clicking" on the tab associated with the set or otherwise selecting a set). Alternatively, more than one set may be concurrently displayed.

The user interface 1800 displays additional information for the experts 1806. For example, the user device 104 may display status icons 1808 (or other graphics, images, symbols, or the like) that represent the current availabilities of the experts 1806. One type and/or color of the status icon 1808 may indicate that the expert 1806 is currently available to assist the user (e.g., a green symbol), another type and/or color of the status icon 1808 may indicate that the expert 1806 is not currently available, but may be available within a designated time period to assist the user (e.g., a yellow symbol), and another type and/or color of the status icon 1808 may indicate that the expert 1806 is not available to assist the user (e.g., a red symbol).

The user device 104 can display titles 410 of the experts 1806. In the illustrated example, text strings of the titles 1810 are used, but optionally, the user device 104 may display icons, graphics, images, symbols, or the like, to represent the titles 1810. The user device 104 may display communication icons 1812 (e.g., icons 1812A, 1812B) representative of the modes of communication that are available for one or more of the experts 1806. In the illustrated example, the communication icon 1812A indicates that the corresponding expert 1806 may communicate with the user device 104 using images (e.g., still images and/or video) and the communication icon 1812B indicates that the corresponding expert 1806 may communicate with the user device 104 using typed communications. Optionally, one or more other icons may be displayed to represent other modes of communication (e.g., audio). While both icons 1812A, 1812B are shown for each expert 1806 in FIG. 18, alternatively, one or more of the experts 1806 may have one icon 1812A or 1812B but not the other icon 1812B or 1812A. This may indicate that the expert 1806 does not have the mode of communication associated with the absent or missing icon 1812.

Figure 19:
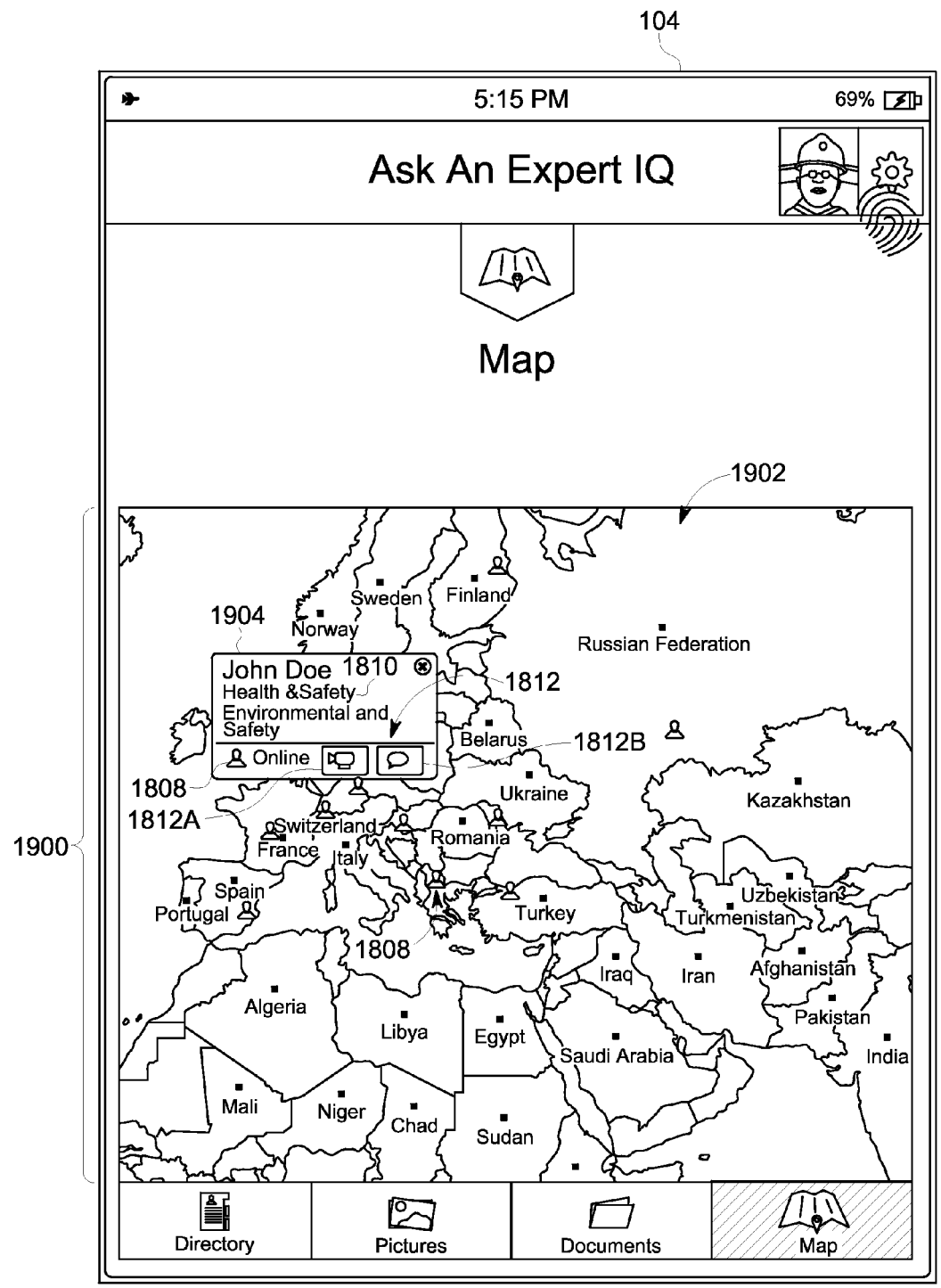
FIG. 19 illustrates another example of a user interface that can be presented on the user device.

With continued reference to the user interface 1800 shown in FIG. 18, FIG. 19 illustrates another example of a user interface 1900 that can be presented on the user device 104. In contrast to the list of experts 1806 shown in the user interface 1800 in FIG. 18, the user interface 1900 includes a map 1902 that shows locations of the various experts 1806 in one or more of the sets 1802, 1804. The locations of the experts 1806 are represented by the placement of the communication icons 1812 on the map 1902. Alternatively, these locations may be represented in another manner. Upon selecting one or more of these communication icons 1812, an information window 1904 can be displayed to the user on the user device 104. This information window 1904 can include additional information about the expert 1806, such as the name of the expert 1806, the area of expertise, the title 1810, the status icon 1808, the communication icon 1812, and the like.

The user may select one or more of the experts 1806 with which to communicate by selecting the expert 1806 and/or one or more of the communication icons 1812 on the user interface 1800. When an expert 1806 is selected, the user device 104 may present a corresponding communication interface. For those experts 1806 that are able to communicate with images (e.g., still images and/or video), the user device 104 may display an image that is obtained by the expert (e.g., a camera included in or connected with the corresponding resource 106). The user device 104 may additionally or alternatively present a user interface that displays text that is input by the expert 1806 and/or the user, such as in a chat room.

The user may select an expert with which to communicate in order to select a work scope for a component subsystem 110 and/or equipment 108, and/or to troubleshoot (e.g., examine) the subsystem 110 and/or equipment 108. The user may communicate, from the user device 104, images, videos, data, and the like, to the resource 106 being used by the expert. The expert may review this information and recommend a work flow to the user.

For communication between the user device 104 and the resource 106 of an expert, the user device 104 and/or the analysis system 102 can communicate the identification information provided by the user device 104 to the expert. The expert can review the information and recommend a previously created work scope and/or an expert-created work scope. The previously created work scope may include a series of actions that are to be performed by the user and that was not created by the expert. Such a work scope may be previously stored in the memory device 112. The expert can send a signal from the resource 106 to the analysis system 102 to direct the previously created work scope to be sent to the user device 104. The expert created work scope may include a series of actions that are to be performed by the user and that was created by the expert. Such a work scope may be created by the expert combining several actions into a group during a current communication session with the user device 104. The expert can send a signal from the resource 106 to the user device 104 to send the work scope to the user device 104.

Figure 20:
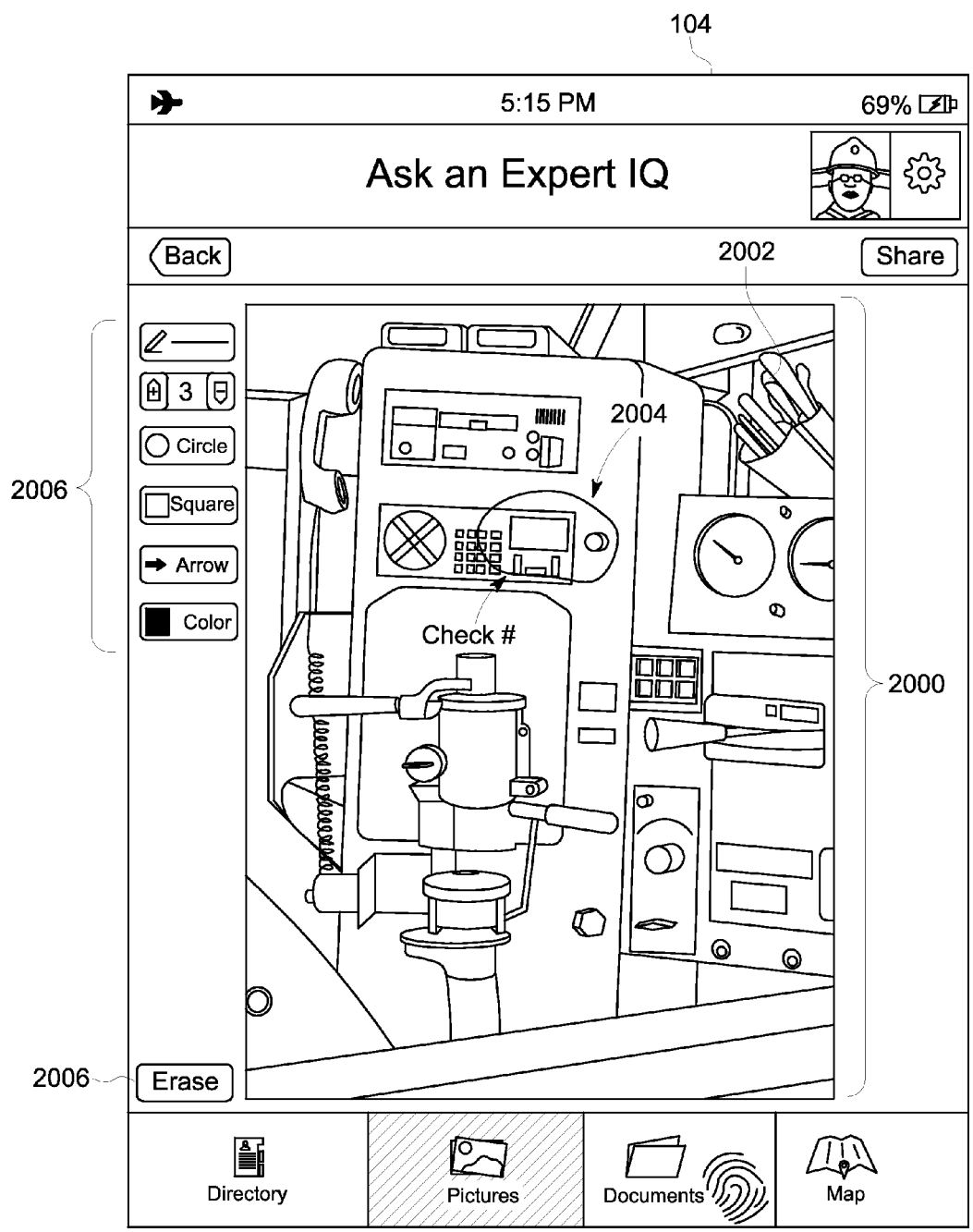
FIG. 20 illustrates another example of a user interface displayed by the user device.

FIG. 20 illustrates another example of a user interface 2000 displayed by the user device 104. The illustrated user interface 2000 includes an image 2002 of a component subsystem 110 or equipment 108, along with user-drawn indicia or markings 2004. The image 2002 may be obtained by a camera included in or connected to the user device 104, or may be obtained by another camera and transferred to the user device 104. The image 2002 may be a still image or a video.

During performance of a work scope, the user may obtain the image 2002 to present to one or more experts via a wired and/or wireless communication link between the user device 104 and one or more of the resources 106. The user may provide the image 2002 to the experts so that the user may query the experts about the subsystem 110, equipment 108, and/or action to be performed.

In one aspect, the user may use the user device 104 to annotate the image 2002 with the indicia or markings 2004 to point out various aspects or parts of the component subsystem 110 and/or equipment 108 to the expert. Several drawing tool icons 2006 are provided in the user interface 2000 to allow the user to select one or more drawing tools to create the markings 2004. The markings 2004 may be added to the image 2002 to annotate the image 2002 and to allow the user's questions or concerns about the component subsystem 110 and/or equipment 108 to be more clearly seen by the expert. The annotated image 2002 is communicated from the user device 104 to the resource 106 being used by the expert to view the image 2002.

Additionally or alternatively, the expert may provide the user with a selected set of guidance information on the user device 104. The selected set of guidance information including information can guide the user through the diagnosing, repairing, testing, or replacing the one or more component subsystems 110 of the equipment 108. One example of such guidance information includes an expert-recommended work scope, as described above.

During performance of the work scope by the user, however, one or more problems or issues may arise. For example, the actions recommended by the work scope may not work properly. Such actions may reflect an erroneous work scope, such as a work scope that includes one or more actions that cannot be performed on the component subsystem 110, cannot be performed in the order provided in the work scope, or the like. Consequently, the user may be unable to continue with the work scope or may need assistance from one or more of the experts.

As another example, the user may not have access to a tool, technician, or equipment (e.g., a mechanical lift, sensor, or the like) that is needed to complete one or more actions of the work scope. The tool, technician, or equipment may be unavailable at the current location of the user (such as when the user is away from a repair facility or the tool, technician, or equipment is currently being used by another user) and, as a result, the user is unable to continue with the work scope.

In another example, the financial cost of performing one or more of the actions in the work scope may be too high. The user may determine that the cost of one or more materials (e.g., fuel, replacement parts, or the like) will result in the total cost of examining or repairing the component subsystem 110 and/or equipment 108 exceeding a threshold budget. As a result, the user may not be allowed to continue with the work scope.

As another example, the time that may be required to complete one or more actions of the work scope, or to complete the entire work scope, may be longer than is permissible. As described above in connection with FIG. 7, the user device 104 may display a user interface that presents estimated completion times for various actions of a recommended work scope. The user may examine these estimated completion times and determine that the user does not have sufficient time to complete the work scope. For example, there may be insufficient time left in a work day to complete the work scope, the user may only have access to a tool for an insufficient length of time to complete the work scope, a technician assisting the user at the location of the user device 104 may not have sufficient time to complete one or more actions of the work scope, and the like.

In another example, the user may be incapable of performing one or more actions of the work scope. For example, the user may not have sufficient experience and/or knowledge, or may not be permitted to perform the actions due to restrictions on which persons are allowed to perform certain actions.

The user can notify the expert with whom the user is communicating about one or more of these problems with a work scope. In response, the expert may change the guidance information that is provided to the user. For example, the expert may change which of the work scopes that is recommended for the user to follow and/or modify one or more actions in the work scope being performed by the user. The expert can communicate a modification signal from the resource 106 to the analysis system 102 and/or the user device 104 to change which work scope is being used and/or to modify actions in the work scope. The modification signal can direct the analysis system 102 to send another, different work scope to the user device 104 and/or can direct the user device 104 to modify one or more actions of a work scope being displayed on the user device 104. In doing so, the expert may be able to replace the currently used work scope with another, different work scope and/or modify one or more actions of the currently used work scope during performance by the user of the actions in the currently used work scope. The expert may replace the currently used work scope with a replacement work scope that the user is able to perform, that takes less time and/or costs less to complete, that can be completed with tools and/or technicians that are available to the user, and/or that the user is capable of completing without the aid of others.

Another example of such guidance information includes an image sent from the resource 106 of the expert to the user device 104, or that the expert directs the analysis system 102 to provide to the user device 104. Similar to the user obtaining and/or annotating an image 2002, as described above, the expert may change the guidance information provided to the user during performance of the work scope, such as by annotating the same image 2002 provided by the user and sending the image 2002 back to the user, and/or obtaining and annotating another image for sending to the user device 104. For example, the expert may use the resource 106 to obtain an image or video of a working or functional component subsystem 110 to show to the user via the user device 104. The user may view this image or video to determine how the component subsystem 110 being worked on by the user should operate upon successful completion of the work scope.

In one aspect, the guidance information that the expert directs the user device 104 to present to the user may include documents that assist the user in performing the work scope. For example, one or more manuals, books, checklists, and the like, may be saved in electronic form on the memory device 112 and/or the user device 104. To assist the user, the resource 106 being used by the expert may communicate a command signal to the analysis system 102 and/or the user device 104 to present such documents to the user.

Figure 21:
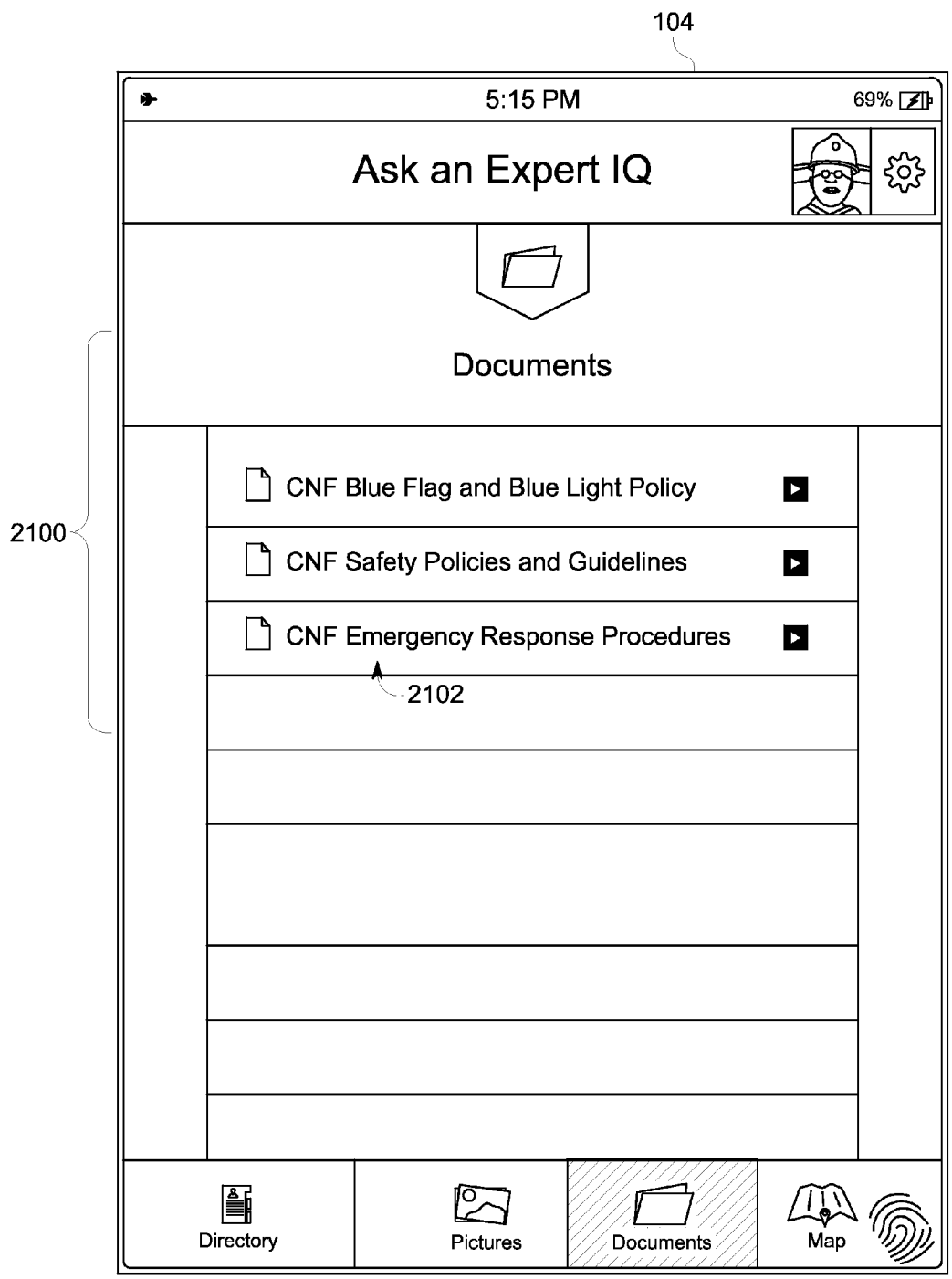
FIG. 21 illustrates an example of another user interface that may be displayed on the user device.

FIG. 21 illustrates an example of another user interface 2100 that may be displayed on the user device 104. The user interface 2100 provides documents to the user to assist during performance of one or more actions of a work scope. In the illustrated example, the user interface 2100 includes links 2102 (e.g., hyperlinks, file pointers, or the like) that, when selected by the user, can direct the user device 104 to obtain (e.g., download) and/or present the documents associated with the selected link 2102 on the user device 104. The documents may represent work scopes. In one aspect, the documents may include an electronic copy of a paper document, such as the recommended work scope 500 shown in FIG. 5.

During performance of the work scope by the user with the user device 104, one or more of the experts with whom the user device 104 is communicating may change which documents or other guidance information are presented to the user on the user device 104. The information that is changed may include manuals, guides, lists, images, videos, or audio files that direct a user of the mobile device through the at least one of diagnosing, repairing, testing, or replacing the one or more component subsystems 110. For example, an initial first set of documents may be shown and available to the user during performance of a first action in a work scope. During performance of a later, second action of the same work scope, an expert may want to present the user with a different image, video, action, document, or the like, that is previously or currently included in the work scope.

The expert may cause the resource 106 being used by the expert to communicate a change signal to the analysis system 102. This change signal can cause the analysis system 102 to vary which image, video, action, document, or the like, is shown on the user device 104. Additionally or alternatively, this change signal may be communicated to the user device 104 from the resource 106 to cause the same change. The expert(s) may continue to change what guidance information is presented to the user during the work scope in order to adapt the work scope to the changing needs of the user, such as when unforeseen problems (e.g., additional faults that were not previously identified, faults caused by performance of an action in the work scope, tools becoming unavailable, and the like) occur, the user requests additional guidance or information, or the like.

In one aspect, several experts can concurrently collaborate with a single user device 104. For example, the user may select two or more experts with whom to communicate at the same time. The user may want to receive guidance from several experts having the same or different areas of expertise. The user device 104 can display the images, videos, documents, or other guidance information provided by the different experts on the same user interface during performance of the same work scope. For example, the user device 104 can present an electronic bulletin board on which the guidance information from multiple different experts is displayed at the same time to the user.

Figure 22:
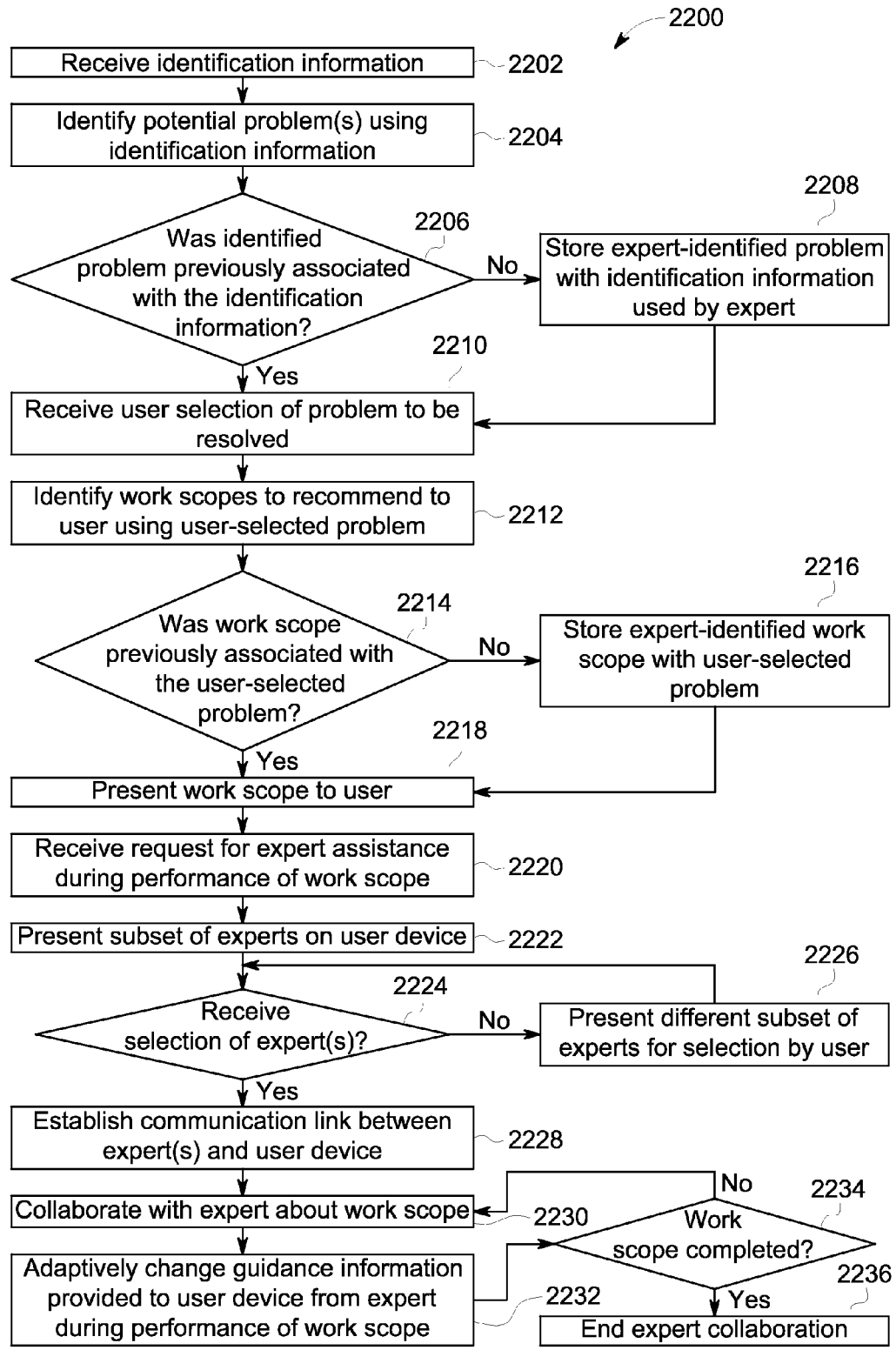
FIG. 22 is a flowchart of an example of a method for remotely collaborating with experts to repair, replace, diagnose, and the like, component subsystems of equipment.

FIG. 22 is a flowchart of an example of a method 2200 for remotely collaborating with experts to repair, replace, diagnose, and the like, component subsystems of equipment. Operations of the method 2200 may be carried out or otherwise performed by the system 100 shown and described herein. For example, one or more of the operations in the method 2200 may be performed using the user device 104 while other operations may be performed by the analysis system 102 and/or the resources 106 (e.g., as used by the experts). Some operations may be carried out by a combination of the user device 104 and the analysis system 102 or resources 106. In one aspect, the operations described in connection with the method 2200 may represent portions of software code that directs operations of one or more components of the system 100. For example, the flowchart shown in FIG. 22 may be used to create software code that is stored on a tangible and non-transitory computer readable storage medium (e.g., a memory hard drive, flash drive, RAM, ROM, EEPROM, and the like) and that directs the operations of one or more processors to carry out the operations of the method 2200.

At 2202, identification information is received from a mobile device. For example, information that identifies the component subsystem 110 and/or equipment 108 being examined or repaired and/or a potential problem or fault can be input by a user into the user device 104 and received by the analysis system 102 and/or resources 106, as described above. As described above, the user device 104 may be located at or near the component subsystem 110 and/or equipment 108 while the analysis system 102 and/or experts are located remote from the user device 104 (e.g., not in one or more of the same room, building, town, city, county, or state). Optionally, the identification information may be communicated to the resources 106.

At 2204, one or more potential problems (e.g., faults) of the component subsystem 110 and/or equipment 108 are identified using the identification information. For example, the identification information may be compared to identification information associated with several potential problems stored in the memory device 112 and those problems having identification information that more closely matches the user-provided identification information may be provided to the user device 104. Optionally, one or more experts may use the resources 106 to review the identification information provided by the user device 104 and, based on this information, select one or more potential problems for displaying on the user device 104.

At 2206, a determination is made as to whether the problem that is identified using the identification information was previously associated with the identification information in the data stored in the memory device 112. For example, if the problem was identified by the expert and not the analysis system 102, then the problem may have been identified heuristically and not by an automated comparison of the user-provided identification information to the identification information associated with various problems. In order to improve the ability of the analysis system 102 to make such automated comparisons going forward, the analysis system 102 may update the memory device 112. As a result, flow of the method 2200 may proceed to 2208. Otherwise, flow of the method 2200 may proceed to 2210.

At 2208, the expert-identified problem is stored in the memory device 112 and associated with the identification information used by the expert to identify the problem. The expert may communicate the identification information used to heuristically identify the problem to the analysis system 102, and the analysis system 102 can store the problem and associated identification information in the memory device 112. Going forward, similar identification information provided by a user device 104 can be used by the analysis system 102 to automatically identify the problem previously identified by the expert.

At 2210, a user selection of a problem to be resolved by the system 100 is received. As described above, the user may select one or more problems to be fixed or examined from a list of several problems identified by the analysis system 102 and/or experts and displayed on the user device 104. The selected problem(s) are communicated to the analysis system 102 and/or resources 106 of the experts.

At 2212, one or more work scopes are recommended based on the problem(s) selected by the user. For example, the selected problem(s) may be compared to problems associated with several work scopes stored in the memory device 112 and those work scopes having the same or similar associated problems may be provided to the user device 104. Optionally, one or more experts may use the resources 106 to review the user-selected problems and, based on this information, select one or more work scopes for recommending to the user on the user device 104.

At 2214, a determination is made as to whether the work scope that is recommended using the user-selected problem (s) was previously associated with the user-selected problem in the data stored in the memory device 112. For example, if the work scope was recommended by the expert and not the analysis system 102, then the work scope may have been identified heuristically and not by an automated comparison of the user-selected problem to the problem(s) associated with the various work scopes. In order to improve the ability of the analysis system 102 to make such automated comparisons going forward, the analysis system 102 may update the memory device 112. As a result, flow of the method 2200 may proceed to 2216. Otherwise, flow of the method 2200 may proceed to 2218.

At 2216, the expert-recommended work scope is stored in the memory device 112 and associated with the user-selected problem used by the expert to recommend the work scope. The analysis system 102 can store the user-selected problem and the associated expert-recommended work scope in the memory device 112. Going forward, similar problems selected by a user device 104 can be used by the analysis system 102 to automatically recommend the work scope.

At 2218, one or more of the recommended work scopes are provided to the user via the user device 104. The work scopes may be presented on the user device 104 for the user to select which of the work scopes to use in the examination and/or repair of the component subsystem 110 and/or equipment 108. As described above, the work scope may include several recommended actions that are displayed to the user as instructional representations on the user device 104. These actions in the work scope are presented to the user to guide and assist the user through the examination, repair, or the like, of the equipment 108 and/or component subsystem 110. The user may perform the action, provide feedback based on the action, obtain assistance from one or more resources in performing the action, and the like, as described above.

At 2220, a request for expert assistance is received by the analysis system 102 and/or by one or more of the resources 106. The user device 104 may communicate a request from the user during performance of the work scope when the user seeks guidance from experts in completing the work scope. At 2222, one or more sets of the experts that may assist the user is presented on the user device 104. As described above, this set may be selected based on availabilities, capabilities, locations, areas of expertise, and the like, of the experts. The set may be selected by the analysis system 102 and communicated to the user device 104 for presentation to the user.

At 2224, a determination is made as to whether the user selected any expert with which to collaborate during performance of the work scope. If the user did select an expert using the user device, then flow of the method 2200 may proceed to 2228. Otherwise, the user may want to view other options of experts. As a result, flow of the method 2200 can proceed to 2226.

At 2226, another, different set of experts is presented to the user. This set may differ from the previous sets in that one or more of the experts may be located a different distance away from the user device 104, may have different availabilities, may have different capabilities, may have different areas of expertise, and the like. Flow of the method 2200 may then return to 2224 to determine if the user selects an expert and/or to present another set of experts to the user.

At 2228, a communication link is established between the user device 104 and the resource(s) 106 of the expert(s) selected by the user. For example, the user device 104 and resources 106 may communicate using one or more wired and/or wireless connections, such as through the Internet, an intranet, and/or one or more other networks. At 2230, the user collaborates with the expert during performance of the work scope. As described above, the expert can use his or her expertise in assisting the user with performance of one or more actions in the work scope. The expert can provide guidance information, such as additional actions to perform, documents, images, videos, and the like, to the user during this collaboration.

At 2232, the guidance information that is provided to the user by the expert on the user device 104 changes during performance of the work scope. For example, the expert may change the actions in the work scope, change the documents provided to the user, annotate images obtained by the user and/or expert, and the like, during performance of the work scope in order to adapt to changing circumstances and/or unforeseen difficulties with the work scope.

At 2234, a determination is made as to whether the work scope has been completed by the user, or at least the portion of the work scope where expert collaboration is sought by the expert has been completed. If so, then flow of the method 2200 may proceed to 2236, where collaboration with the expert is terminated, such as by ending the communication link between the user device 104 and the resource 106 of the expert. If the work scope and/or expert collaboration has not ended, then flow of the method 2200 may return to 2230 to allow further collaboration between the user and the expert.

Figure 23:
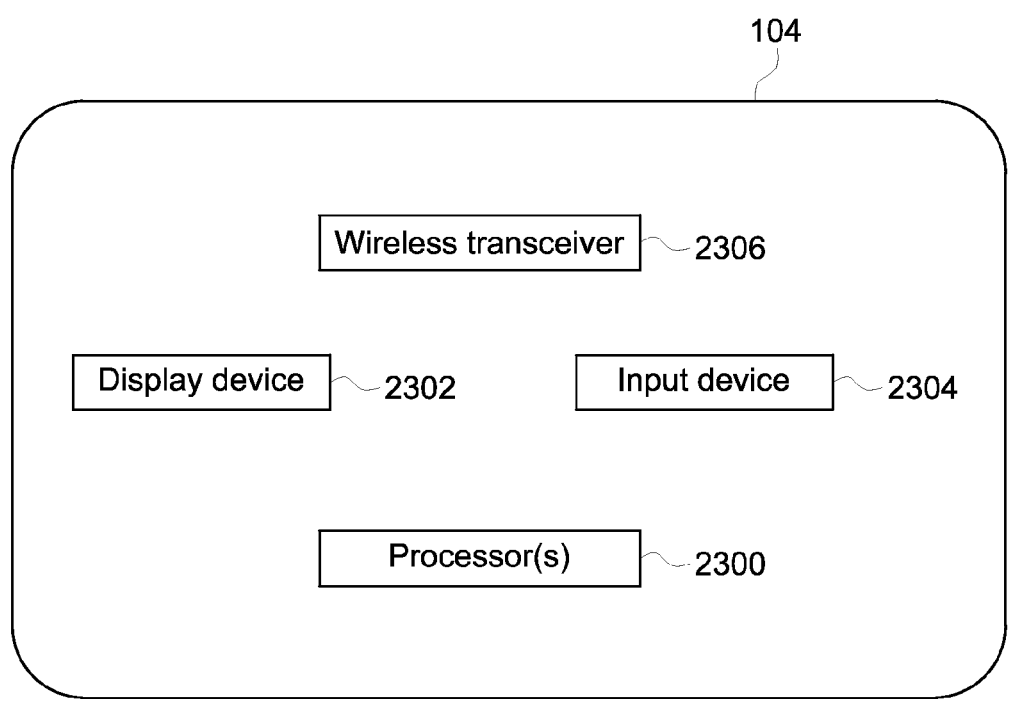
FIG. 23 illustrates the user device shown in FIG. 1 according to one embodiment.

FIG. 23 illustrates the user device 104 shown in FIG. 1 according to one embodiment. The user device 104 can be a mobile device, such as a tablet computer, a mobile phone, a laptop computer, or the like. Optionally, the user device 104 can be a stationary device, such as a desktop computer. The user device includes one or more processors 2300, which represent or include hardwire circuits or circuitry that include and/or are connected with one or more computer processors, such as one or more computer microprocessors. The processor 2300 optionally may represent one or more computer readable storage media (e.g., a computer memory such as a hard disk drive, an optical disk drive, EEPROM, RAM, ROM, or the like) having one or more sets of instructions (e.g., software) stored thereon for directing operations of the processor 2300. The processor 2300 may operate based on these instructions to perform the operations described herein.

The user device 104 includes a display device 2302, or display, that visually presents information to a user of the device 104. The display device 2302 may include a monitor or screen of a tablet computer, mobile phone, laptop computer, or the like, or may represent a monitor that is communicatively coupled with, but not part of the same housing as, the user device 104. For example, the display device 2302 may be a second screen of the user device 104. In one embodiment, the display device 2302 may represent a touchscreen that is able to detect one or more touches as input from the user. The display device 2302 can present the graphical interfaces and displays described herein and shown in the Figures.

The user device 104 includes an input device 2304 that detects input from a user of the user device 104. The input device 2304 can represent an electronic mouse, stylus, keyboard, microphone, touchscreen, or the like. In one embodiment, both the input device 2304 and the display device 2302 can represent the same touchscreen. Alternatively, the input device 2304 may be a touchscreen that is separate from the display device 2302.

The user device 104 includes a wireless transceiver 2306 that represents hardwire transceiving circuits or circuitry that are connected with or include one or more antenna able to wirelessly communicate (e.g., transmit, broadcast, receive, etc.) electronic signals from one or more other locations. The wireless transceiver 2306 can communicate with one or more remote locations, as described herein, to permit the user of the user device 104 to communicate with one or more experts or other persons. The display device 2302, input device 2304, and the wireless transceiver 2306 are operably coupled to the processor 2300 such that the processor 2300 can control operations of and/or communicate with the display device 2302, input device 2304, and the wireless transceiver 2306.

As described herein, the processor 2300 is configured to receive identification information from an operator or user via the input device 2304. The identification information is representative of one or more components. The processor 2300 is configured to control the wireless transceiver 2306 for communication of the identification information to a remotely located analysis system. The processor 2300 also is configured to receive an expert-identified work scope based on the identification information that was communicated to the analysis system. The expert-identified work scope is received by the wireless transceiver 2306 and includes a set of guidance information to guide the operator through one or more of diagnosing, repairing, testing, or replacing the one or more components. The processor 2300 is configured to control display of the expert-identified work scope on the display device 2302 during performance of the one or more of diagnosing, repairing, testing, or replacing the one or more components in order to guide the operator through one or more of diagnosing, repairing, testing, or replacing the one or more components. The processor 2300 is configured to control communicative coupling of the user device 104 with one or more remotely located expert personnel during performance of the one or more of diagnosing, repairing, testing, or replacing the one or more components to allow the one or more remotely located expert personnel to assist the operator with performance of the one or more of diagnosing, repairing, testing, or replacing the one or more components.

In one embodiment, a method (e.g., for remotely providing expert assistance) includes receiving first identification information from a first mobile device of a remotely located operator. The first identification information is representative of one or more components of a system. The method also includes communicating the first identification information to one or more expert personnel remotely located from the operator and receiving an expert-identified work scope based on the first identification information that was communicated to the one or more expert personnel. The expert-identified work scope includes a set of guidance information configured to be displayed on the first mobile device in order to guide the operator through one or more of diagnosing, repairing, testing, or replacing the one or more components of the system. The method also can include storing the expert-identified work scope and at least some of the first identification information in one or more memory devices such that the expert-identified work scope is associated with the at least some of the first identification information. The method may further include comparing subsequently received second identification information received from one or more of the first mobile device or a second mobile device with the at least some of the first identification information stored in the one or more memory devices, and automatically selecting and communicating the expert-identified work scope from the one or more memory devices to the one or more of the first mobile device or the second mobile device based on the comparing of the second identification information with the at least some of the first identification information.

In one aspect, the method optionally can include receiving a request signal from the one or more of the first mobile device or the second mobile device. The request signal can request assistance from the one or more expert personnel during performance of the expert-identified work scope. The method also may include selecting a subset of the one or more expert personnel based on the request signal, and communicating an identification signal to the one or more of the first mobile device or the second mobile device. The identification signal can identify the subset of the one or more expert personnel having an ability to remotely communicate with and assist the operator with the one or more of diagnosing, repairing, testing, or replacing the one or more components of the system via the one or more of the first mobile device or the second mobile device.

In one aspect, the subset of the one or more expert personnel can be automatically selected from among the one or more expert personnel based on a comparison between areas of expertise of the one or more expert personnel and the one or more components of the system.

In one aspect, the subset of the one or more expert personnel can be automatically selected from among the one or more expert personnel based on a comparison between availabilities of the one or more expert personnel to remotely assist the operator via the one or more of the first mobile device or the second mobile device during performance of the expert-identified work scope by the operator.

In one aspect, the availabilities of the one or more expert personnel can represent communication abilities of the one or more expert personnel to communicate with the operator via the one or more of the first mobile device or the second mobile device.

In one aspect, the subset of the one or more expert personnel can be automatically selected from among the one or more expert personnel based on locations of the one or more expert personnel.

In one aspect, the method also can include communicating a display signal to the one or more of the first mobile device or the second mobile device that directs the one or more of the first mobile device or the second mobile device to display a map and locations of the one or more expert personnel.

In one aspect, the set of guidance information includes one or more manuals, guides, lists, images, videos, or audio files that direct the operator through the one or more of diagnosing, repairing, testing, or replacing the one or more components of the system.

In another embodiment, a services support system includes an analysis system and one or more memory devices. The analysis system is configured to receive first identification information from a first mobile device of a remotely located operator. The first identification information is representative of one or more components of a system. The analysis system also can be configured to communicate the first identification information to one or more expert personnel remotely located from the operator and to receive an expert-identified work scope based on the first identification information that was communicated to the one or more expert personnel. The expert-identified work scope includes a set of guidance information configured to be displayed on the first mobile device in order to guide the operator through one or more of diagnosing, repairing, testing, or replacing the one or more components of the system. The one or more memory devices are configured to store the expert-identified work scope and at least some of the first identification information such that the expert-identified work scope is associated with the at least some of the first identification information. The analysis system can be configured to compare subsequently received second identification information received from one or more of the first mobile device or a second mobile device with the at least some of the first identification information stored in the one or more memory devices, and to automatically select and communicate the expert-identified work scope from the one or more memory devices to the one or more of the first mobile device or the second mobile device based on comparing the second identification information with the at least some of the first identification information.

In one aspect, the analysis system also is configured to receive a request signal from the one or more of the first mobile device or the second mobile device. The request signal can request assistance from the one or more expert personnel during performance of the expert-identified work scope. The analysis system also can be configured to select a subset of the one or more expert personnel based on the request signal and to communicate an identification signal to the one or more of the first mobile device or the second mobile device. The identification signal can identify the subset of the one or more expert personnel having an ability to remotely communicate with and assist the operator with the one or more of diagnosing, repairing, testing, or replacing the one or more components of the system via the one or more of the first mobile device or the second mobile device.

In one aspect, the analysis system can be configured to automatically select the subset of the one or more expert personnel from among the one or more expert personnel based on a comparison between areas of expertise of the one or more expert personnel and the one or more components of the system.

In one aspect, the analysis system can be configured to automatically select the subset of the one or more expert personnel from among the one or more expert personnel based on a comparison between availabilities of the one or more expert personnel to remotely assist the operator via the one or more of the first mobile device or the second mobile device during performance of the expert-identified work scope by the operator.

In one aspect, the availabilities of the one or more expert personnel can represent communication abilities of the one or more expert personnel to communicate with the operator via the one or more of the first mobile device or the second mobile device.

In one aspect, the analysis system can be configured to automatically select the subset of the one or more expert personnel from among the one or more expert personnel based on locations of the one or more expert personnel.

In one aspect, the analysis system also can be configured to communicate a display signal to the one or more of the first mobile device or the second mobile device that directs the one or more of the first mobile device or the second mobile device to display a map and locations of the one or more expert personnel.

In one aspect, the set of guidance information includes one or more manuals, guides, lists, images, videos, or audio files that direct the operator through the one or more of diagnosing, repairing, testing, or replacing the one or more components of the system.

In another embodiment, another method (e.g., for receiving expert assistance) includes receiving identification information from an operator via a mobile device. The identification information can represent one or more components. The method also can include communicating the identification information to a remotely located analysis system, and receiving an expert-identified work scope based on the identification information that was communicated to the analysis system. The expert-identified work scope includes a set of guidance information configured to be displayed on the mobile device in order to guide the operator through one or more of diagnosing, repairing, testing, or replacing the one or more components. The method may include displaying the guidance information to the operator via the mobile device during performance of the one or more of diagnosing, repairing, testing, or replacing the one or more components, and communicatively coupling the mobile device with one or more remotely located expert personnel during performance of the one or more of diagnosing, repairing, testing, or replacing the one or more components to allow the one or more remotely located expert personnel to assist the operator with performance of the one or more of diagnosing, repairing, testing, or replacing the one or more components.

In one aspect, the method also can include obtaining one or more of a video or an image of the one or more components at the mobile device, receiving an operator-input annotation to the one or more of the video or the image via the mobile device, and communicating the operator-input annotation and the one or more of the video or the image to the one or more remotely located expert personnel.

In one aspect, the method can include receiving a request signal from the operator at the mobile device. The request signal requests assistance from the one or more expert personnel during performance of the one or more of diagnosing, repairing, testing, or replacing the one or more components. The method also can include receiving a selected subset of the one or more expert personnel from the analysis system based on the request signal, and receiving an identification signal at the mobile device from the analysis system. The identification signal can identify the subset of the one or more expert personnel having an ability to remotely communicate with and assist the operator with the one or more of diagnosing, repairing, testing, or replacing the one or more components via the mobile device.

In one aspect, the method also can include displaying a map and locations of the one or more expert personnel on the mobile device.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
   receiving first identification information from a first mobile device of a remotely located operator, the first identification information representative of one or more components of a system;
   communicating the first identification information to one or more expert personnel remotely located from the operator;
   receiving an expert-identified work scope based on the first identification information that was communicated to the one or more expert personnel, the expert-identified work scope including a set of guidance information configured to be displayed on the first mobile device in order to guide the operator through one or more of diagnosing, repairing, testing, or replacing the one or more components of the system;
   communicating the expert-identified work scope to the first mobile device;
   receiving a request signal from the first mobile device, the request signal requesting assistance from the one or more expert personnel during performance of the expert-identified work scope;
   selecting a subset of the one or more expert personnel based on the request signal, the subset of the one or more expert personnel having an ability to remotely communicate with and assist the operator with the one or more of diagnosing, repairing, testing, or replacing the one or more components of the system via the first mobile device; and
   communicating an identification signal to the first mobile device that identifies the subset of the one or more expert personnel.

2. The method of claim 1, wherein the subset of the one or more expert personnel is automatically selected from among the one or more expert personnel based on a comparison between areas of expertise of the one or more expert personnel and the one or more components of the system.

3. The method of claim 1, wherein the subset of the one or more expert personnel is automatically selected from among the one or more expert personnel based on a comparison between availabilities of the one or more expert personnel to remotely assist the operator via the first mobile device during performance of the expert-identified work scope by the operator.

4. The method of claim 3, wherein the availabilities of the one or more expert personnel represent communication abilities of the one or more expert personnel to communicate with the operator via the first mobile device.

5. The method of claim 1, wherein the subset of the one or more expert personnel is automatically selected from among the one or more expert personnel based on locations of the one or more expert personnel.

6. The method of claim 1, further comprising communicating a display signal to the first mobile device that directs the first mobile device to display a map and locations of the one or more expert personnel.

7. The method of claim 1, wherein the set of guidance information includes one or more manuals, guides, lists, images, videos, or audio files that direct the operator through the one or more of diagnosing, repairing, testing, or replacing the one or more components of the system.

8. The method of claim 1, further comprising storing the expert-identified work scope and at least some of the first identification information in one or more memory devices such that the expert-identified work scope is associated with the at least some of the first identification information;
   comparing subsequently received second identification information received from one or more of the first mobile device or a second mobile device with the at least some of the first identification information stored in the one or more memory devices; and
   responsive to at least some of the second identification information matching the at least some of the first identification information stored in the one or more memory devices, automatically selecting and communicating the expert-identified work scope from the one or more memory devices to the one or more of the first mobile device or the second mobile device without communicating the second identification information to the one or more expert personnel.

9. A services support system comprising:
   an analysis system configured to receive first identification information from a first mobile device of a remotely located operator, the first identification information representative of one or more components of a system, the analysis system also configured to communicate the first identification information to one or more expert personnel remotely located from the operator and to receive an expert-identified work scope based on the first identification information that was communicated to the one or more expert personnel, the expert-identified work scope including a set of guidance information configured to be displayed on the first mobile device in order to guide the operator through one or more of diagnosing, repairing, testing, or replacing the one or more components of the system; and
   one or more memory devices configured to store the expert-identified work scope and at least some of the first identification information such that the expert-identified work scope is associated with the at least some of the first identification information,
   wherein the analysis system is configured to compare subsequently received second identification information received from one or more of the first mobile device or a second mobile device with the at least some of the first identification information stored in the one or more memory devices, and responsive to at least some of the second identification information matching the at least some of the first identification information stored in the one or more memory devices, the analysis system is configured to automatically select and communicate the expert-identified work scope from the one or more memory devices to the one or more of the first mobile device or the second mobile device without communicating the second identification information to the one or more expert personnel.

10. The services support system of claim 9, wherein the analysis system also is configured to receive a request signal from the one or more of the first mobile device or the second mobile device, the request signal requesting assistance from the one or more expert personnel during performance of the expert-identified work scope, the analysis system also configured to select a subset of the one or more expert personnel based on the request signal and to communicate an identification signal to the one or more of the first mobile device or the second mobile device,
wherein the identification signal identifies the subset of the one or more expert personnel having an ability to remotely communicate with and assist the operator with the one or more of diagnosing, repairing, testing, or replacing the one or more components of the system via the one or more of the first mobile device or the second mobile device.

11. The services support system of claim 10, wherein the analysis system is configured to automatically select the subset of the one or more expert personnel from among the one or more expert personnel based on a comparison between areas of expertise of the one or more expert personnel and the one or more components of the system.

12. The services support system of claim 10, wherein the analysis system is configured to automatically select the subset of the one or more expert personnel from among the one or more expert personnel based on a comparison between availabilities of the one or more expert personnel to remotely assist the operator via the one or more of the first mobile device or the second mobile device during performance of the expert-identified work scope by the operator.

13. The services support system of claim 12, wherein the availabilities of the one or more expert personnel represent communication abilities of the one or more expert personnel to communicate with the operator via the one or more of the first mobile device or the second mobile device.

14. The services support system of claim 10, wherein the analysis system is configured to automatically select the subset of the one or more expert personnel from among the one or more expert personnel based on locations of the one or more expert personnel.

15. The services support system of claim 10, wherein the analysis system also is configured to communicate a display signal to the one or more of the first mobile device or the second mobile device that directs the one or more of the first mobile device or the second mobile device to display a map and locations of the one or more expert personnel.

16. The services support system of claim 9, wherein the set of guidance information includes one or more manuals, guides, lists, images, videos, or audio files that direct the operator through the one or more of diagnosing, repairing, testing, or replacing the one or more components of the system.

17. The services support system of claim 9, wherein the expert-identified work scope based on the first identification information is a first expert-identified work scope, and, responsive to the second identification information not matching the at least some of the first identification information stored in the one or more memory devices, the analysis system is configured to communicate the second identification information to the one or more expert personnel and to receive a second expert-identified work scope based on the second identification information that was communicated to the one or more expert personnel.

18. A method comprising:
receiving first identification information from a first mobile device of a remotely located operator, the first identification information representative of one or more components of a system;
communicating the first identification information to one or more expert personnel remotely located from the operator;
receiving a first expert-identified work scope based on the first identification information that was communicated to the one or more expert personnel, the expert-identified work scope including a set of guidance information configured to be displayed on the first mobile device in order to guide the operator through one or more of diagnosing, repairing, testing, or replacing the one or more components of the system;
communicating the first expert-identified work scope to the first mobile device;
storing the first expert-identified work scope and at least some of the first identification information in one or more memory devices such that the first expert-identified work scope is associated with the at least some of the first identification information;
comparing subsequently received second identification information received from one or more of the first mobile device or a second mobile device with the at least some of the first identification information stored in the one or more memory devices; and
responsive to at least some of the second identification information matching the at least some of the first identification information stored in the one or more memory devices, automatically selecting and communicating the first expert-identified work scope from the one or more memory devices to the one or more of the first mobile device or the second mobile device without communicating the second identification information to the one or more expert personnel.

19. The method of claim 18, further comprising, responsive to the second identification information not matching the at least some of the first identification information stored in the one or more memory devices, communicating the second identification information to the one or more expert personnel, receiving a second expert-identified work scope based on the second identification information that was communicated to the one or more expert personnel, and communicating the second expert-identified work scope to the one or more of the first mobile device or a second mobile device.

20. The method of claim 18, further comprising receiving a request signal from the first mobile device, the request signal requesting assistance from the one or more expert personnel during performance of the first expert-identified work scope;
selecting a subset of the one or more expert personnel based on the request signal, the subset of the one or more expert personnel having an ability to remotely communicate with and assist the operator with the one or more of diagnosing, repairing, testing, or replacing the one or more components of the system via the first mobile device; and communicating an identification signal to the first mobile device that identifies the subset of the one or more expert personnel.

\* \* \* \* \*